US008081839B2

(12) United States Patent
Hasegawa

(10) Patent No.: US 8,081,839 B2
(45) Date of Patent: Dec. 20, 2011

(54) IMAGE PROCESSOR

(75) Inventor: Tomohiko Hasegawa, Aichi-ken (JP)

(73) Assignee: Brother Kogyo Kabushiki Kaisha, Aichi-ken (JP)

( * ) Notice: Subject to any disclaimer, the term of this patent is extended or adjusted under 35 U.S.C. 154(b) by 1084 days.

(21) Appl. No.: 11/864,251

(22) Filed: Sep. 28, 2007

(65) Prior Publication Data

US 2008/0260282 A1    Oct. 23, 2008

Related U.S. Application Data

(63) Continuation-in-part of application No. 11/848,563, filed on Aug. 31, 2007.

(30) Foreign Application Priority Data

Aug. 31, 2006  (JP) ................................ 2006-235535
Sep. 29, 2006  (JP) ................................ 2006-269685
Oct. 31, 2006  (JP) ................................ 2006-297062
Oct. 31, 2006  (JP) ................................ 2006-297073

(51) Int. Cl.
   *G06K 9/40*         (2006.01)
(52) U.S. Cl. ........ 382/274; 382/162; 382/167; 382/254; 382/260; 382/264; 382/298; 382/299
(58) Field of Classification Search .................. 382/274, 382/162, 167, 254, 260, 264, 295, 299
   See application file for complete search history.

(56) References Cited

U.S. PATENT DOCUMENTS

| 6,304,294 | B1 | 10/2001 | Tao et al. |
| 6,658,158 | B2 | 12/2003 | Fukuhara et al. |
| 6,741,753 | B1 * | 5/2004 | Moroney ........................ 382/274 |
| 6,834,125 | B2 | 12/2004 | Woodell et al. |
| 6,842,543 | B2 | 1/2005 | Woodell et al. |
| 6,885,482 | B1 | 4/2005 | Kubo et al. |
| 6,941,028 | B2 * | 9/2005 | Kimmel et al. ................ 382/274 |

(Continued)

FOREIGN PATENT DOCUMENTS

JP    2000-197052    7/2000

(Continued)

OTHER PUBLICATIONS

Jobson, et al. "A Multiscale Retinex for Bridging the Gap Between Color Images and the Human Observation of Scenes." IEEE Transactions on Image Processing. 6.7 (1997): 965-976. Print.*

(Continued)

*Primary Examiner* — Matthew Bella
*Assistant Examiner* — Michael A Newman
(74) *Attorney, Agent, or Firm* — Scully, Scott, Murphy & Presser, PC

(57) ABSTRACT

The image processor includes an image filter acquiring unit, a reduced image average value calculating unit, a normalization parameter setting unit, an original image average value calculating unit, an original image reflectance acquiring unit, a normalizing unit, and a correcting unit. The image filter acquiring unit generates either one of the original image filter and the reduced image filter based on the other one of the original image filter and the reduced image filter. The reduced image average value calculating unit calculates an average peripheral value for each pixel in the reduced image using the reduced image filter. The normalization parameter setting unit tabulates frequencies of each reflectance value within the entire range of reflectance values of the reduced image and sets a normalization parameter. The normalizing unit normalizes the reflectance value for each pixel in the original image based on the normalization parameter. The correcting unit corrects a value for each pixel based on the normalized reflectance value for the each pixel in the original image.

47 Claims, 29 Drawing Sheets

U.S. PATENT DOCUMENTS

| | | | |
|---|---|---|---|
| 6,947,176 B1 | 9/2005 | Kubo et al. | |
| 7,251,056 B2 | 7/2007 | Matsushima | |
| 7,298,917 B2 * | 11/2007 | Sakatani et al. | 382/254 |
| 7,508,550 B2 * | 3/2009 | Kameyama | 358/3.23 |
| 7,570,390 B2 * | 8/2009 | Mitsunaga | 358/1.9 |
| 7,876,474 B2 | 1/2011 | Kondo | |
| 7,885,479 B2 * | 2/2011 | Kuno | 382/276 |
| 7,912,308 B2 * | 3/2011 | Kuno | 382/254 |
| 7,920,752 B2 * | 4/2011 | Kuno | 382/254 |
| 2002/0131652 A1 | 9/2002 | Yoda | |
| 2003/0026494 A1 | 2/2003 | Woodell et al. | |
| 2003/0072496 A1 | 4/2003 | Woodell et al. | |
| 2004/0052414 A1 * | 3/2004 | Schroder | 382/167 |
| 2004/0091164 A1 * | 5/2004 | Sakatani et al. | 382/254 |
| 2005/0074163 A1 * | 4/2005 | Shaked | 382/162 |
| 2005/0226526 A1 * | 10/2005 | Mitsunaga | 382/274 |
| 2006/0062562 A1 * | 3/2006 | Utagawa | 396/213 |
| 2007/0040914 A1 | 2/2007 | Katagiri et al. | |
| 2008/0107333 A1 * | 5/2008 | Mazinani et al. | 382/167 |

FOREIGN PATENT DOCUMENTS

| | | |
|---|---|---|
| JP | 2001-69525 | 3/2001 |
| JP | 2001-78025 | 3/2001 |
| JP | 2002-281347 | 9/2002 |
| JP | 2003-69822 | 3/2003 |
| JP | 2003-219182 | 7/2003 |
| JP | 2003-333331 | 11/2003 |
| JP | 2004-16580 | 6/2004 |
| JP | 2004-165840 | 6/2004 |
| JP | 3731577 | 10/2005 |
| JP | 2006-114005 | 4/2006 |

OTHER PUBLICATIONS

Hines, et al. "DSP Implementation of the Retinex Image Enhancement Algorithm." Proceedings of the SPIE Visual Information Processing XIII. 5438. (2004): 13-24. Print.*

Japanese Official Action dated Sep. 14, 2010 together with a partial English language translation.

Japanese Official Action dated Nov. 24, 2010 together with a English language translation from U.S. Appl. No. 11/848,692.

U.S. Official Action dated Jun. 23, 2011 from related U.S. Appl. No. 12/057,838.

Japanese Decision of Rejection dated Feb. 22, 2011 together with partial English language translation from Japanese application 2006-235823 in related application U.S. Appl. No. 11/848,692.

Meylan et al., "Color image enhancement using a Retinex-based adaptive filter", Proc. IS&T Second European Conference on Color in Graphics, Image, and Vision (CGIV 2004), vol. 2, pp. 359-363.

U.S. Official Action dated Mar. 22, 2011 from related U.S. Appl. No. 11/848,563.

* cited by examiner

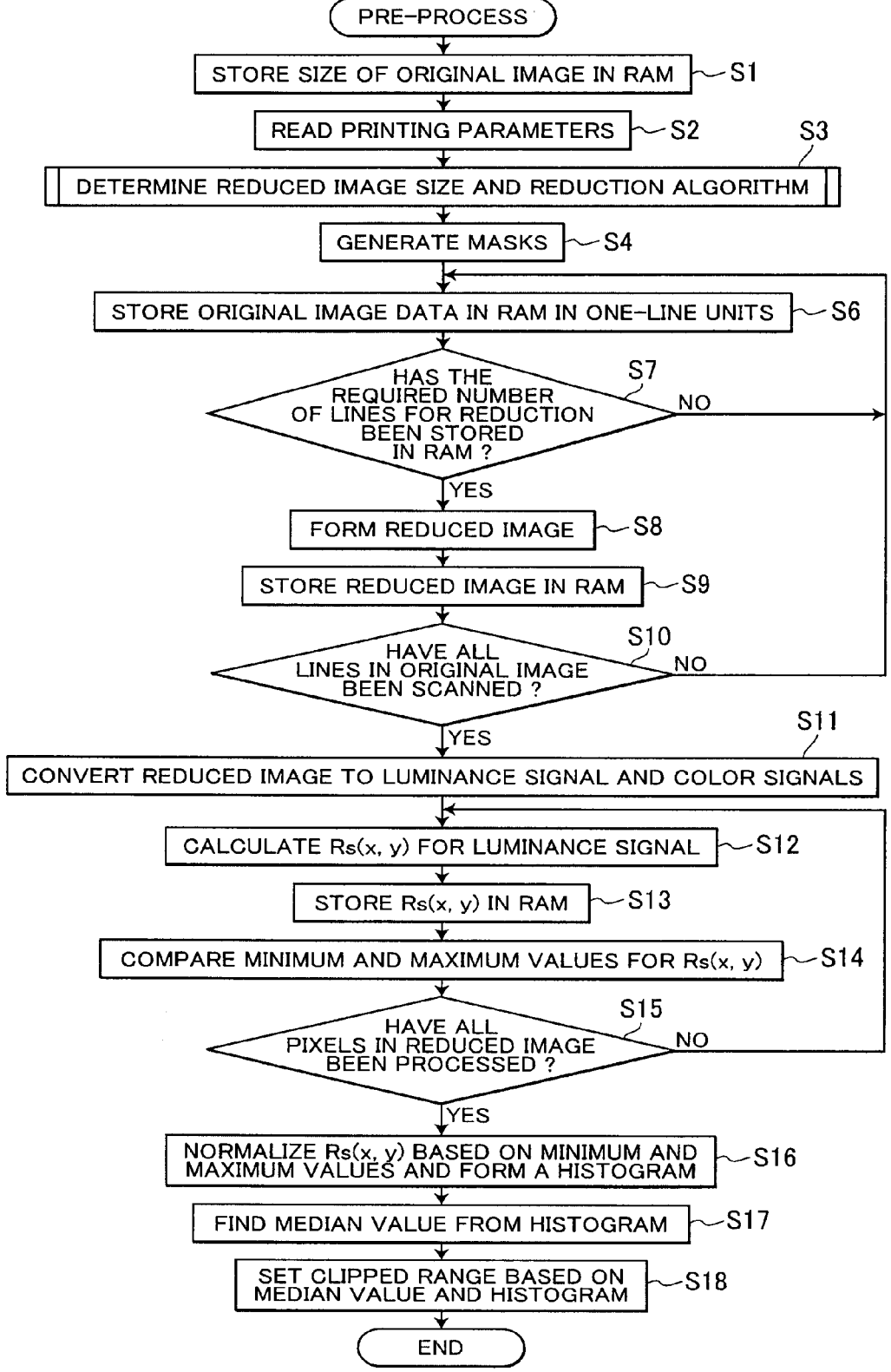

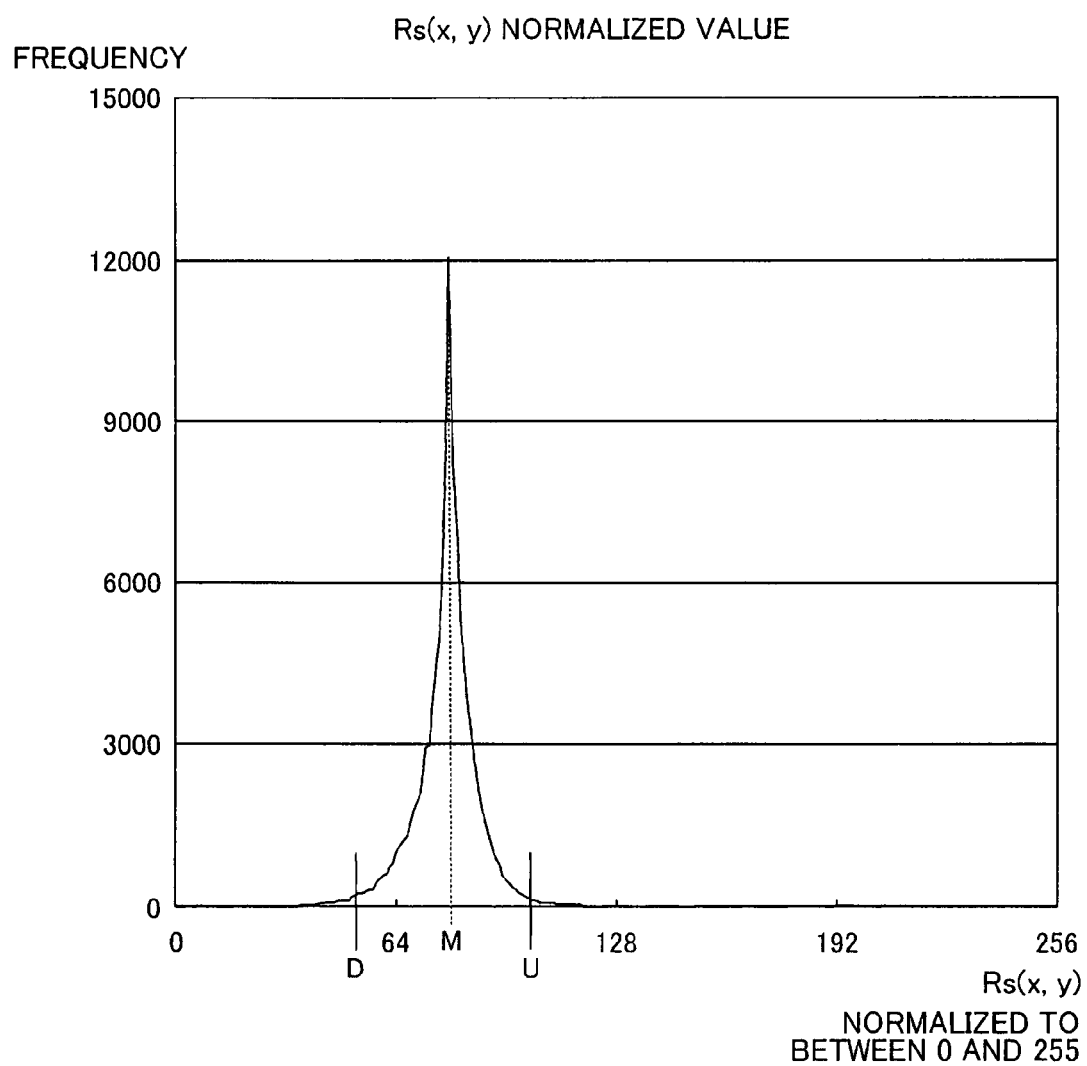

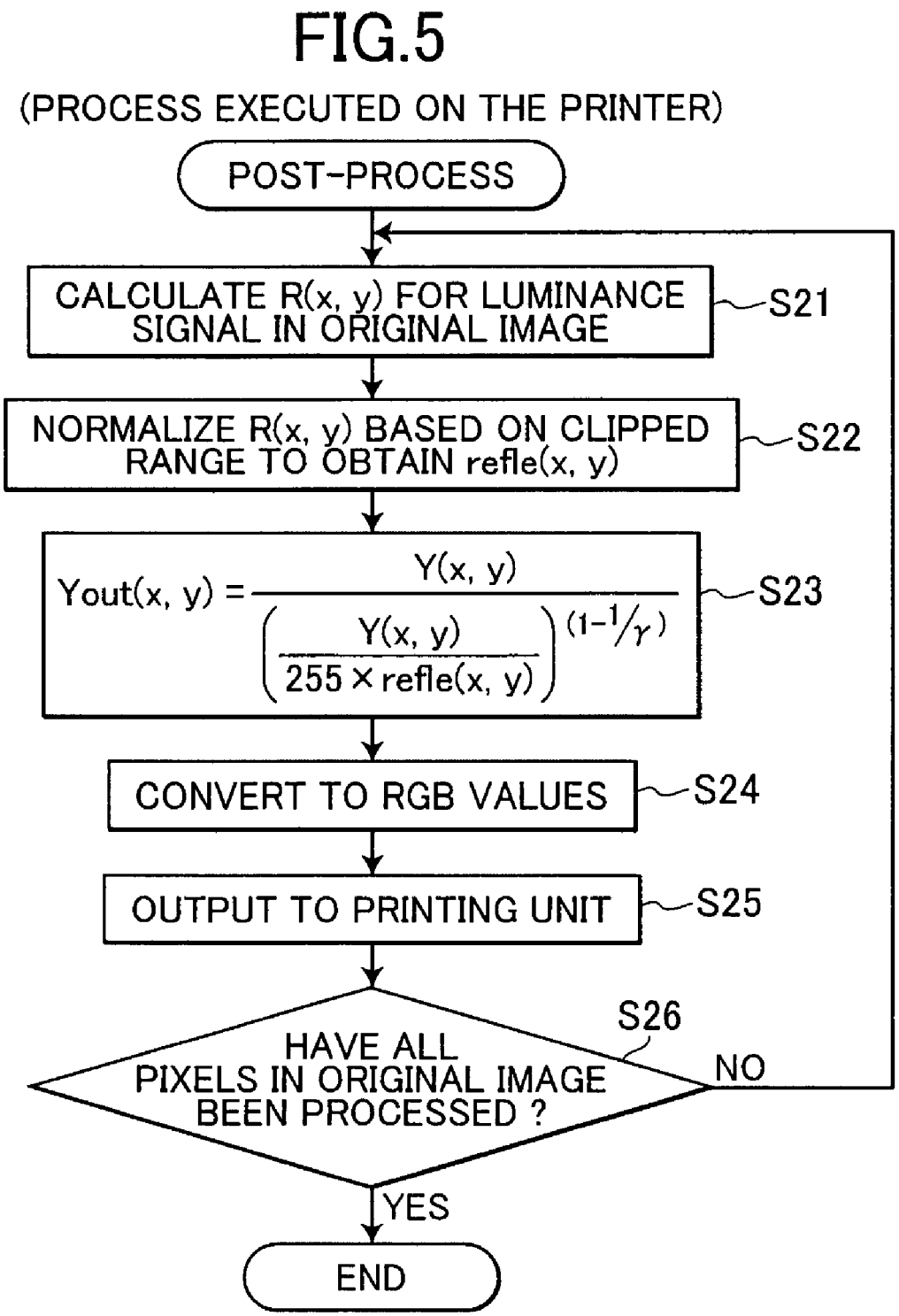

FIG.6

TABLE FOR PHOTO MODE

| PRINT MODE | PAPER TYPE | PAPER SIZE | ORIGINAL IMAGE SIZE | REDUCED IMAGE SIZE | REDUCTION ALGORITHM |
|---|---|---|---|---|---|
| PHOTO MODE | GLOSSY PAPER | 4″ × 6″ | 600 × 800[pixel] | 150 × 200[pixel] | ME |
| | | | 1200 × 1600[pixel] | 300 × 400[pixel] | ME |
| | | | 2400 × 3200[pixel] | 450 × 600[pixel] | ME |
| | | 5″ × 7″ | 600 × 800[pixel] | 150 × 200[pixel] | ME |
| | | | 1200 × 1600[pixel] | 300 × 400[pixel] | ME |
| | | | 2400 × 3200[pixel] | 450 × 600[pixel] | ME |
| | | LETTER | 600 × 800[pixel] | 300 × 400[pixel] | BL |
| | | | 1200 × 1600[pixel] | 450 × 600[pixel] | BL |
| | | | 2400 × 3200[pixel] | 450 × 600[pixel] | ME |
| | | A4 | 600 × 800[pixel] | 300 × 400[pixel] | BL |
| | | | 1200 × 1600[pixel] | 450 × 600[pixel] | BL |
| | | | 2400 × 3200[pixel] | 450 × 600[pixel] | ME |
| | PLAIN PAPER | 4″ × 6″ | 600 × 800[pixel] | 150 × 200[pixel] | NN |
| | | | 1200 × 1600[pixel] | 150 × 200[pixel] | NN |
| | | | 2400 × 3200[pixel] | 150 × 200[pixel] | BL |
| | | 5″ × 7″ | 600 × 800[pixel] | 150 × 200[pixel] | NN |
| | | | 1200 × 1600[pixel] | 150 × 200[pixel] | NN |
| | | | 2400 × 3200[pixel] | 150 × 200[pixel] | BL |
| | | LETTER | 600 × 800[pixel] | 150 × 200[pixel] | NN |
| | | | 1200 × 1600[pixel] | 300 × 400[pixel] | NN |
| | | | 2400 × 3200[pixel] | 300 × 400[pixel] | NN |
| | | A4 | 600 × 800[pixel] | 150 × 200[pixel] | NN |
| | | | 1200 × 1600[pixel] | 300 × 400[pixel] | NN |
| | | | 2400 × 3200[pixel] | 300 × 400[pixel] | NN |

FIG.7

TABLE FOR NORMAL MODE

| PRINT MODE | PAPER TYPE | PAPER SIZE | ORIGINAL IMAGE SIZE | REDUCED IMAGE SIZE | REDUCTION ALGORITHM |
|---|---|---|---|---|---|
| NORMAL MODE | GLOSSY PAPER | 4″ × 6″ | 600 × 800[pixel] | 150 × 200[pixel] | BL |
| | | | 1200 × 1600[pixel] | 150 × 200[pixel] | BL |
| | | | 2400 × 3200[pixel] | 300 × 400[pixel] | BL |
| | | 5″ × 7″ | 600 × 800[pixel] | 150 × 200[pixel] | BL |
| | | | 1200 × 1600[pixel] | 150 × 200[pixel] | BL |
| | | | 2400 × 3200[pixel] | 300 × 400[pixel] | BL |
| | | LETTER | 600 × 800[pixel] | 150 × 200[pixel] | BL |
| | | | 1200 × 1600[pixel] | 300 × 400[pixel] | BL |
| | | | 2400 × 3200[pixel] | 300 × 400[pixel] | BL |
| | | A4 | 600 × 800[pixel] | 150 × 200[pixel] | BL |
| | | | 1200 × 1600[pixel] | 300 × 400[pixel] | NN |
| | | | 2400 × 3200[pixel] | 300 × 400[pixel] | BL |
| | PLAIN PAPER | 4″ × 6″ | 600 × 800[pixel] | 150 × 200[pixel] | NN |
| | | | 1200 × 1600[pixel] | 150 × 200[pixel] | NN |
| | | | 2400 × 3200[pixel] | 150 × 200[pixel] | NN |
| | | 5″ × 7″ | 600 × 800[pixel] | 150 × 200[pixel] | NN |
| | | | 1200 × 1600[pixel] | 150 × 200[pixel] | NN |
| | | | 2400 × 3200[pixel] | 150 × 200[pixel] | NN |
| | | LETTER | 600 × 800[pixel] | 150 × 200[pixel] | NN |
| | | | 1200 × 1600[pixel] | 150 × 200[pixel] | NN |
| | | | 2400 × 3200[pixel] | 150 × 200[pixel] | NN |
| | | A4 | 600 × 800[pixel] | 150 × 200[pixel] | NN |
| | | | 1200 × 1600[pixel] | 150 × 200[pixel] | NN |
| | | | 2400 × 3200[pixel] | 150 × 200[pixel] | NN |

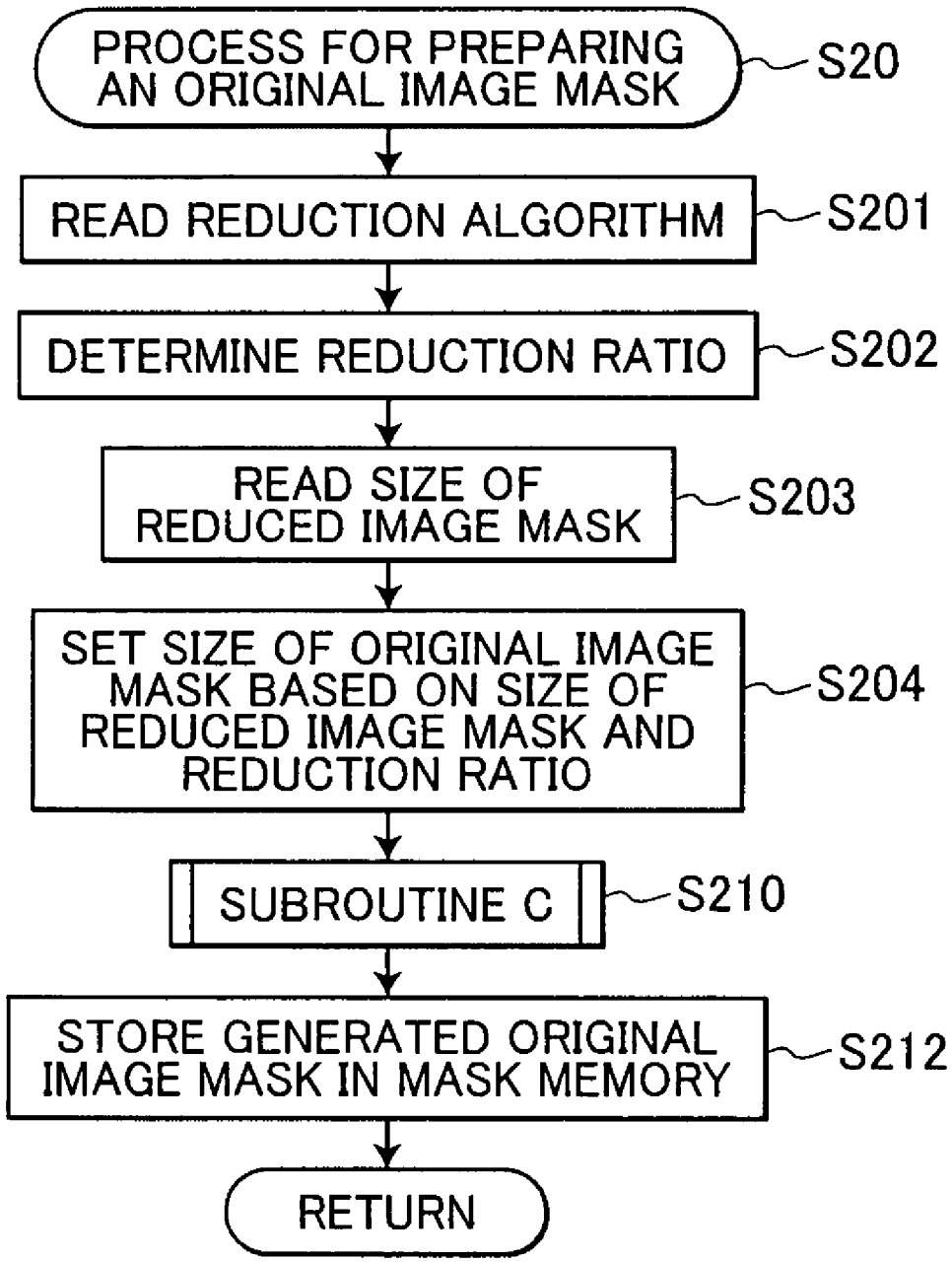

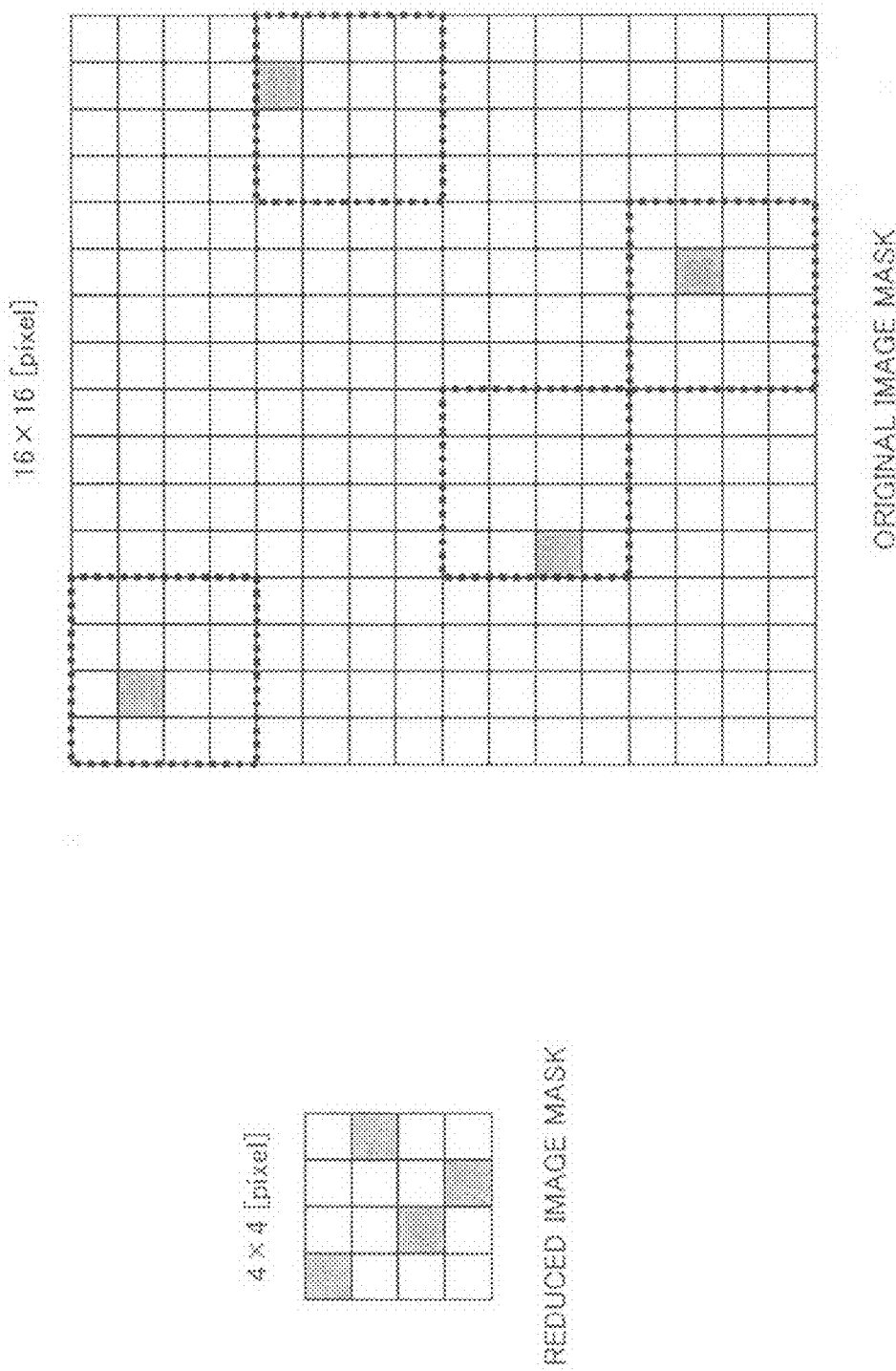

— LOGARITHMIC SPIRAL
---- ARCHIMEDEAN SPIRAL $r = a \cdot e^{b\theta}$ $r = a \cdot \theta$ $r = a \cdot \sin 2\theta$

IMAGE PROCESSOR

CROSS REFERENCE TO RELATED APPLICATIONS

This application is a Continuation-In-Part of application Ser. No. 11/848,563 filed Aug. 31, 2007. The entire content of this prior application is incorporated herein by reference.

This application claims priority from Japanese Patent Application No. 2006-235535 filed Aug. 31, 2006, Japanese Patent Application No. 2006-269685 filed Sep. 29, 2006, Japanese Patent Application No. 2006-297062 filed Oct. 31, 2006, and Japanese Patent Application No. 2006-297073 filed Oct. 31, 2006. The entire content of each of these priority applications is incorporated herein by reference.

TECHNICAL FIELD

The present invention relates to an image processor, and particularly to an image processor and an image correcting method capable of performing the Retinex process quickly and with high precision.

BACKGROUND

When taking a photograph of a subject under backlit conditions, e.g. against the sun, the image of the subject portion is an indistinct backlit image with low lightness and contrast, making it difficult to make out details of the subject. Image processing is performed to improve the quality of these backlit images, as well as images suffering in quality due to overexposure, underexposure, blurring due to jiggling when capturing the image, noise, insufficient light, and the like, in order to improve lightness and contrast in the image. One method used in conventional image processing is a Retinex process.

The Retinex process preserves the input image data for high-quality regions and improves the image quality primarily in low-quality regions. The Retinex process performs convolution operation by using Gaussian filters to calibrate pixel data in the original image to values reflecting data of surrounding pixels, calculates reflectance component data for the original image from the natural logarithm of the calibrated pixel data, and calculates illuminance component data by dividing pixel data of the original image by reflectance component data of the original image. Specifically, this process divides the original image into reflectance components and illuminance components. Next, a process is performed to calibrate the brightness and level (contrast) of the illuminance component through gamma correction or the like and subsequently generates improved image data for the original image in backlit portions and the like by combining the calibrated illuminance components with the reflectance components.

U.S. Pat. No. 6,885,482 (corresponding to Japanese Patent Application Publication No. 2001-69525) discloses a method of converting RGB values to a color space configured of a luminance component and color components, such as YCbCr or YIQ, performing the Retinex process only on the luminance component Y, while maintaining the color components, and converting the values back to RGB. Calibrating only the luminance component (i.e. not calibrating the color components) prevents an upset in the color balance and a shift in color. Further, since the Retinex process is performed only on the luminance component, this method requires fewer calculations than a method for performing the Retinex process on each RGB plane and, hence, can complete the process quicker.

U.S. Patent Application Publication No. 2004/0091164 (corresponding to Japanese Patent No. 3,731,577) discloses a method for improving the processing speed in the Retinex process. This method forms a reduced image (low-resolution image) from the original image using the average pixel method or the like, forms a peripheral average pixel value image (blurred image) by finding the peripheral average pixel value for each pixel in the reduced image, forms a Retinex processed image from the original image and an image produced by expanding the blurred image, and forms an output image from the original image and the Retinex processed image.

SUMMARY

It is an object of the present invention to provide an image processor and an image correcting method capable of performing the Retinex process with high precision and high speed.

In order to attain the above and other objects, the invention provides an image processor. The image processor corrects an image. The image processor includes a reduced image forming unit, an image filter acquiring unit, a reduced image average value calculating unit, a reduced image reflectance acquiring unit, a normalization parameter setting unit, an original image average value calculating unit, an original image reflectance acquiring unit, a normalizing unit, and a correcting unit. The reduced image forming unit forms a reduced image by reducing an original image, an image filter acquiring unit acquires a reduced image filter for the reduced image and an original image filter for the original image, wherein the image filter acquiring unit generates either one of the original image filter and the reduced image filter based on the other one of the original image filter and the reduced image filter. The reduced image average value calculating unit calculates an average peripheral value for each pixel in the reduced image using the reduced image filter. The reduced image reflectance acquiring unit finds a reflectance value for each pixel in the reduced image from a value of the each pixel and the average peripheral value of the each pixel. The normalization parameter setting unit tabulates frequencies of each reflectance value within the entire range of reflectance values found by the reduced image reflectance acquiring unit for all the pixels and setting a normalization parameter. The original image average value calculating unit calculates an average peripheral value for each pixel in the original image using the original image filter. The original image reflectance acquiring unit finds a reflectance value for each pixel in the original image from a value of the each pixel and the average peripheral value of the each pixel. The normalizing unit normalizes the reflectance value for each pixel in the original image based on the normalization parameter. The correcting unit corrects a value for each pixel based on the normalized reflectance value for the each pixel in the original image.

According to another aspect, the invention provides a method for correcting an image. The method includes forming a reduced image by reducing an original image, acquiring a reduced image filter for the reduced image and an original image filter for the original image, wherein the acquiring includes generating either one of the original image filter and the reduced image filter based on the other one of the original image filter and the reduced image filter, calculating an average peripheral value for each pixel in the reduced image using the reduced image filter, finding a reflectance value for each pixel in the reduced image from a value of the each pixel and the average peripheral value of the each pixel, tabulating frequencies of each reflectance value within the entire range of reflectance values found for all the pixels and setting a normalization parameter, calculating an average peripheral value for each pixel in the original image using the original image filter, finding a reflectance value for each pixel in the original image from a value of the each pixel and the average peripheral value of the each pixel, normalizing the reflectance value for each pixel in the original image based on the normalization parameter, and correcting a value for each pixel based on the normalized reflectance value for the each pixel in the original image According to still another aspect, the invention provides a computer-readable storage medium storing a set of program instructions executable on a computer. The set of program instruction includes forming a reduced image by reducing an original image, acquiring a reduced image filter for the reduced image and an original image filter for the original image, wherein the acquiring includes generating either one of the original image filter and the reduced image filter based on the other one of the original image filter and the reduced image filter, calculating an average peripheral value for each pixel in the reduced image using the reduced image filter, finding a reflectance value for each pixel in the reduced image from a value of the each pixel and the average peripheral value of the each pixel, tabulating frequencies of each reflectance value within the entire range of reflectance values found for all the pixels and setting a normalization parameter, calculating an average peripheral value for each pixel in the original image using the original image filter, finding a reflectance value for each pixel in the original image from a value of the each pixel and the average peripheral value of the each pixel, normalizing the reflectance value for each pixel in the original image based on the normalization parameter, and correcting a value for each pixel based on the normalized reflectance value for the each pixel in the original image.

BRIEF DESCRIPTION OF THE DRAWINGS

In the drawings:

FIG. 3 is a flowchart illustrating steps in a pre-process performed according to the image-processing program of the first embodiment;

FIG. 4 is a graph conceptually illustrating a clipped range for performing normalization;

FIG. 5 is a flowchart illustrating steps in a post-process executed after the pre-process;

FIG. 6 is a table for a photo mode referenced when the print mode is set to the photo mode;

FIG. 7 is a table for a normal mode referenced when the print mode is set to the normal mode;

FIG. 24 is a flowchart illustrating steps in a process for preparing an original image mask according to a first variation of the second embodiment;

FIG. 25 is an explanatory diagram conceptually illustrating a reduced image mask and an original image mask according to the variation of a second embodiment;

DETAILED DESCRIPTION

First Embodiment

An image processor according to a first embodiment of the present invention will be described with reference to drawings.

Figure 1:
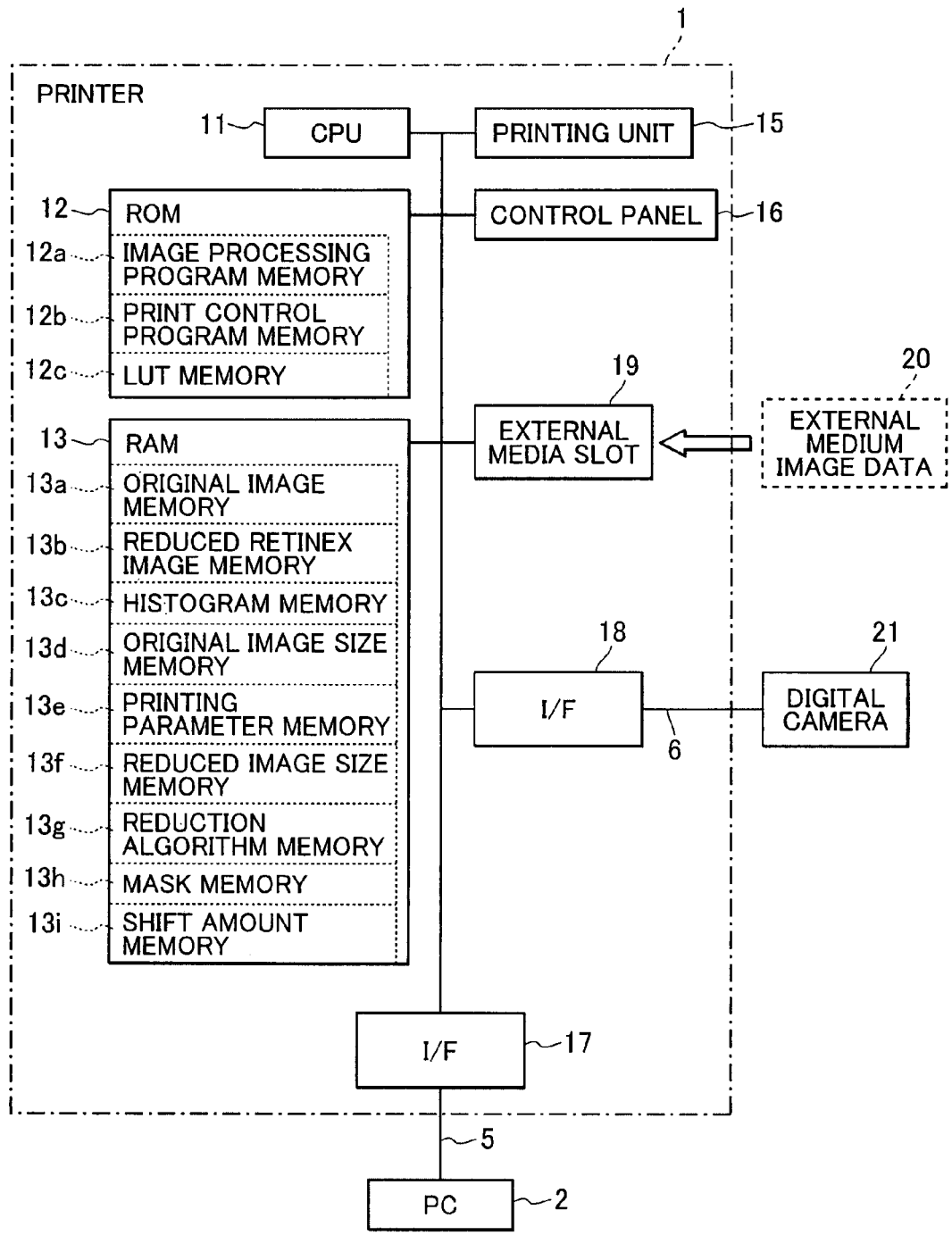
FIG. 1 is a block diagram showing the electrical structure of a printer provided with an image-processing program according to a first embodiment of the present invention.

FIG. 1 is a block diagram showing the electrical structure of a printer 1 having a function for performing an image process according to the embodiment. In the embodiment, the printer 1 is connected to a personal computer (hereinafter referred to as a "PC") 2, a digital camera 21, and/or an external medium 20. An image-processing program installed on the printer 1 executes a Retinex process on image data (image data for an original document or the like) inputted from the PC 2, digital camera 21, or external medium 20. The image-processing program corrects low-quality regions of the image data, such as backlit image regions.

As shown in FIG. 1, the printer 1 includes a CPU 11, a ROM 12, a RAM 13, a printing unit 15, and a control panel 16. The printing unit 15 has a print head and the like for printing out image data on a printing medium, such as paper. The control panel 16 has a user operating unit configured of a ten-key pad and the like, for example, enabling the user to input values for the size of the outputted image and the like.

The printer 1 also includes an interface 17, an interface 18, and an external media slot 19. The interface 17 is provided for connecting the printer 1 to the PC 2 with a cable 5. The interface 18 is provided for connecting the printer 1 to the digital camera 21 with a cable 6. The external media slot 19 allows the user to detachably mount the external medium 20 in the printer 1, the external medium 20 being a flash memory, such as an SD card or a Memory Stick, for example. The interfaces 17 and 18 use the Universal Serial Bus (USB) communication method.

Accordingly, image data stored on the PC 2 can be inputted into the printer 1 via the cable 5 and the interface 17, while image data captured by the digital camera 21 can be inputted into the printer 1 via the cable 6 and the interface 18. Further, image data stored on the external medium 20 can be inputted into the printer 1 when the external medium 20 is mounted in the external media slot 19.

Through operations on the PC 2, the user can set the printing mode of the printer 1 to a high-quality photo mode or a normal-quality normal mode, and can set the type of recording medium to glossy paper, inkjet paper, or plain paper. The user can also set the size of the recording medium to A4, B5, letter, and the like. The user-specified printing parameters are inputted into the printer 1 via the cable 5 and interface 17 and stored in a printing parameter memory 13e of the RAM 13.

The CPU 11 is an arithmetic processor that controls the overall operations of the printer 1. The ROM 12 stores various control programs executed by the CPU 11 and fixed values used when the CPU 11 executes the programs. The ROM 12 includes an image-processing program memory 12a, a print control program memory 12b, and a lookup table (LUT) memory 12c. The image-processing program memory 12a stores an image-processing program for performing such image processing as the Retinex process. The print control program memory 12b stores a print control program for executing a printing operation. The image-processing program will be described later with reference to the flowcharts of FIGS. 3, 5, 8, and 12. The LUT memory 12c stores LUTs as shown in FIGS. 6 and 7, described later.

The RAM 13 is a rewritable random-access memory that includes a work area for storing a set of registers required when the CPU 11 executes the control programs, and a temporary area for temporarily storing data during such processes. The RAM 13 also includes an original image memory 13a, a reduced Retinex image memory 13b, a histogram memory 13c, an original image size memory 13d, the printing parameter memory 13e, a reduced image size memory 13f, a reduction algorithm memory 13g, a mask memory 13h, and a shift amount memory 13i. The original image memory 13a stores original image data. The reduced Retinex image memory 13b stores reflectance values found in a Retinex process performed on reduced images. The histogram memory 13c stores the frequencies of reflectance values for finding parameters for normalization. The original image size memory 13d stores the size of the original image. The printing parameter memory 13e stores user-specified printing parameters. The reduced image size memory 13f stores the size of a reduced image determined based on the printing parameters and the like. The reduction algorithm memory 13g stores a reduction algorithm determined based on the printing parameters and the like. The mask memory 13h stores: filter coefficients of a mask for the original image used when finding an average peripheral (or surrounding) luminance of a target pixel in the original image; and filter coefficients of a mask for the reduced image used when finding an average peripheral luminance of a target pixel in the reduced image. The shift amount memory 13i stores: the position of a decimal point for convolution operations using the mask for the original image; and the position of a decimal point for convolution operations using the mask for the reduced image. The mask for the reduced image will be also referred to as "reduced image mask" hereinafter. The mask for the original image will be also referred to as "original image mask" hereinafter.

The original image memory 13a stores image data inputted from the PC 2, digital camera 21, and external medium 20 via the interface 17, interface 18, and external media slot 19, respectively. The original image data is stored in the original image memory 13a in one-line units. A reduced image is formed when data of the necessary number of lines is stored in the original image memory 13a. One line of original image data is stored in the original image memory 13a when the reduction algorithm is the nearest neighbor method, two lines when the reduction algorithm is the bi-linear method, three lines when the reduction algorithm is the bi-cubic algorithm, and a line number corresponding to the reduction ratio when the reduction algorithm is the average pixel method. In the embodiment, the original image data and output image data are configured of RGB values, each of which has a data size (or data length) of 8 bits indicating a value in the range 0-255.

The RGB values include components representing the three primary colors of light, i.e. an R value representing red, a G value representing green, and a B value representing blue. The combination of RGB values for each pixel of an input image indicates one color (hue, intensity, etc.). The greater the RGB values, the higher the luminance (brightness).

Data representing the size of an original image, such as the number of horizontal and vertical pixels, is attached to the original image data and stored in the original image size memory 13d.

The reduced Retinex image memory 13b is used for storing reflectance values that are found in the Retinex process for only the luminance signals of the reduced original image.

The histogram memory 13c is used for tabulating the frequency of the reflectance values to form a histogram. After the histogram is created, an upper limit and lower limit of a clipped range are set as parameters for normalization based on the histogram.

The original image size memory 13d stores the size of an original image extracted from the original image data when the original image data is read from the PC 2 or the like. The original image size is defined by the number of horizontal pixels and the number of vertical pixels. The data indicating the original image size is expressed by the number of vertical and horizontal pixels constituting the original image, for example, 600×800. The original image size stored in original image size memory 13*d* is referenced for determining the size of the reduced image and the reduction algorithm.

The printing parameter memory 13*e* stores parameters set by the user indicating whether the print mode is the high-quality photo mode or the normal quality normal mode; whether the type of recording medium is glossy paper, inkjet paper, or plain paper; and whether the size of the recording medium is A4, B5, letter, or the like. These printing parameters can be set by the user on the PC 2 and inputted into the printer 1 or may be set through operating buttons provided on the control panel 16.

When the printing mode is selected, the printing resolution, droplet size, and the like established for the print mode are stored as parameters, and the printing process is executed based on these parameters.

The size of a reduced image and an algorithm for reducing the original image are set based on these printing parameters and the size of the original image and are stored in the reduced image size memory 13*f* and reduction algorithm memory 13*g*, respectively. The reduced image sizes is defined by the number of horizontal pixels and the number of vertical pixels. The data indicating the reduced image size is expressed by the number of vertical and horizontal pixels constituting the reduced image, for example, 300×400. Generally, a large reduced image size is set when emphasizing image quality over processing speed, while a small reduced image size is set when emphasizing processing speed over image quality.

The algorithm used for reducing the original image may be one of the nearest neighbor method for sampling the value of a pixel nearest a position in the original image corresponding to a pixel of the reduced image and for using the sampled pixel value as it is, and the bi-linear method, average pixel method, or the like for performing interpolation using pixels surrounding a position in the original image corresponding to a pixel in the reduced image. The nearest neighbor method is used when processing speed is given priority over image quality, and the bi-cubic method or average pixel method is used when giving priority to image quality over processing speed.

The mask memory 13*h* stores masks (filters) used when finding an average peripheral luminance of each pixel. The masks stored in the mask memory 13*h* include a reduced image mask Fs (see FIG. 9(*a*)), and an original image mask F (see FIG. 9(*b*)). In the embodiment, a plurality of reduced image masks Fs is stored in the ROM 12 and one reduced image mask Fs selected from the ROM 12 is read into the mask memory 13*h* as needed. In the embodiment, the original image mask F, on the other hand, is dynamically generated based on the reduced image mask Fs and stored in the mask memory 13*h*. The method of generating the original image mask will be described later with reference to FIG. 8.

Since the reduced image masks Fs are stored in the ROM 12, the each size of the reduced image mask Fs is preset to a predetermined size (9×9, for example). The size of the original image mask F is determined based on the size of the reduced image mask Fs and based on a reduction ratio of the reduced image relative to the original image.

After the size of the original image mask F is set, the Gaussian function is used to calculate filter coefficients constituting the original image mask based on distances from a position in the center (or substantially center) of the mask corresponding to a target pixel. The filter coefficients of the original image mask F are stored in the mask memory 13*h*.

The shift amount memory 13*i* stores: a decimal point position (shift amount) for performing convolution using the reduced image mask; and a decimal point position (shift amount) for performing convolution using the original image mask. In the convolution operation, the value (luminance value) of each pixel is multiplied by the filter coefficient corresponding to that pixel, and the products are added together. According to the present embodiment, the product of the pixel value and filter coefficient is calculated with a fixed decimal point, and therefore can be quickly performed. Each register can store results of calculations with a limited number of digits. Overflow may occur when adding the products if the decimal point position is set to a higher-order digit or to the left side. On the other hand, while there is no danger of overflow if the decimal point position is set to a lower-order digit or to the right side, sufficient precision cannot be obtained. Therefore, an optimal decimal point position must be set.

So, when the reduced image mask is set, an optimal decimal point position is calculated from the number of bits for pixel values (luminance values), the reduced image mask coefficients, and the like. Similarly, when the original image mask is set, an optimal decimal point position is calculated from the number of bits for pixel values, the original image mask coefficients, and the like. Each decimal point position is referred to as a shift amount, by which the position of the decimal point is shifted from a predetermined position (most significant bit (MSB) location, in this example) in each register. In this way, the shift amount is calculated for each of the reduced image mask Fs and the original image mask F and stored in the shift amount memory 13*i*.

The control panel 16 is provided with LCDs for indicating printing parameters and the like, and various buttons for setting printing parameters or parameters related to image processing and for indicating a desire to execute an image process or a printing process.

Figure 2:
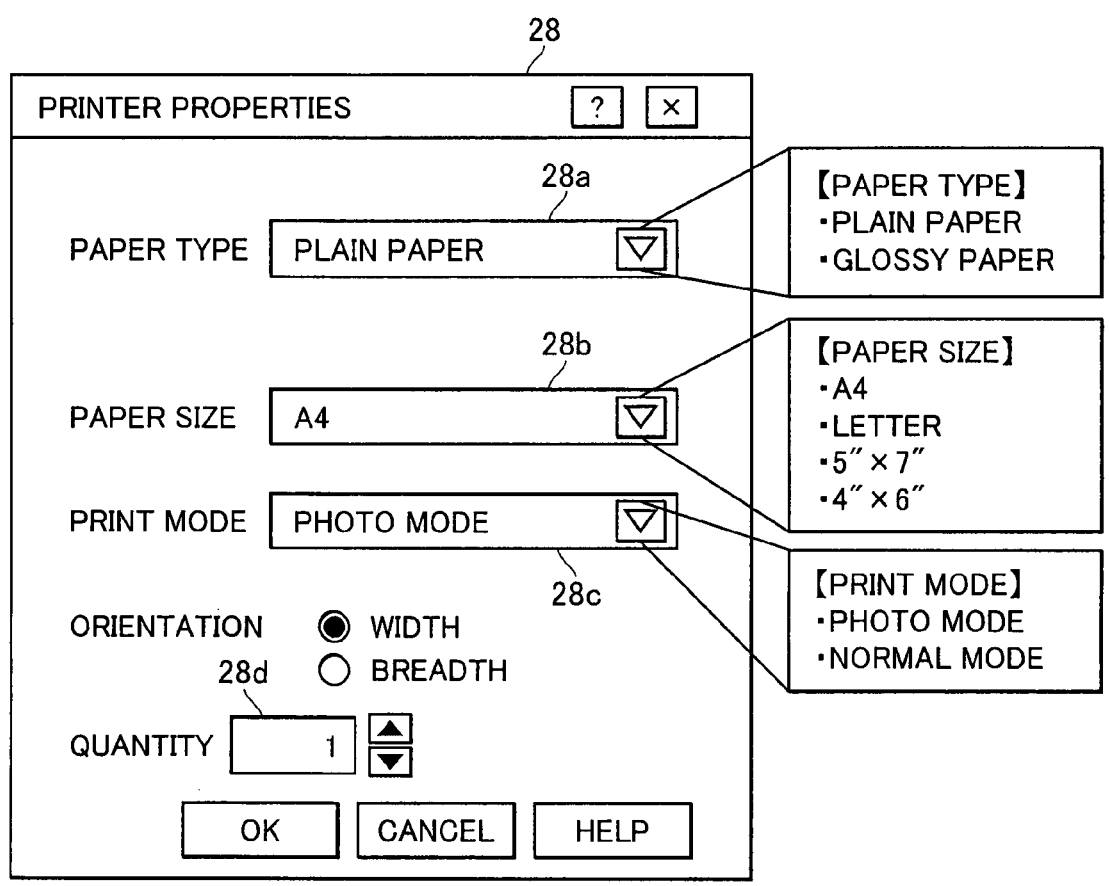
FIG. 2 is an explanatory diagram showing a window for setting printing parameters.

Next, various printing parameters set on the PC 2 connected to the printer 1 will be described with reference to FIG. 2. FIG. 2 shows a printing parameter setting window 28 displayed on a display unit of the PC 2 when the user selects an option to set the printing parameters.

The printing parameter setting window 28 includes a paper type selection box 28*a* for selecting a type of printing paper for the printing process, a paper size setting box 28*b* for setting the size of the paper, a print mode setting box 28*c* for setting the print mode, and a quantity setting box 28*d* for setting the quantity to be printed.

The paper type selection box 28*a* has a display area for displaying the selected paper type, and a downward-pointing triangular-shaped icon positioned in the right end of this display area. The user can display the pull-down menu shown in FIG. 2 by operating the mouse to align a cursor with the icon and performing a mouse click. By further aligning the cursor with an item in the subsequently displayed pull-down menu and clicking a button on the mouse, the user can select the item indicated by the cursor.

In the embodiment, the user can select plain paper or glossy paper as the paper type. Plain paper is currently selected in the example of FIG. 2.

Similarly, the paper size setting box 28*b* has an area displaying the selected paper size, and an icon indicating a pull-down menu for selecting a paper size. The user can select one of A4, letter, 5"×7", and 4"×6" as the paper size.

The print mode setting box 28*c* also has an area displaying the selected print mode, and an icon indicating a pull-down menu for selecting a print mode. The user can select either the photo mode or the normal mode as the print mode. The photo mode is used for printing in a higher quality than in the normal mode at a higher resolution. For example, the resolution in the photo mode is 1200×1200 dpi, while the lower resolution in the normal mode is 600×600 dpi. When the printer 1 is of an inkjet type, the printer 1 may be configured to use different droplet sizes and different types of ink based on the resolution.

The quantity setting box 28*d* is configured of an area for displaying the quantity to be printed. To the right of this area are provided an upward-pointing triangular-shaped incrementing icon for increasing the quantity, and a downward-pointing triangular-shaped decrementing icon for decreasing the quantity. The user can set the printing quantity by aligning the cursor with these icons and clicking the mouse.

In addition to the icons described above, the printing parameter setting window 28 also includes radio buttons for setting the orientation of the image printed on the paper, an OK button for making the settings effective while closing the settings window, a Cancel button for closing the settings window without making the settings effective, and a Help button for displaying a window with an explanation of the settings.

Printing parameters set on the PC 2 in this way are inputted into the printer 1 via the cable 5 and the interface 17 and stored in the printing parameter memory 13*e*.

Next, an image process executed on the CPU 11 will be described with reference to FIGS. 3 through 5. FIGS. 3 and 5 are flowcharts illustrating steps in the image process. The process shown in FIG. 3 is referred to as a pre-process in which the original image is reduced and a clipped range is set for normalizing the reflectance values for the original image based on the reduced image.

In S1 of the pre-process, the CPU 11 stores data indicating the original image size attached to the original image data in the original image size memory 13*d*. The shape of the original image is normally rectangular.

In S2 the CPU 11 reads parameters needed for setting the reduced image size and the reduction algorithm from the printing parameters stored in the printing parameter memory 13*e*. In the embodiment, printing parameters required for these settings are the print mode, paper type, and paper size.

In S3 the CPU 11 determines the reduced image size and the reduction algorithm based on these parameters and stores the determined reduced image size in the reduced image size memory 13*f* and the reduction algorithm in the reduction algorithm memory 13*g*. A reduced image will be formed based on the reduced image size and reduction algorithm determined in S3. The process of S3 will be described later in greater detail with reference to FIGS. 6 through 8.

In S4 the CPU 11 selects one reduced image mask Fs(x, y) from the plurality of the reduced image masks Fs(x, y) based on the size of the recording paper, the size of the original image and the printing mode (the photo mode or the normal mode). Further, in S4, the CPU 11 generates the original image mask F(x, y) based on the reduced image mask Fs(x, y) and stores the original image mask F in the mask memory 13*h*. This process will be described later with reference to FIG. 12.

The digital camera 21 or the PC 2 compresses image data according to the JPEG or other compression technique and sequentially stores horizontal lines of pixels in the rectangular image. In the process for forming the reduced image, in S6 the CPU 11 reads one line worth of the stored original image from the PC 2 or the like and stores this line unit in the original image memory 13*a* of the RAM 13.

In S7 the CPU 11 determines whether the number of lines of image data stored in the original image memory 13*a* is sufficient for performing reduction with the reduction algorithm stored in the reduction algorithm memory 13*g*. The required number of lines for performing reduction is one line if the reduction algorithm stored in the reduction algorithm memory 13*g* is the nearest neighbor method, two lines for the bi-linear method, three lines for the bi-cubic technique, and the number of lines corresponding to the reduction ratio for the average pixel method. If the number of lines stored in the original image memory 13*a* is insufficient for reduction (S7: NO), the CPU 11 returns to S6. When the number of lines is sufficient for reduction (S7: YES), then in S8 the CPU 11 forms a reduced image based on the reduction algorithm and in S9 stores this reduced image in a temporary area (not shown) of the RAM 13. After forming the reduced image, the CPU 11 overwrites data currently stored in the original image memory 13*a* with subsequent lines of data read for the original image, thereby reducing the required storage capacity of the original image memory 13*a*.

In S10 the CPU 11 determines whether all lines in the original image have been scanned to form the reduced image. If unprocessed lines remain (S10: NO), the CPU 11 returns to S6. However, if all lines have been processed (S10: YES), then in S11 the CPU 11 converts each pixel in the reduced image to a luminance component Y and color components Cb and Cr.

The luminance component Y and the color components Cb and Cr are calculated from the RGB values of the reduced image based on the following equation 1.

$$\begin{pmatrix} Y \\ Cb \\ Cr \end{pmatrix} = \begin{pmatrix} 0.30 & 0.59 & 0.11 \\ -0.17 & -0.34 & 0.51 \\ 0.51 & -0.43 & -0.08 \end{pmatrix} \begin{pmatrix} R \\ G \\ B \end{pmatrix} \quad \text{Equation 1}$$

The luminance signal Y and color signals Cb and Cr calculated above may be temporarily stored in the RAM 13 or the like to be used in subsequent processes. However, if it is desirable to reduce the storage volume, these values may be calculated in the above equation 1 by reading pixel values from the image as needed without storing the values in memory.

In S12, the CPU 11 calculates a reflectance Rs (x, y) from the luminance signal Y calculated above for one pixel at a location (x, y) in the reduced image, wherein x is the horizontal coordinate and y is the vertical coordinate. Here, the "s" is added to the end of symbols for indicating the reduced image as opposed to the original image. The reflectance Rs is calculated according to the following equation 2.

$$Rs(x, y) = \log \frac{Ys(x, y)}{Fs(x, y) * Ys(x, y)} \quad \text{Equation 2}$$

Here, Ys(x, y) is the intensity of the luminance signal Y at the coordinate (x, y) of the reduced image, Fs(x, y) is a filter coefficient of the reduced image mask at the coordinate (x, y), and "*" is the convolution operator. By calculating the value "Fs(x,y)*Ys(x,y)", a convolution operation is performed on the luminance signal for the target pixel (x,y) and the luminance signals for peripheral pixels, that surround the target pixel (x,y) and that is determined by the reduced image mask Fs (described later), thereby determining an average peripheral (or surrounding) luminance value for the target pixel (x,y). Further, log is the natural logarithm to the base "e". The CPU 11 performs this convolution operation by a fixed-point calculation, while setting the decimal point position based on the shift amount for the reduced image stored in the shift amount memory 13*i*. The obtained reflectance Rs(x, y) defines a Retinex image for the reduced image.

In S13, the CPU 11 stores the reflectance Rs (x, y) found in the above calculations in the reflectance memory 13b of the RAM 13.

In S14 the CPU 11 compares the reflectance Rs (x, y) obtained in S13 to maximum and minimum values of reflectance Rs (x, y) values obtained thus far. Specifically, the maximum and minimum values are both set to the reflectance Rs (x, y) found for the first coordinates. All reflectance Rs (x, y) values subsequently obtained are compared with the current maximum and minimum values. If the current reflectance Rs (x, y) is greater than the maximum value, then this reflectance Rs (x, y) is set as the new maximum value. Similarly, if the current reflectance Rs (x, y) is less than the minimum value, then this reflectance Rs (x, y) is set as the new minimum value. When the current reflectance Rs (x, y) is less than the maximum value and greater than the minimum value, the maximum and minimum values remain unchanged.

In S15, the CPU 11 determines whether the process in S12-S14 has been completed for all coordinates in the reduced image. If unprocessed coordinates remain (S15: NO), the CPU 11 returns to S12. However, if the process has been completed for all coordinates (S15: YES), then in S16 the CPU 11 normalizes the reflectance Rs (x, y) values based on the maximum and minimum values obtained in S14 and forms a histogram in the histogram memory 13c.

In S17 the CPU 11 finds a median value M from the histogram formed in S16 and in S18 sets a clipped range of reflectance Rs (x, y) values (normalization parameters) based on the median value M and the histogram.

FIG. 4 is a histogram in which the reflectance Rs (x, y) found in the equation 2 for all coordinates is normalized to be mapped on a scale of 256 levels with a minimum value of 0 and a maximum value of 255. Specifically, the normalization is achieved through a process of setting the minimum reflectance Rs (x, y) among all coordinates to 0 and the maximum value to 255 and linearly setting all reflectance Rs (x, y) values for other coordinates to integers between 0 and 255. The histogram is formed in the histogram memory 13c by tabulating the frequency of pixels indicating each computed value between the maximum and minimum values.

From this histogram, a median value M is found. An upper value U and a lower value D are set based on the median value M so that a 45% portion of all the pixels have values falling in a range from the median value M to the upper value U and so that another 45% portion of all the pixels have values falling in a range from the lower value D to the median value M. This ensures that a 5% portion of all the pixels have values greater than the upper value U, and another 5% portion of all the pixels have values smaller than the lower value D. A reflectance Rs(x, y) corresponding to the upper value U is set as an upper limit reflectance value UpR, and a reflectance Rs(x, y) corresponding to the lower value D is set as a lower limit reflectance value DownR. The upper limit reflectance value UpR and lower limit reflectance value DownR determine the upper and lower limits of a clipped range, respectively, and are set as the normalization parameters.

Next, a post-process performed based on the clipped range found in the pre-process of FIG. 3 will be described with reference to FIG. 5. The post-process is a Retinex process performed on the original image. FIG. 5 is a flowchart illustrating steps in this Retinex process. The post-process is performed on each pixel in the original image and sequentially outputs processed pixel values (RGB values) to the printing unit 15.

In S21 at the beginning of the process, the CPU 11 finds the luminance signal Y for a pixel at a location (x, y) in the original image based on the equation 1. At this time, color signals Cb and Cr are also obtained for the subject pixel. The CPU 11 further calculates the reflectance R (x, y) for the subject pixel based on the luminance signal Y and based on the following equation 3.

$$R(x, y) = \log \frac{Y(x, y)}{F(x, y) * Y(x, y)} \qquad \text{Equation 3}$$

Here, Y(x, y) is the intensity of the luminance signal Y at the coordinate (x, y) of the original image, F(x, y) is a filter coefficient of the original image mask at the coordinate (x, y), and "*" is the convolution operator. By calculating the value "F(x,y)*Y(x,y)", a convolution operation is performed on the luminance signal for the target pixel (x,y) and the luminance signals for peripheral pixels, that surround the target pixel (x,y) and that is determined by the original image mask F (described later), thereby determining an average peripheral (or surrounding) luminance value for the target pixel (x,y). Further, log is the natural logarithm to the base e. The CPU 11 performs this convolution operation by a fixed-point calculation, while setting the decimal point position based on the shift amount for the original image stored in the shift amount memory 13i. The obtained reflectance R(x, y) defines a Retinex image for the original image.

In S22 the CPU 11 normalizes the reflectance R (x, y) based on the clipped range, which has been found in S18 of FIG. 3 using the reduced image, to obtain a normalized reflectance refle(x, y).

Specifically, the normalized reflectance (normalized Retinex value) refle(x, y) is set to 0.0 when the value of reflectance R (x, y) is less than or equal to the value DownR (lower limit of the clipped range), is set to 1.0 when the value of reflectance R (x, y) is greater than or equal to the value UpR (upper limit of the clipped range), and is calculated based on the following equation 4 when the value of reflectance R (x, y) is greater than DownR and less than UpR.

$$refle(x, y) = \frac{R(x, y) - DownR}{UpR - DownR} \qquad \text{Equation 4}$$

It is noted that the calculation result "refle(x, y)" of Equation 4 is further added with 0.3 and the added result is substituted for the value "refle(x, y)". This ensures that the value "refle(x, y)" falls in a range of 0.3 to 1.3.

The following table shows the difference between a clipped range (upper limit UpR and lower limit DownR) found based on the reduced image, and a clipped range found based on the original image by experiments. In the experiments, the clipped range (upper limit UpR and lower limit DownR) was determined based on the reduced image by executing the processes of S12-S18 on the reflectance values Rs(x, y) in the reduced image. The clipped range (upper limit UpR and lower limit DownR) was determined also based on the original image by executing processes the same as the processes of S12-S18 on the reflectance values R(x, y) in the original image in place of the reflectance values Rs(x, y) of the reduced image.

TABLE 1

| | Clipped range | | Maximum/Minimum values | |
|---|---|---|---|---|
| | Upper limit | Lower limit | Maximum value | Minimum value |
| Original image | 0.825 | −0.822 | 2.712 | −4.063 |
| Reduced image | 0.742 | −0.755 | 1.729 | −2.607 |
| Difference | 0.083 | 0.067 | 0.983 | 1.456 |

As shown in this table, the maximum value of reflectance values R(x, y) for the original image is 2.712, and the minimum value −4.063, while the maximum value of reflectance values Rs(x, y) for the reduced image is 1.729, and the minimum value −2.607. Hence, the difference between the maximum reflectance for the original image and the maximum reflectance for the reduced image is 0.983, and the difference between the minimum reflectance for the original image and the minimum reflectance for the reduced image is 1.456. These differences are considerably large.

However, the upper limit of the clipped range found based on the reflectance values R(x, y) of the original image is 0.825 and the lower limit −0.822, while the upper limit found based on the reflectance values Rs(x, y) of the reduced image is 0.742 and the lower limit −0.755. Hence, the difference between the upper limit of the clipped range for the reflectance values for the original image and the upper limit of the clipped range for the reflectance values for the reduced image is 0.083, while the difference between the lower limit of the clipped range for the reflectance values for the original image and the lower limit of the clipped range for the reflectance values for the reduced image is 0.067. These differences are small.

Since there is no great difference between the clipped range found based on the reduced image and the clipped range found based on the original image, the clipped range found based on the reduced image can be applied to the original image.

In S23 the CPU 11 performs the Retinex process on luminance Y(x, y) using refle(x, y) in the following equation 5 to obtain a Retinex-corrected luminance value Yout(x, y) (luminance signal Y). Here, γ is an arbitrary constant normally set to 1.5.

$$Yout(x, y) = \frac{Y(x, y)}{\left(\frac{Y(x, y)}{255 \times refle(x, y)}\right)^{(1-1/\gamma)}} \quad \text{Equation 5}$$

In S24 the CPU 11 converts the Retinex-corrected luminance value Yout(x, y) and the color signals Cb and Cr obtained in S21 to RGB values, using the following equation 6.

$$\begin{pmatrix} R \\ G \\ B \end{pmatrix} = \begin{pmatrix} 1.0 & 0 & 1.37 \\ 1.0 & -0.34 & -0.70 \\ 1.0 & 1.73 & 0 \end{pmatrix} \begin{pmatrix} Yout \\ Cb \\ Cr \end{pmatrix} \quad \text{Equation 6}$$

In the process described above, the CPU 11 executes the Retinex process on a luminance signal for the original image and finds pixel values by converting the Retinex-processed luminance signal and the color signals back to RGB values.

In S25 the CPU 11 outputs the processed pixel values to the printing unit 15.

Hence, by identifying the clipped range for performing normalization in the pre-process, the CPU 11 can sequentially process each pixel and output the results to the printing unit 15 in the post-process, thereby reducing the time from the start of image processing to the start of the printing operation.

In S26 the CPU 11 determines whether the above process has been completed for all pixels in the original image. If some unprocessed pixels remain (S26: NO), then the CPU 11 returns to S21. However, if the process has been completed for all pixels (S26: YES), then the CPU 11 ends the post-process.

In this way, the printer 1 of the embodiment uses the clipped range found in the pre-process based on reflectance values Rs(x, y) of the reduced image to find a clipped range for normalizing reflectance values R(x, y) in the original image. Through this process, the printer 1 can find the clipped range in fewer operations than the number of operations required to find the clipped range for the original image, thereby improving processing speed. Further, since the reduced image having fewer pixels than the original image is stored in the temporary area of the RAM 13, the storage capacity need not be as large as when storing the original image.

More specifically, now assume that a clipped range is determined based on the original image. In such a case, the reflectance R (x, y) values must be stored for all the pixels of the original image. An enormous amount of storage capacity will be necessary for storing the reflectance R (x, y) values found through logarithmic computations. Further, since the number of logarithmic computations on the reflectance R (x, y) increases according to the volume of reflectance R (x, y) data, the length of time required before the computer can begin outputting the processed image will increase according to the size of the original image.

Next, the process in S3 of FIG. 3 for determining the reduced image size and reduction algorithm will be described with reference to FIGS. 6 through 8.

As described above, it is possible to determine a clipped range quickly and to perform image processing with a small storage capacity by reducing the original image, determining a clipped range based on the reduced image, and performing a correction process on pixels in the original image based on this clipped range. However, in some cases, it is not possible to set an appropriate clipped range, such as when the reduced image is smaller than necessary, and when the quality of the reduced image is too much degraded. On the other hand, if the reduced image is set to a larger size than necessary or if the quality of the reduced image is set higher than necessary, processing will require a greater length of time, reducing processing speed. Therefore, a reduced image size and reduction algorithm must be selected to suit the user-specified printing parameters and the like.

FIGS. 6 and 7 are look-up tables used to set the reduced image size and reduction algorithm based on the printing mode, paper type, paper size, and original image size. FIG. 6 is a look-up table used for the photo mode, while FIG. 7 is a look-up table used for the normal mode. These tables are stored in the LUT memory 12c of the ROM 12 and are referenced in the process described in the flowchart of FIG. 8.

The table in FIG. 6 is selected when the print mode has been set to the photo mode. Choices for the reduced image size and the reduction algorithm are first categorized by paper type. In the embodiment, the categories of paper type include glossy paper and plain paper, but may also include other categories, such as inkjet paper.

After paper type, the selections are categorized by paper size, in order from smallest to largest. In this example, the categories of paper size are 4"×6", 5"×7", letter, and A4. Each paper size is further categorized by original image size. In this example, possible original image sizes for the input image are 600×800, 1200×1600, and 2400×3200 (pixels). The reduced image size and reduction algorithm are set based on these sizes.

In the embodiment, the reduced image size can be set to one of three selections, 150×200, 300×400, and 450×600, while the reduction algorithm can be set to one of three types, the average pixel method (ME), the bi-linear method (BL), and the nearest neighbor method (NN). The table in FIG. 7 is used when the printing mode has been set to the normal mode. As in the photo mode, selections are categorized by paper type, paper size, and original image size, and the reduced image size and reduction algorithm are set based on these values.

Figure 8:
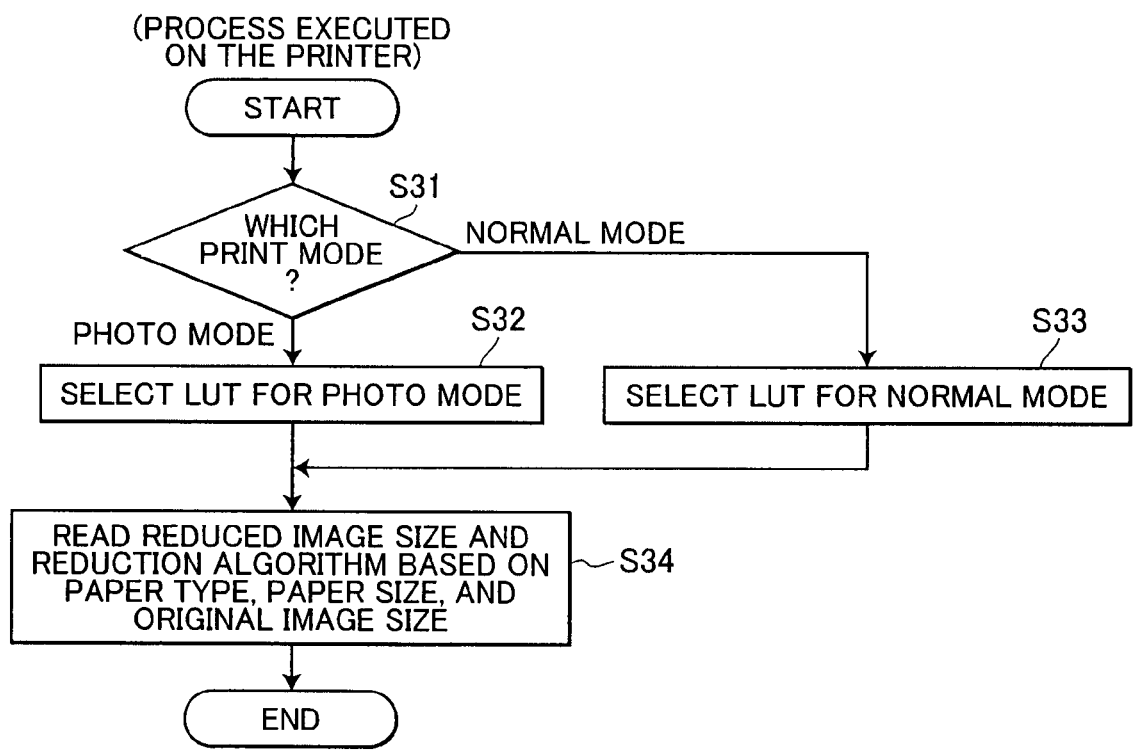
FIG. 8 is a flowchart illustrating steps in a process for referencing the tables.

FIG. 8 is a flowchart illustrating steps in the process of S3 shown in FIG. 3. In S31 of this process, the CPU 11 determines whether the print mode selected as a printing parameter has been set to the photo mode or the normal mode. The CPU 11 selects the table for the photo mode in S32 if the print mode has been set to the photo mode, and selects the table for the normal mode in S33 when the print mode has been set to the normal mode. In S34 the CPU 11 reads the reduced image size and reduction algorithm set corresponding to the paper type and paper size set as printing parameters and the original image size stored in the original image size memory 13d, and stores the reduced image size and reduction algorithm in the reduced image size memory 13f and the reduction algorithm memory 13g, respectively.

Next, the original image mask F and the reduced image mask Fs will be described in detail. Each of original image mask F and the reduced image mask Fs is a filter for calculating the average peripheral luminance for a target pixel and must cover a region of a prescribed size including the target pixel and peripheral pixels surrounding the target pixel. However, when the mask has filter coefficients for all coordinates in this region, an enormous number of calculations must be performed in the convolution operation. Therefore, some of the filter coefficients are skipped to reduce the number of calculations.

Figure 9B:
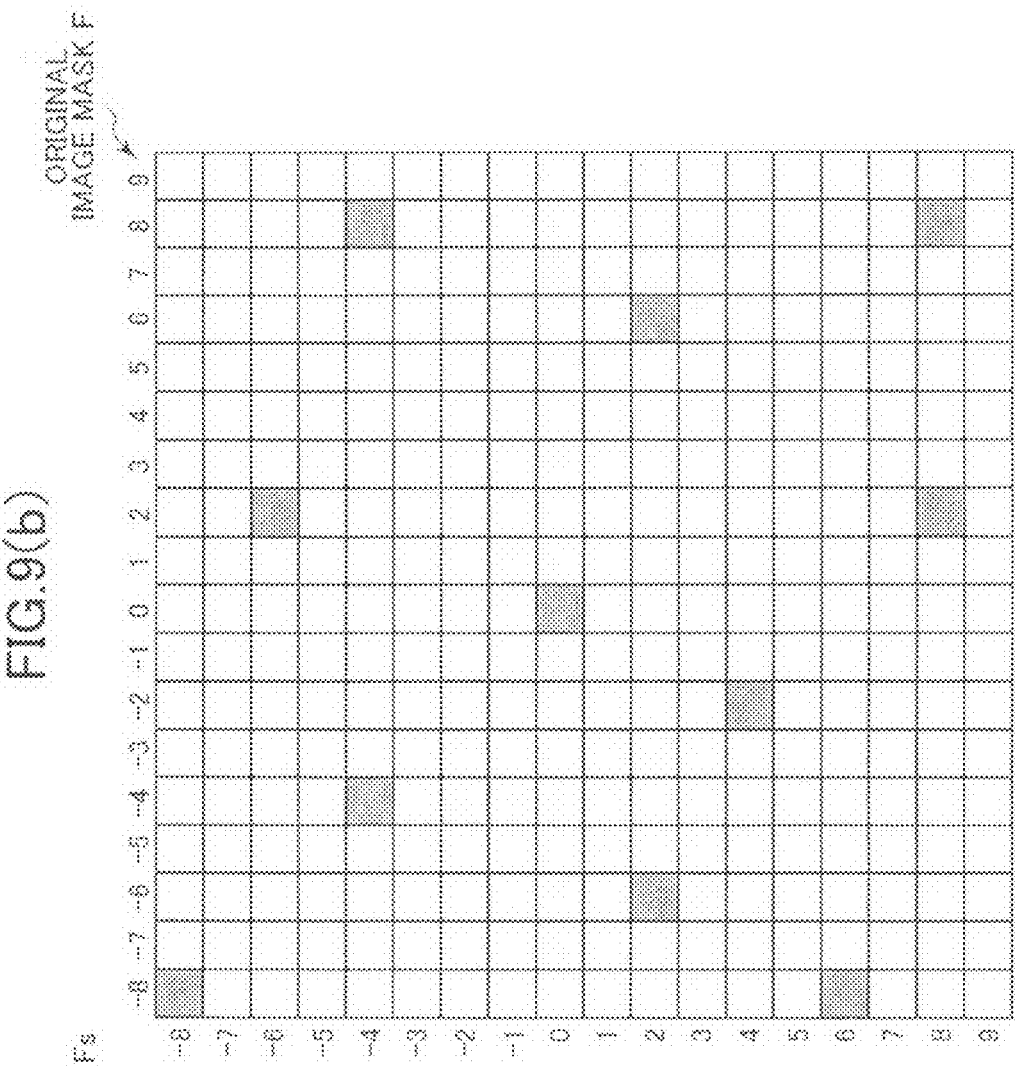
FIG. 9(b) is an explanatory diagram conceptually illustrating coordinates in the region of the original image mask having filter coefficients.
Figure 9A:
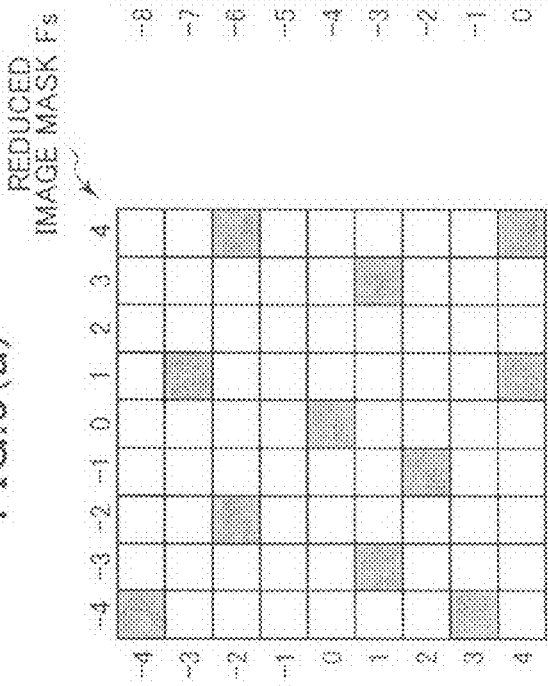
FIG. 9(a) is an explanatory diagram conceptually illustrating coordinates in the region of the reduced image mask having filter coefficients.

FIG. 9(a) is a conceptual view of the reduced image mask Fs indicating which coordinates in the region have filter coefficients, while FIG. 9(b) is a conceptual diagram of the original image mask F indicating which coordinates in the region have filter coefficients. Each of the original image mask F and the reduced image mask Fs defines a region for finding an average peripheral luminance for a target pixel. Hereinafter, the size of this region is referred to the size of the mask. The masks (the original image mask F and the reduced image mask Fs) have a rectangular shape in the present embodiment. Thus, the horizontal size of the mask means a horizontal distance (the number of pixels in the horizontal direction) and the vertical size of the mask means a vertical distance (the number of pixels in the vertical direction) of the mask. The "size of the original image mask" or the "size of the reduced image mask" is the size of the calculating region for calculating average peripheral luminance, and expressed by (the horizontal size)×(the vertical size), for example 9×9, included in the calculating region in the embodiment. Further, the shape of the mask is not limited to a rectangular shape, but may be a circular shape or other non-rectangular shape. In such a case, the size of the mask will denote the size of a rectangular region inscribed in the mask.

As described above, the average peripheral luminance is found in order to find a reflectance value for each pixel. The average peripheral luminance is an average value of pixels around the target pixel. The region of pixels whose values are reflected in the average peripheral luminance, or "peripheral pixels," is determined by the size of the mask. The coverage of a mask is a ratio of the mask size to the size of the image targeted by the mask. For example, if the length of each side of an original image mask is 100 and the length of each side in the original image is also 100, the coverage of the original image mask is 1.

In the reduced image mask Fs and the original image mask F in FIGS. 9(a) and 9(b), coordinates associated with filter coefficients (reference points) are indicated in gray, while coordinates not associated with filter coefficients (skipped points) are white. In other words, the original image mask F and the reduced image mask Fs have filter coefficients for pixels indicated in gray. The number of the reference point P is the number of coordinates (points) which are associated with the filter coefficients. As shown in FIGS. 9(a) and 9(b), the numbers of the reference point P of the reduced image mask and the original image mask are 11. When using the original image mask F or reduced image mask Fs, the values of pixels corresponding to coordinates indicated in gray are multiplied by the corresponding filter coefficients so as to be reflected in the peripheral luminance. Values of pixels corresponding to white coordinates are skipped and, hence, not multiplied by a filter coefficient. Therefore, these values are not reflected in the peripheral luminance. Since the number of calculations in the convolution operation would be enormous if all pixels in the region covered by the mask were multiplied by filter coefficients, some of the filter coefficients are suitably skipped in order to reduce the number of calculations. Coordinates in each region of the reduced image mask Fs and the original image mask F are determined in the embodiment by setting the center position of the mask to be aligned with the target pixel as the coordinate (0, 0) (point of origin).

The filter coefficient corresponding to each coordinate depicted in gray is determined based on the distance from the coordinate (0, 0) using a Gaussian function. However, this method of determining filter coefficients is well known in the art and will not be described herein.

Figure 10:
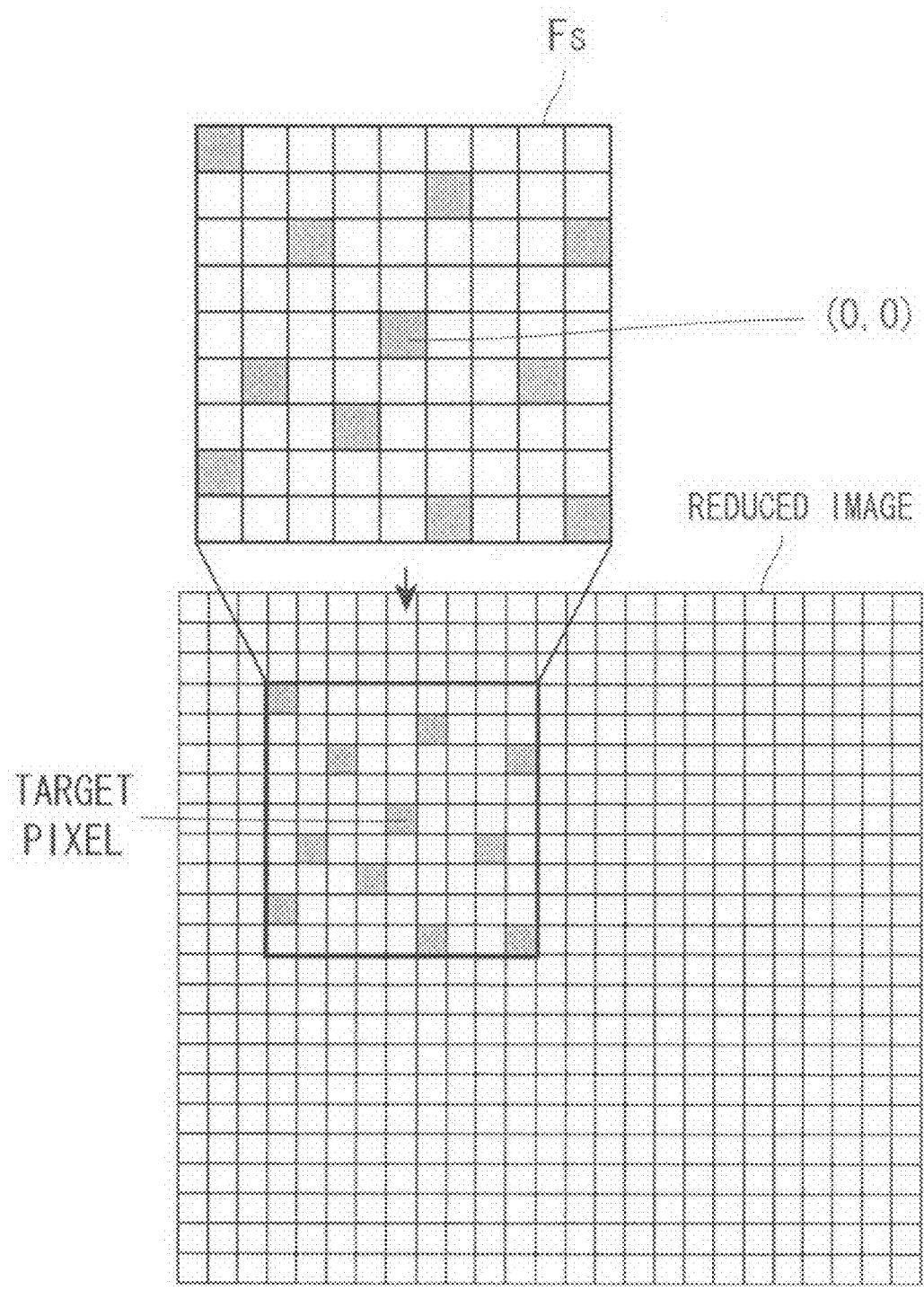
FIG. 10 conceptually illustrates how to obtain an average peripheral luminance for a target pixel in a reduced image by using the reduced image mask.

In the example shown in FIG. 9(a), the reduced image mask Fs has a region including a total of 81 (9×9) coordinates (points) Of these, 11 coordinates have filter coefficients, while the remaining 70 (=81-11) coordinates (points) do not have filter coefficients. As shown in FIG. 10, when the convolution operation is performed, the reduced image mask Fs covers a region of 9×9 pixels in the reduced image by aligning the center position of the mask (0.0) with a target pixel of the reduced image. The luminance of the 11 pixels including the target pixel are multiplied by their corresponding filter coefficients so their values are reflected in the average peripheral luminance. However, the luminance of the remaining 70 pixels are not multiplied by filter coefficients and, hence, not incorporated in the average peripheral luminance. In other words, the luminance values of the remaining 70 pixels can be skipped when calculating the average peripheral luminance with this reduced image mask Fs.

Average peripheral luminance values are obtained for all pixels in the reduced image by performing convolution operations while shifting the reduced image mask Fs relative to the reduced image. In order to obtain the average peripheral luminance for one target pixel, as shown in FIG. 10, the reduced image mask Fs having a size of 9×9 pixels is aligned with 9×9 pixels in the reduced image while aligning the certain point (central point in this example) of the reduced image mask Fs on the target pixel in the image, and filter coefficients at the reference points are multiplied by the values of pixels corresponding to the reference points (hereinafter referred to as "reference pixels") so that these values are incorporated in the reflectance value. Values of pixels corresponding to skipped points (hereinafter referred to as "skipped pixels") are skipped and not incorporated in the calculation of the average peripheral luminance. By skipping some of the pixel values in this way, it is possible to reduce the processing load for the calculations.

The reduced image mask Fs described above is merely one example. In the embodiment, a plurality of the reduced image masks Fs having different sizes, filter coefficients, and skipping rates (the ratio of coordinates associated with filter coefficients to the total number of coordinates) is stored in the ROM 12. An optimum reduced image mask Fs is selected in S4 from the reduced image masks Fs stored in the ROM 12 based on the reduced image size and the reduction algorithm determined in S3 of the pre-process (see FIG. 4). The selected reduced image mask Fs is read into the mask memory 13h and used for the subsequent process.

FIG. 9(b) conceptually illustrates the original image mask F generated by enlarging the reduced image mask Fs read into the mask memory 13h. Here, "enlarging" indicates a process for creating the original image mask F from the reduced image mask Fs through proportional enlargement, in which the aspect ratio of the original image mask F is the same as the aspect ratio of the reduced image mask Fs, and the ratio of distances between any two points having filter coefficients is fixed between the original image mask F and reduced image mask Fs. In other words, a ratio of a distance between any two points in the reduced image mask Fs and a distance between corresponding two points in the original image mask F is equal to the reduction ratio between the reduced image and the original image. The reduction ratio is a homothetic ratio of the reduced image to the original image. In other words, the reduction ratio is a ratio between the one-dimensional size of the reduced image and the original image. The original image mask F is generated so that the horizontal size and the vertical size of the original image mask F are obtained by respectively dividing the horizontal size and the vertical size of the reduced image mask Fs by the reduction ratio. For example, if the reduction ratio is ½ and the reduced image mask Fs has a size covering a region of 9×9 pixels in the reduced image, the original image mask F is set to a size for covering a region of 18×18 pixels in the original image. In this way, the coverage (ratio of the region covered by the mask to the overall image) of the original image mask is equivalent to the coverage of the reduced image mask. Hence, the distribution of reflectance values obtained from the original image is very similar to the distribution of reflectance values obtained from the reduced image, making it possible to obtain an appropriate clipped range (a clipped range very similar to the clipped range obtained from the original image) from the results of tabulating reflectance values for the reduced image to obtain highly precise output.

Similar to the reduced image, an average peripheral luminance for each pixel in the original image is obtained by performing convolution operation while shifting the original image mask relative to the original image. In order to acquire one reflectance value, the original image mask having a size of 18×18 pixels is aligned with 18×18 pixels in the original image. More specifically, the center position (0, 0) of the original image mask F is aligned with a target pixel of the original image, and filter coefficients at the reference points are multiplied by the values of reference pixels corresponding to the reference points, while values of skipped pixels corresponding to skipped points are skipped.

Figure 11:
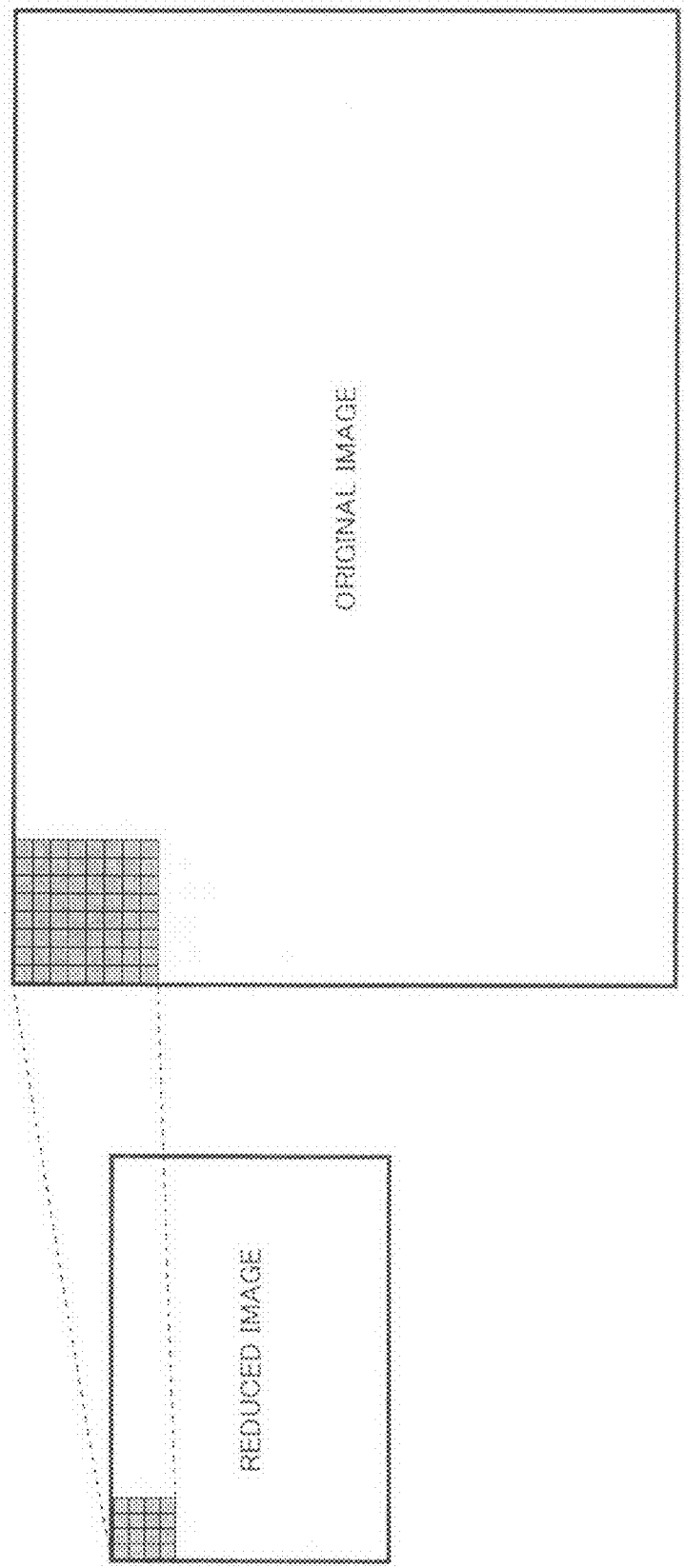
FIG. 11 is an explanatory diagram conceptually illustrating a reduced image and the original image.

Next, the coverage of the masks will be described in detail with reference to FIG. 11, where the reduced image is shown on the left side and the original image on the right side. The gray regions in both image represent the masks. Here, the ratio of the surface area of the original image covered by the original image mask to the overall original image when the center of the mask is aligned with a target pixel is equivalent to the ratio of the surface area in the reduced image covered by the reduced image mask to the overall reduced image when the center of the mask is aligned with the target pixel. In other words, the percentage of the size of the reduced image mask to the original image mask is equivalent to the percentage of the size of the overall reduced image to the overall original image.

As shown in FIG. 9(b), coordinates in the reduced image mask Fs at which filter coefficients exist are converted to coordinates in the original image mask F at which filter coefficients exist by dividing the coordinates in the reduced image mask Fs by the reduction ratio. For example, if a filter coefficient is set in the coordinates (−2, −2) in the reduced image mask Fs and the reduction ratio is ½, a filter coefficient is set to the coordinates (−4, −4) in the original image mask when generating the original image mask F. In this way, the original image mask F can be generated so that ratio of the distance between any two points associated with filter coefficients in the reduced image mask Fs to the distance between corresponding points in the original image mask F have same value, and is equal to the reduction ratio. Especially, when using an algorithm according to the nearest neighbor method to form a reduced image, the value of one pixel nearest a position in the original image corresponding to a pixel in the reduced image is sampled and directly used as the value of the pixel in the reduced image. Hence, by dividing coordinates in the reduced image mask Fs by the reduction ratio to produce coordinates in the original image mask F, as described above, it is possible to match pixels in the reduced image reflected in the average peripheral luminance with values of pixels in the original image reflected in the average peripheral luminance, thereby obtaining a very suitable clipped range.

Figure 12:
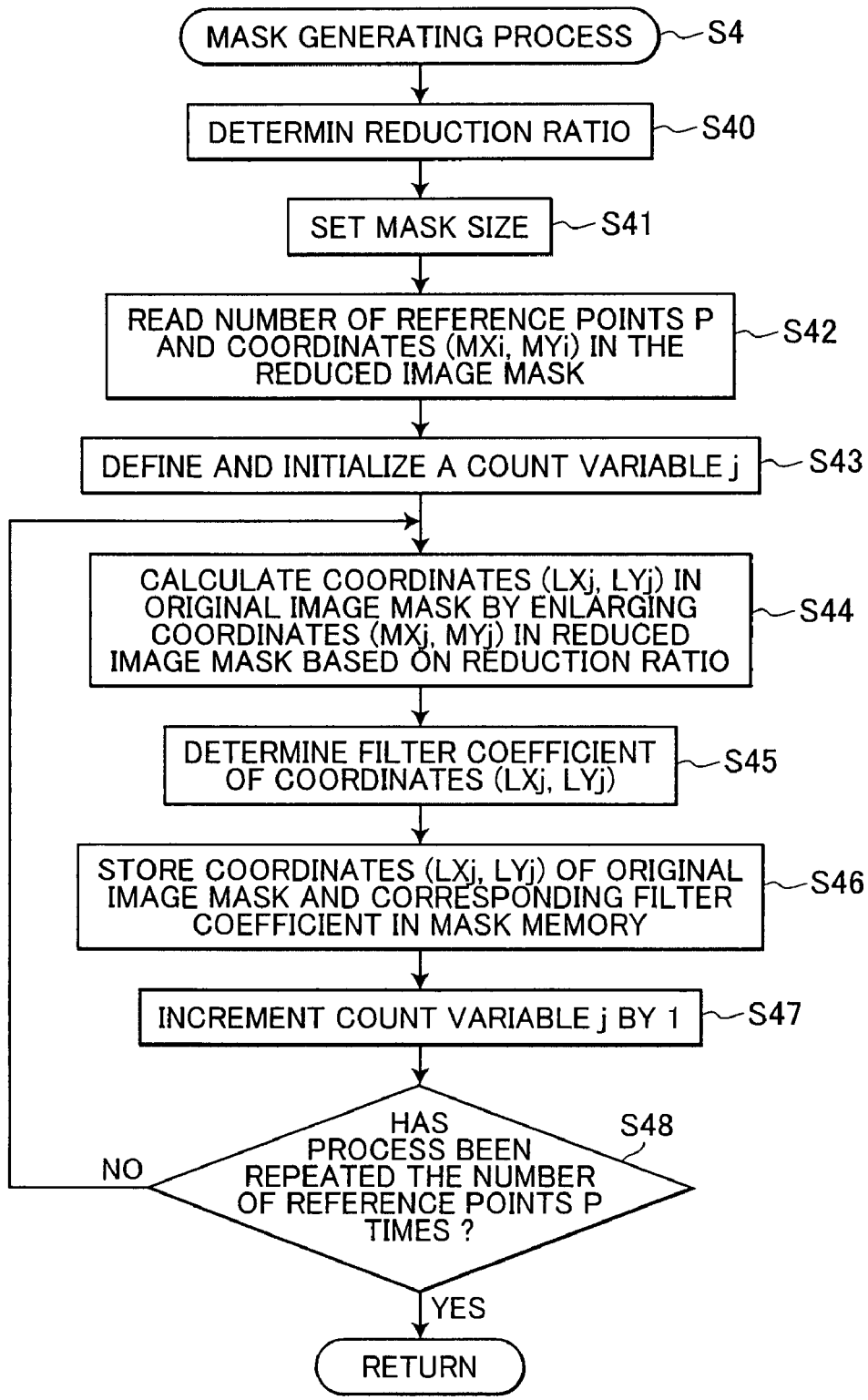
FIG. 12 is a flowchart illustrating steps in a mask generating process according to the first embodiment.

Next, the mask generating process (S4) will be described with reference to FIG. 12. FIG. 12 is a flowchart illustrating steps in the mask generating process for generating the original image mask F based on the reduced image mask Fs. In the following description, the reduced image mask Fs used for generating the original image mask F has been read from the ROM 12 and stored in the mask memory 13h. In S40 of the mask generating process, the CPU 11 determines the reduction ratio. The reduction ratio is obtained by dividing the vertical length of the reduced image stored in the reduced image size memory 13f by the vertical length of the original image stored in the original image size memory 13d or by dividing the horizontal length of the reduced image stored in the reduced image size memory 13f by the horizontal length of the original image stored in the original image size memory 13d.

In S41 the CPU 11 sets the size of the original image mask obtained by dividing each of the vertical length and horizontal length of the size of the reduced image mask by the reduction ratio.

In S42 the CPU 11 reads the total number of the reference points P in the reduced image mask Fs and the coordinates of these reference points (MXi, MYi, where $0 \leq i \leq P-1$) from the mask memory 13h. A reference point indicates coordinates at which a filter coefficient exists.

In S43 the CPU 11 defines a count variable j and initializes the count variable j to zero (0). In S44 the CPU 11 calculates coordinates (LXj, LYj) for a reference point in the original image mask by dividing the coordinates (MXj, MYj) of a reference point in the reduced image mask Fs by the reduction ratio obtained in S40. In other words, the CPU 11 enlarges the reduced image mask Fs by multiplying the coordinates (MXj, MYj) by the inverse of the reduction ratio.

In S45 the CPU 11 determines a filter coefficient for the coordinates (LXj, LYj) in the original image mask F and in S46 stores the coordinates in association with the filter coefficient of the original image mask F in the mask memory 13h. The method of calculating the filter coefficient using a Gaussian function is well known in the art and will not be described herein.

In S47 the CPU 11 increments the count variable j by 1. As long as the count variable j is smaller than the number of reference points P (S48: NO), the CPU 11 repeats the above process from S44 for the next coordinates. When j=P after repeating the above process the number of reference points P times (S48: YES), the CPU 11 ends the mask generating process.

According to the mask generating process of the embodiment, since the coordinates found for the reference points in the original image mask are obtained by dividing the coordinates for the reference points in the reduced image mask by the reduction ratio, the distribution of reflectance values obtained from the reduced image is very similar to the distribution of reflectance values obtained from the original image, thereby enabling the CPU 11 to acquire a suitable clipped range (a clipped range very similar to the clipped range obtained from the original image) from the reduced image.

According to the embodiment described above, the printer 1 forms a reduced image, finds average peripheral luminance values and reflectance values in the reduced image using the reduced image mask Fs, and finds a clipped range, that is, the normalization parameter values. Next, the printer 1 finds average peripheral luminance values and reflectance values for the original image using the original image mask F, and normalizes the reflectance values in the original image using the clipped range acquired for the reduced image. Hence, the printer 1 can reduce the number of calculations required for finding the clipped range, thereby performing the Retinex process quickly and conserving the amount of the RAM 13 used.

Further, the printer 1 determines the size of the original image mask F based on the size of the reduced image mask Fs and generates the original image mask F based on this size. In this way, the printer 1 can generate the original image mask F using less amount of the ROM 12 than when storing the original image mask F in the ROM 12. The printer 1 can also maintain the reduced image mask Fs at an appropriate size that is not too small.

Since the ratio of the size of the reduced image mask Fs to the size of the reduced image is the same as the ratio of the size of the original image mask F to the size of the original image, the printer 1 can acquire suitable normalizing parameters and can perform the Retinex process with great precision.

Further, since the printer 1 generates the original image mask F by enlarging the reduced image mask Fs, the printer 1 can allocate a region in the RAM 13 for the reduced image size memory 13f regardless of the reduction ratio and can set suitable parameters (the normalization parameters), thereby acquiring highly precise output.

Figure 13:
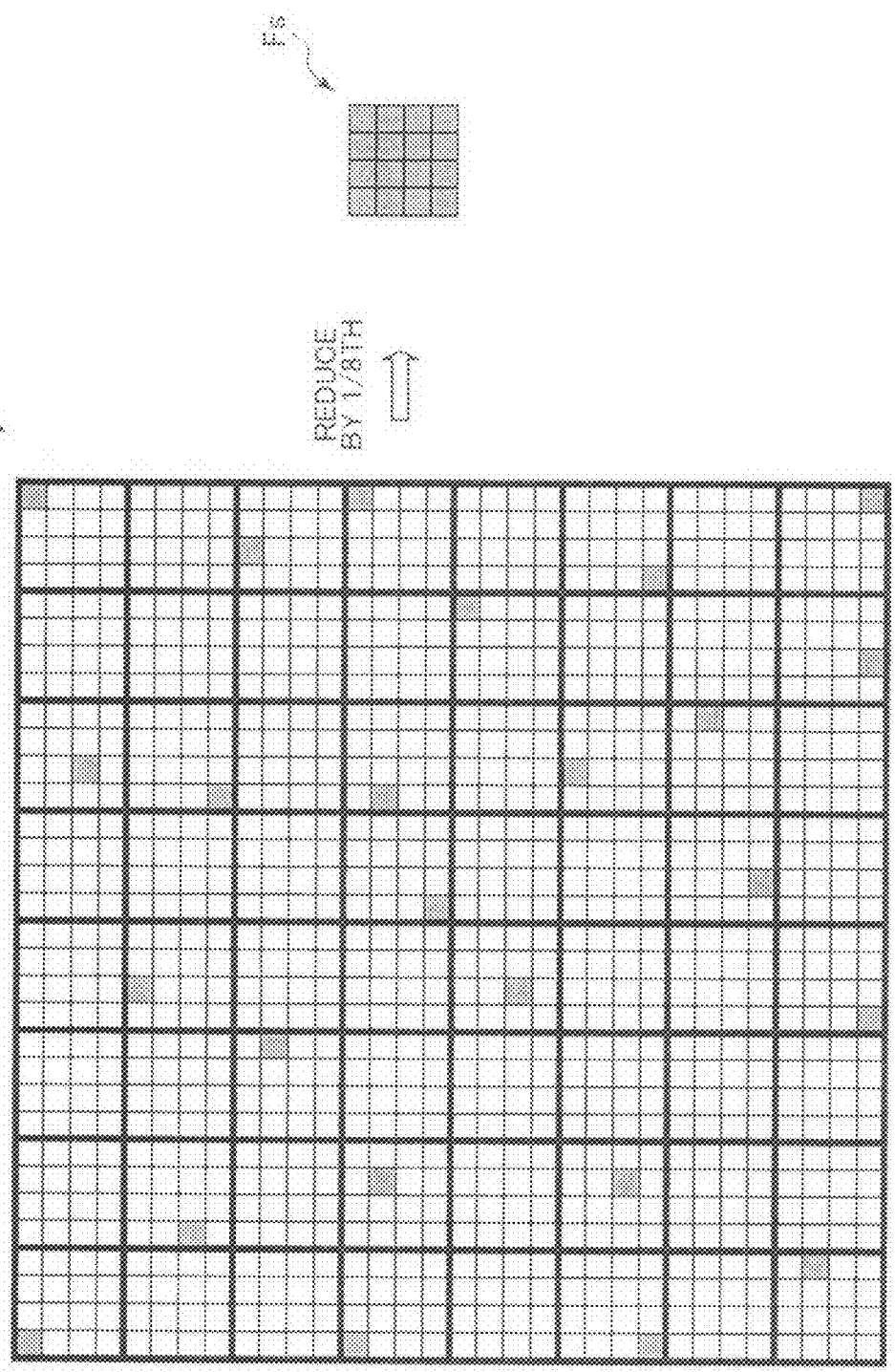
FIG. 13 is an explanatory diagram conceptually illustrating a comparative example of an original image mask and a reduced image mask obtained by reducing the original image mask by ⅛.

It is noted that, as shown in FIG. 13, problems can occur in the case where the reduced image mask is generated by reducing the original image mask at the reduction ratio and the reduction ratio is very large. That is, when the reduced image is very small relative to the original image, the reduced image mask will be too small, making it impossible to obtain suitable calculation results. This type of problem is particularly pronounced in the case described below.

FIG. 13 conceptually illustrates a comparative example of a set of original image mask F, and a reduced image mask Fs. In this comparative example, the reduced image mask Fs is obtained by reducing the vertical length and horizontal length of the original image mask F by ⅛ each.

In the original image mask F, value of only a portion of pixels around a target pixel are reflected in the average peripheral luminance in the original image. On the other hand, since the reduced image mask Fs is produced simply by reducing the original image mask F by ⅛, filter coefficients are provided for all coordinates of the reduced image mask Fs. Thus, values for all peripheral pixels in the reduced image mask Fs are reflected in the average peripheral luminance. As a result, the distribution of reflectance values acquired from the original image is considerably different from the distribution of reflectance values acquired from the reduced image and, hence, normalization parameters obtained by tabulating reflectance values in the reduced image are unsuitable for correcting luminance values in the Retinex process.

Further, problems can occur in another case where there is no relation between the original image mask F and the reduced image mask Fs. For example, when performing the Retinex process on a backlit image of a striped pattern (such as an image taken of a cage from a front side and at a distance, with a light source provided on the back side), difference between luminance values of adjacent pixels is very large in the stripe area. Thus, the reflectance will vary largely when the reference pixel in the stripe area is shifted even by only one pixel. Consequently, the distribution of reflectance values acquired from the original image may be considerably different from the distribution of reflectance values acquired from the reduced image.

However, in the present embodiment, since the original image mask F is generated by enlarging the reduced image mask Fs by the inverse of the reduction ratio of the reduced image relative to the original image, the above described problems are prevented. Further, the printer 1 can associate the region of the reduced image covered by the reduced image mask Fs with the region of the original image covered by the original image mask F, thereby obtaining high-precision output.

In the embodiment, filter coefficients in the original image are configured such that the filter coefficients are multiplied by the values of the reference pixels in the original image whose values correspond to the values of the reference pixels in the reduced image that are multiplied by the filter coefficients to produce reflectance values for the reduced image, thereby obtaining output of high precision.

First Variation of the First Embodiment

While the reduced image mask Fs is stored in the ROM 12 in the embodiment described above, the printer 1 may be configured to dynamically generate the reduced image mask Fs.

Figure 14:
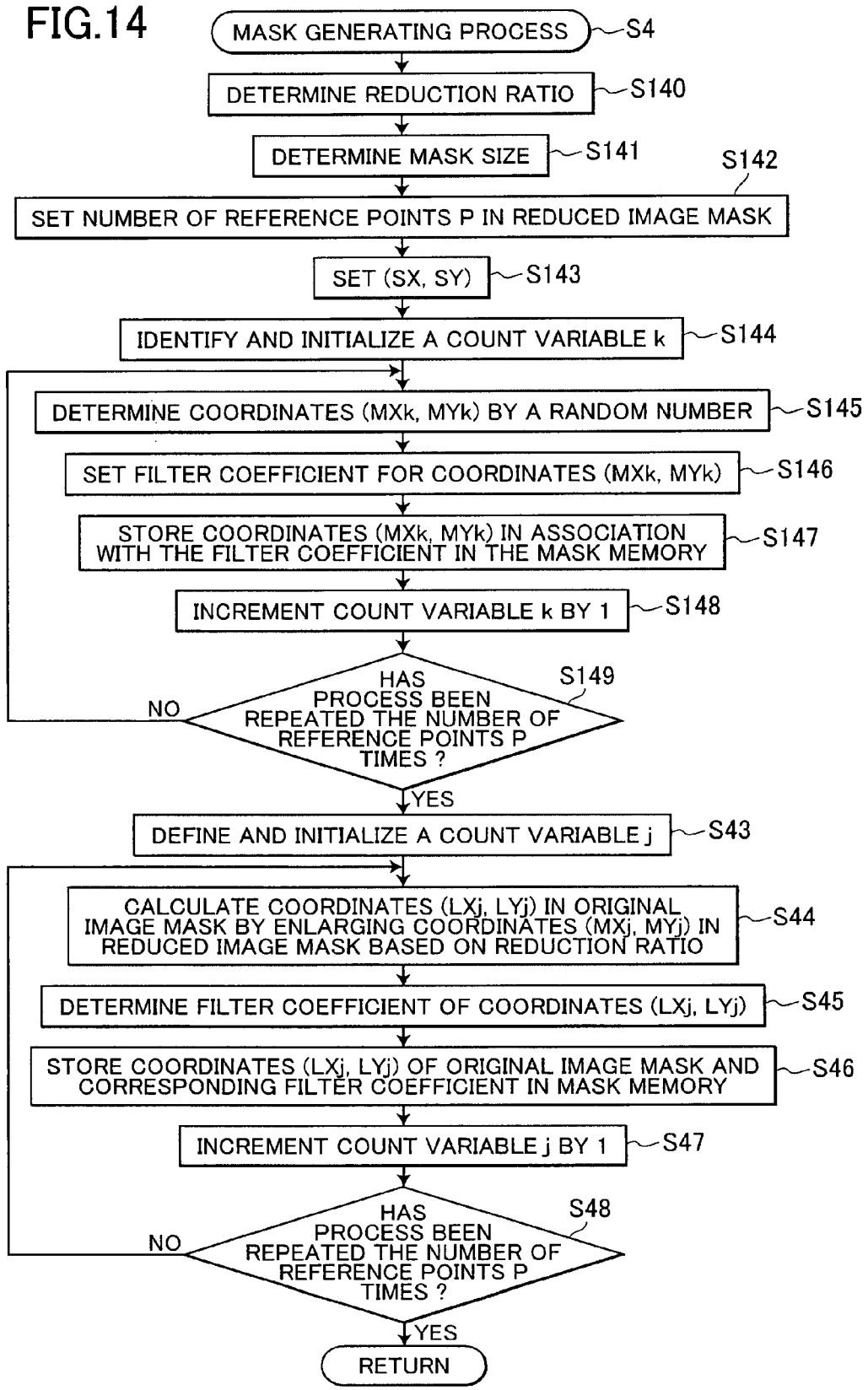
FIG. 14 is a flowchart illustrating steps in a mask generating process according to a variation of the first embodiment.

FIG. 14 is a flowchart illustrating steps in the mask generating process of S4 according to a first variation of the embodiment. In the mask generating process according to the variation shown in FIG. 14, steps identical to those in the mask generating process of the embodiment described above with reference to FIG. 12 have been designated with the same step numbers to avoid duplicating description.

In S140 of the mask generating process in FIG. 14, the CPU 11 determines the reduction ratio and in S141 sets the size of the reduced image mask Fs. In S142 the CPU 11 sets the number of reference points P for the reduced image mask F and in S143 sets parameters (SX, SY) denoting the mask size of the reduced image mask, where SX denotes the length of the mask in the X-direction and SY the length of the mask in the Y-direction. The mask size, number of reference points P, and the parameters (SX, SY) are set to suitable values by referencing a table, for example, based on the reduction ratio, printing parameters, and the like.

In S144 the CPU 11 defines and initializes a count variable k. In S145 the CPU 11 determines coordinates (MXk, MYk) having filter coefficients in the reduced image mask using a random number. Since the size of the reduced image mask is indicated by the parameters (SX, SY), the values of MXk and MYk are obtained in the following range.

$$-SX/2 \leq MXk \leq SX/2$$

$$-SY/2 \leq MYk \leq SY/2$$

In S146 the CPU 11 determines a filter coefficient for the set coordinate (MXk, MYk) and in S147 stores the coordinate (MXk, MYk) in association with the filter coefficient in the mask memory 13$h$. Since the method of calculating the filter coefficient with a Gaussian function is well known in the art, a description of this process has been omitted.

In S148 the CPU 11 increments the count variable k by 1. While the count variable k is smaller than the number of reference points P (S149: NO), the CPU 11 repeats the process from S145. When k=P after repeating the process exactly the number of reference points P times (S149: YES), the printer 1 has completed generation of the reduced image mask Fs. The remaining process for generating the original image mask F based on the reduced image mask Fs is identical to that described from S43 in FIG. 12.

Second Variation of the First Embodiment

In the example of FIG. 9($b$), coordinates obtained by dividing the coordinates in the reduced image mask Fs by the reduction ratio are used directly as the coordinates in the original image mask F, but the method of calculation for obtaining coordinates in the original image mask F is not limited to this method. For example, if the algorithm for forming the reduced image is based on the bi-linear method, bi-cubic method, or average pixel method, the value of one pixel in the reduced image is determined based on the value of a plurality of adjacent pixels in the original image.

In correspondence with each reference point in the reduced image mask, at least one reference point is determined in the original image mask in a manner described below:

It is noted that when the reduced image is obtained from the original image, the original image is divided into a plurality of blocks, in each of which a plurality of pixels (k×k pixels, for example, wherein k is an integer greater than 1) are arranged adjacent to one another. The value of each pixel in the reduced image is calculated by consolidating the value of at least one pixel that is selected among the plurality of pixels in the corresponding block in the original image according to the selected image reducing algorithm. It is noted that the number "n" of the at least one pixel selected from a single block is the same for all the blocks and satisfies the inequality of $0 < n \leq k \times k$.

The original image mask F is constructed from a plurality of blocks. The total number of the blocks is equal to the total number of the points (p×q, for example, wherein p, q are integers greater than 1) in the reduced image mask Fs. The blocks are arranged in the original image mask F in the same manner as the points in the reduced image mask Fs. When the reduced image mask F has p rows by q columns of points, the original image mask F has p rows by q columns, of blocks. Each block in the original image mask F corresponds to one point in the reduced image mask Fs. In each block of the original image mask F, a plurality of points (k×k points, in this example) are arranged adjacent to one another in the same manner as the pixels in each block in the original image. Thus, the total number of points in the original image mask F are k·p×k·q. Through the reduction process, each region in the original image having k·p rows by k·q columns of pixels is reduced into a corresponding region having p rows by q columns of pixels.

So, when one point in the reduced image mask is a reference point that is associated with a filter coefficient, at least one point among the plurality of points in the corresponding block of the original image mask F is set as a reference point. The at least one point is selected among the plurality of points in the corresponding block in the same manner as when the at least one pixel is selected among the plurality of pixels in the block of the original image according to the selected image reducing algorithm.

For example, when the average pixel method is selected, the value of each pixel in the reduced image is produced by consolidating the values of all the pixels in the corresponding block in the original image. So, when one point in the reduced image mask Fs is a reference point that is associated with a filter coefficient, all the points in the corresponding block are set as reference points in the original image mask F.

Similarly, when the bi-linear method is selected, the value of each pixel in the reduced image is produced by consolidating the values of 2×2 pixels that are arranged adjacent to one another and that are located in the upper left corner, for example, in the corresponding block in the original image. So, when one point in the reduced image mask Fs is a reference point that is associated with a filter coefficient, 2×2 points that are located in the upper left corner in the corresponding block are set as reference points in the original image mask F.

It is noted that when the nearest neighbor method is selected, the value of each pixel in the reduced image is produced by consolidating or using the value of one pixel that is located in the upper left corner, for example, in the corresponding block in the original image. So, when one point in the reduced image mask Fs is a reference point that is associated with a filter coefficient, one point that is located in the upper left corner in the corresponding block is set as a reference point in the original image mask F.

When calculating the average peripheral luminance for one target pixel that is aligned with the center of the reduced image mask Fs, the luminance values of pixels in the reduced image that are aligned with the reference points in the reduced image mask Fs (which will be referred to as "reference pixels" hereinafter) are incorporated in the average peripheral luminance for the target pixel. When calculating the average peripheral luminance for one target pixel that is aligned with the center of the original image mask, the luminance values of pixels in the original image that are aligned with the reference points in the original image mask (which will be referred to as "reference pixels" hereinafter) are incorporated in the average peripheral luminance for the target pixel. It is ensured that if the value of the target pixel in the reduced image has been determined by using the value of the target pixel in the original image by the image reducing algorithm, the values of the reference pixels in the reduced image have been determined by using the values of the reference pixels in the original image by the reducing algorithm. So, the average peripheral luminance for the target pixel in the reduced image can be calculated to be a value similar to the average peripheral luminance for the target pixel in the original image. Accordingly, it is possible to obtain a very suitable clipped range.

Second Embodiment

Figure 15:
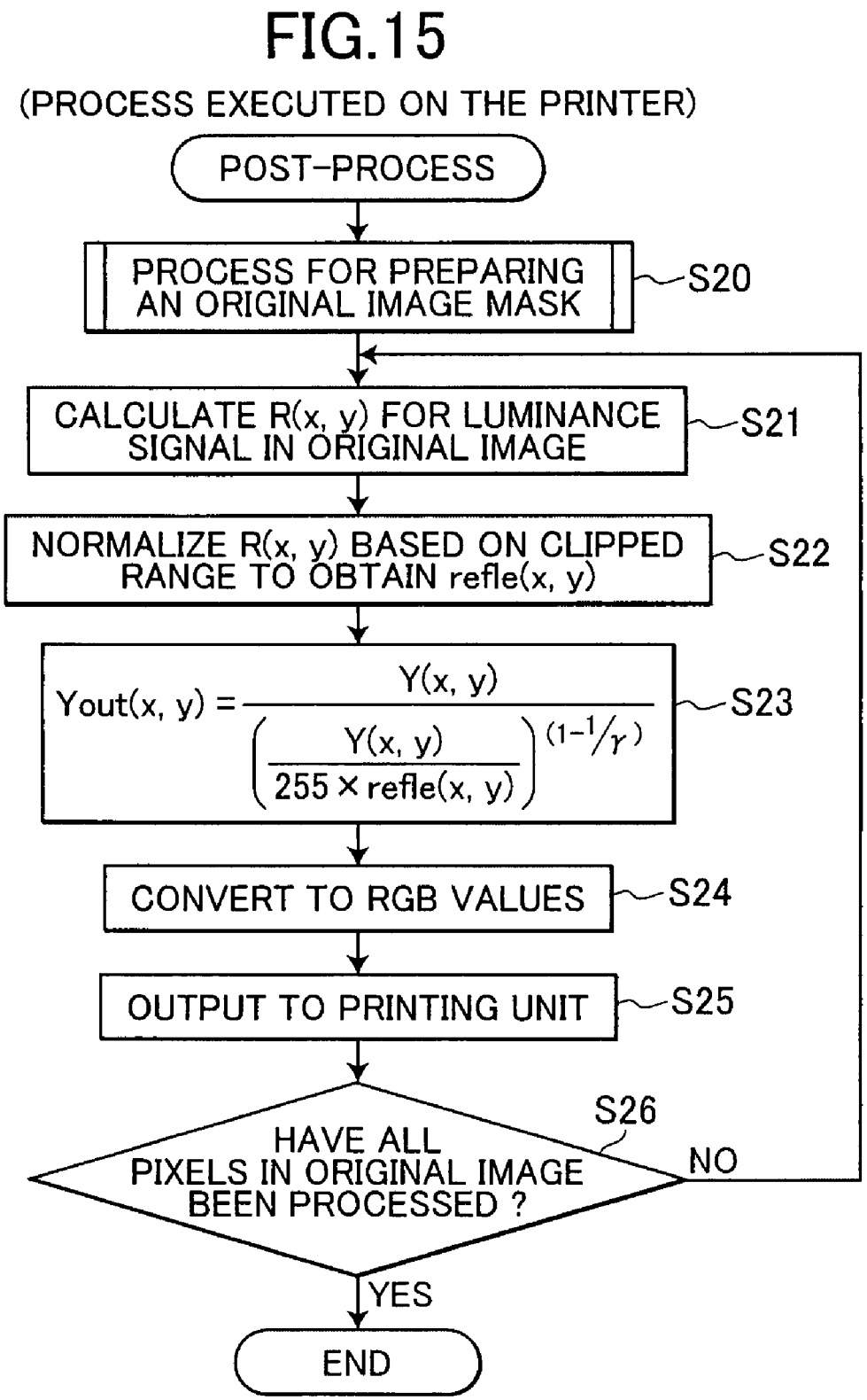
FIG. 15 is a flowchart illustrating steps in a pre-process performed according to a second embodiment.

Next, a second embodiment will be described with reference to FIGS. 15 to 23. In the post-process according to the second embodiment, the method of creating the original image mask F varies based on the method of creating the reduced image (average pixel method, bi-linear method, and nearest neighbor method). The structure of the printer 1 according to the second embodiment is identical to that described in the first embodiment and, their descriptions thereof will not be repeated. Steps in the pre-process is identical to steps in the pre-process (FIG. 3) of the first embodiment except for S4. In S4 of the pre-process of the first embodiment, the CPU 10 generates the original image mask F based on the reduced image mask Fs. However, in the second embodiment, the CPU 10 just reads the reduced image mask Fs from the ROM 12. In the second embodiment, the original image mask F is generated in the post-process. FIG. 15 is a flowchart illustrating steps in the post-process according to the second embodiment. According to the second embodiment, the post-process of FIG. 15 is executed instead of the post-process of FIG. 5 in the first embodiment. In S20 of FIG. 15, the CPU 11 prepares the original image mask F. The remaining steps in the post-process are identical to those described in the first embodiment with reference to FIG. 5 and, hence, will not be repeated here.

Figure 16:
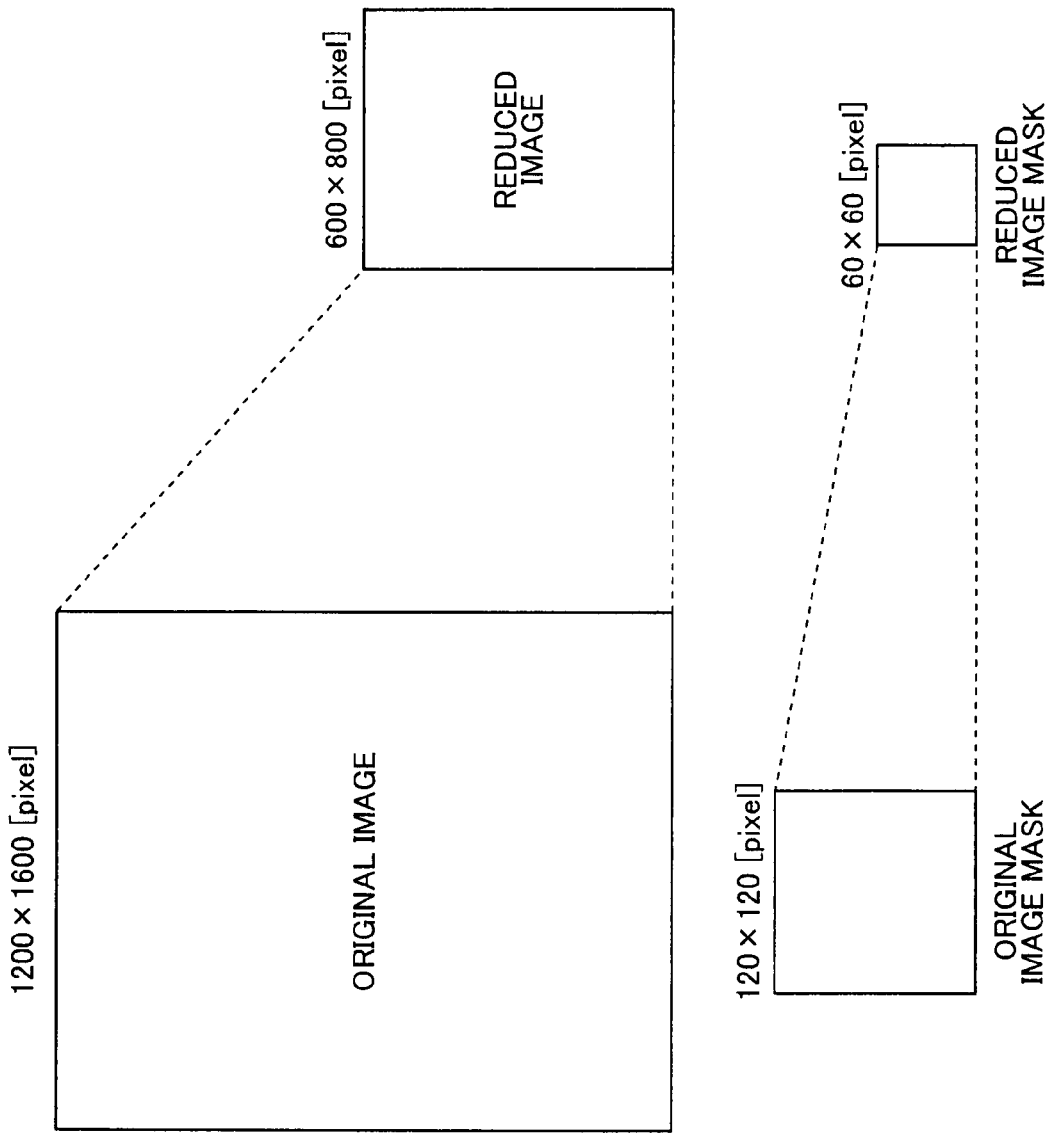
FIG. 16(a) is an explanatory diagram conceptually illustrating a relationship between the original image size and the reduced image size.
FIG. 16(b) is an explanatory diagram conceptually illustrating a relationship between the size of the original image mask and the size of the reduced image mask.

Next, the process for preparing the original image mask F in S20 will be described with reference to FIGS. 16 through 23. First, the size of the original image mask F to be generated in the process of S20 will be described with reference to FIGS. 16(a) and 16(b). FIG. 16(a) is a conceptual drawing showing the relationship between the sizes of the original image and the reduced image. FIG. 16(b) is a conceptual drawing showing the relationship between the sizes of the original image mask F and the reduced image mask Fs.

The shape of the mask is not limited to a rectangular shape, but may be a circular shape or other non-rectangular shape. In such a case, the size of the mask will denote the size of a rectangular region inscribed in the mask.

When the reduced image is reduced at a reduction ratio of ½ the original image (i.e., when the original image is divided into a plurality of blocks of 2×2 pixels each, and one pixel in the reduced image is formed from each block), as in the example of FIG. 16(a), the original image mask F generated in the process of S20 described later has a mask size two times (inverse of the reduction ratio) of the reduced image mask Fs. In other words, the original image mask is generated so that the ratio of the size of the reduced image to the size of the reduced image mask is identical to the ratio of the size of the original image to the size of the original image mask. Since the calculating region for calculating the average peripheral luminance value in the original image is identical to the calculating region for calculating the average peripheral luminance value in the reduced image, suitable normalization parameters can be acquired when using reflectance values in the reduced image.

In this way, the reduced image mask Fs and the original image mask F each determine a calculating region for calculating the average peripheral luminance values. Similarly to the first embodiment, pixels in the calculating regions determined by the reduced image mask and the original image mask are divided into reference pixels and skipped pixels, and only the values of the reference pixels are reflected in the average peripheral luminance, thereby reducing the number of calculations.

Figure 17:
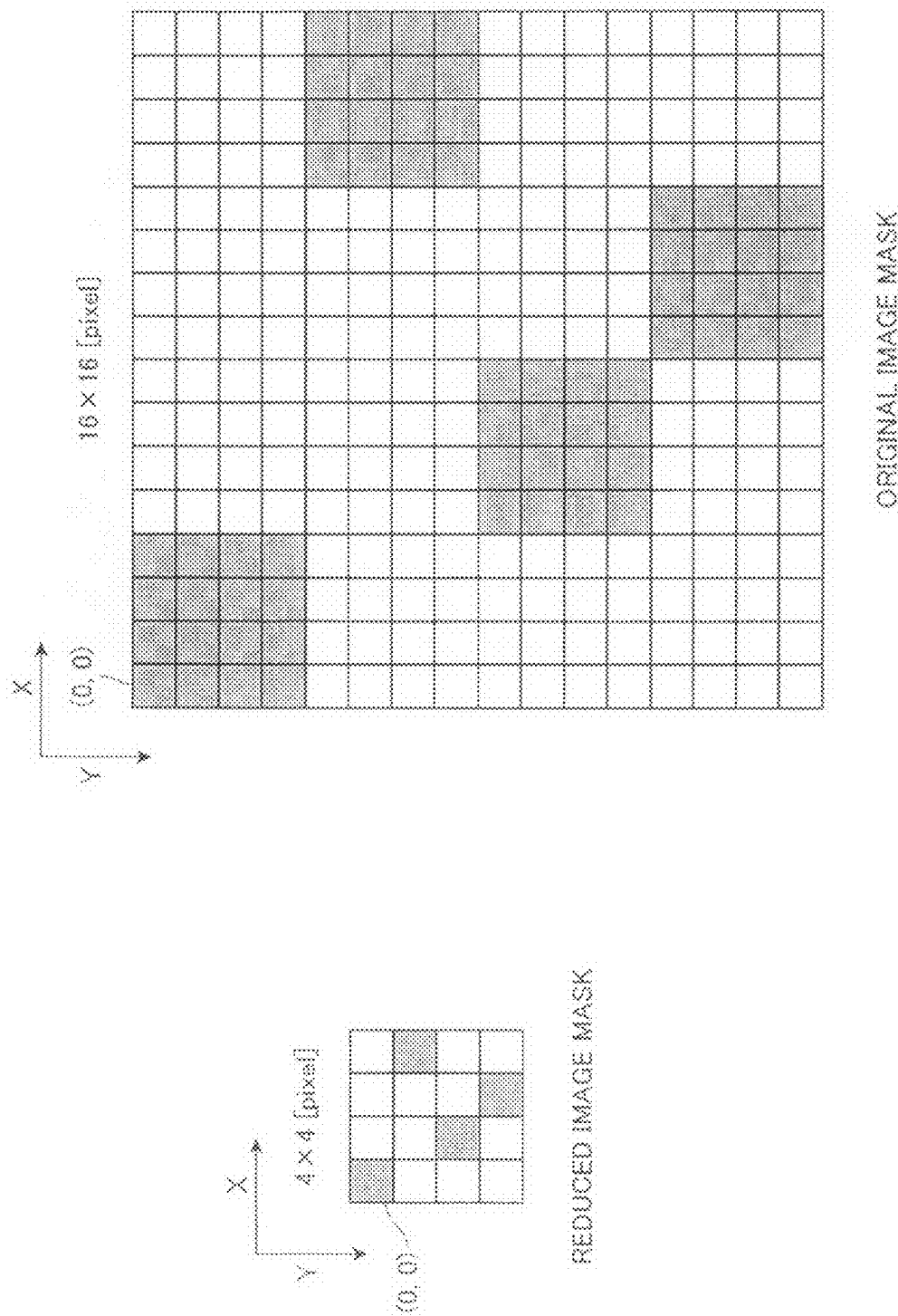
FIG. 17 is an explanatory diagram conceptually illustrating a reduced image mask and an original image mask when the average pixel method is selected as the reduction algorithm.
Figure 18:
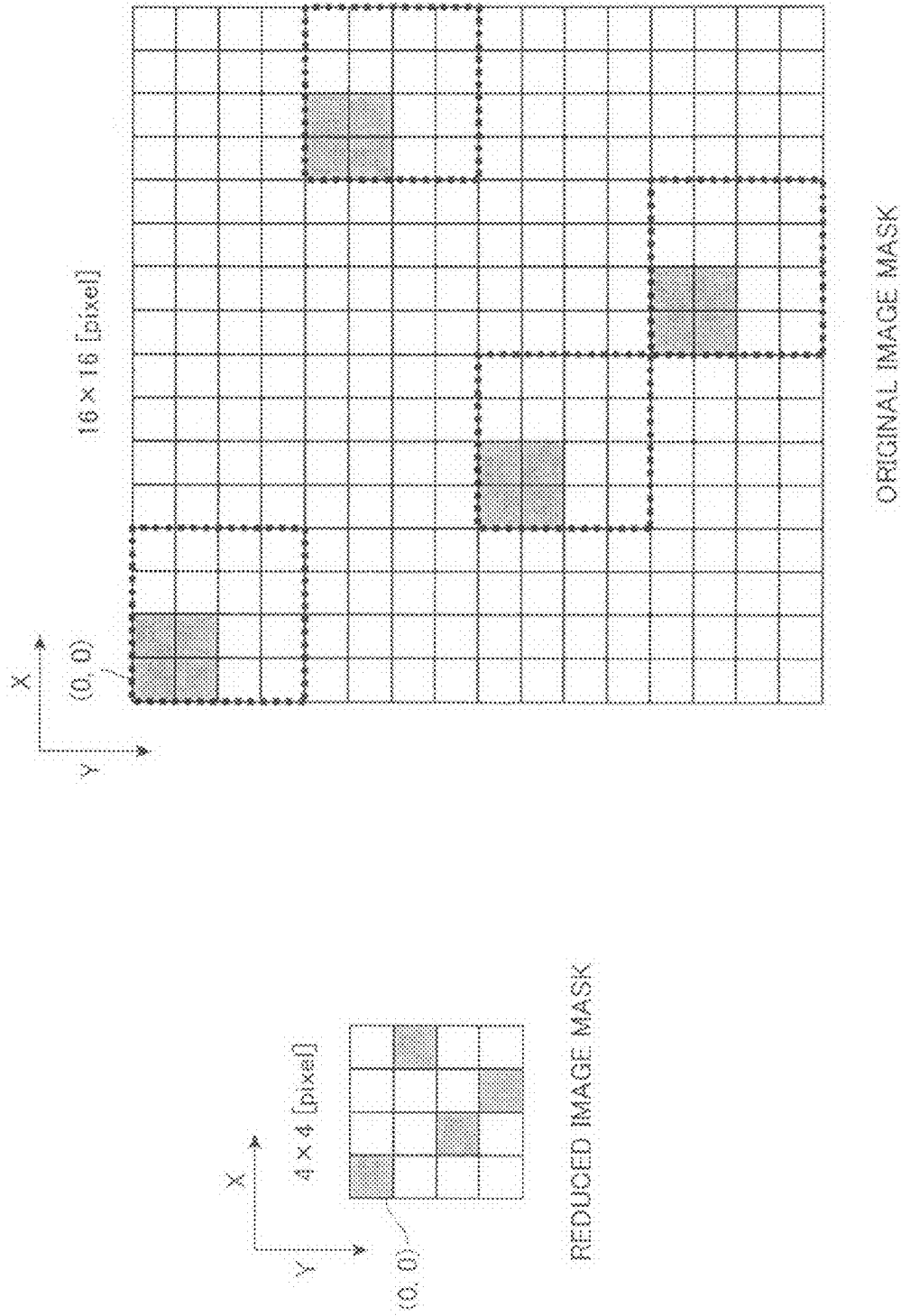
FIG. 18 is an explanatory diagram conceptually illustrating a reduced image mask and an original image mask when the bi-linear method is selected as the reduction algorithm.
Figure 19:
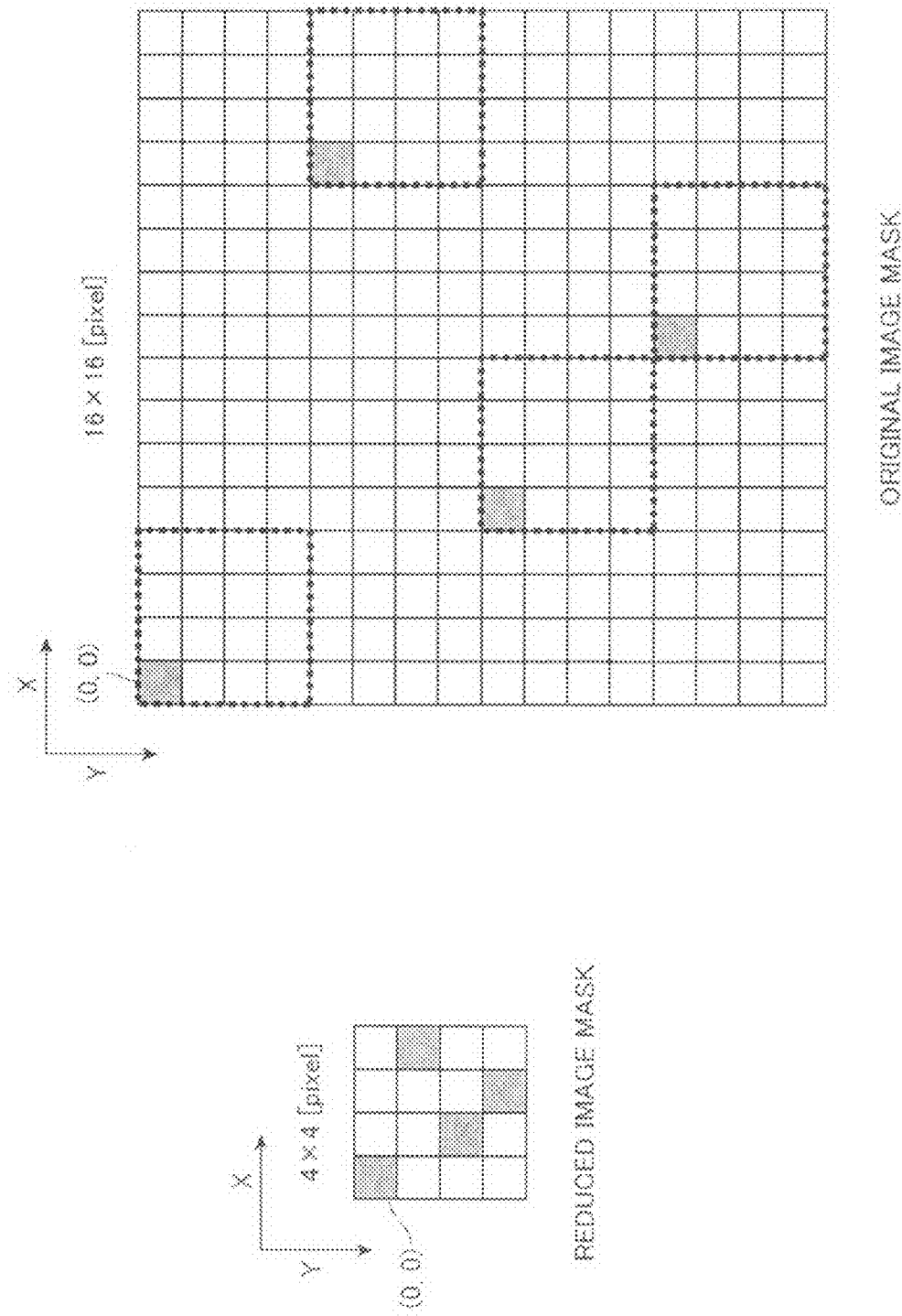
FIG. 19 is an explanatory diagram conceptually illustrating a reduced image mask and an original image mask when the nearest neighbor method is selected as the reduction algorithm.

Skipping patterns in the reduced image mask and the original image mask will be described next with reference to FIGS. 17 through 19. FIGS. 17 through 19 conceptually illustrate the reduced image mask Fs and the original image mask F, wherein elements at which the filter coefficient is skipped (skipped points) are indicated in white, and elements having filter coefficients (reference points) are indicated in gray. In the first embodiment, the point of origin (0, 0) is positioned at the center (or substantially center) of each mask. However, in the second embodiment, the point of origin in each of the reduced image mask Fs and the original image mask F is positioned at the upper left corner in each of the reduced image mask and the original image mask. The filter coefficients of the reference points are calculated based on distances from a position of the origin (0, 0) to the reference points. When the convolution operation is performed, the point of origin (0, 0) on the reduced image mask or the original image mask is aligned with a target pixel of the reduced image or the original image.

In the second embodiment, the uppermost and leftmost pixel in each of the reduced image mask Fs and the original image maskF is set to (0, 0). The horizontal direction is the X-axis and the vertical direction is the Y-axis, and each element in the mask is expressed by coordinates. For example, an element positioned two places away from (0, 0) along the X axis and three places along the Y-axis is expressed by (2, 3).

The examples shown in FIGS. 17 through 19 are reduced image masks and original image masks applied when forming a reduced image is found at ¼ the horizontal and vertical sizes of the original image. Since the ratio of the reduced image mask size to the original image mask size is equivalent to the ratio of the reduced image size and the original image size, as described above, the reduced image mask Fs has horizontal and vertical sizes (such as 4×4 pixels) ¼ the horizontal and vertical sizes of the original image mask F (such as 16×16 pixels).

First, the reduced image mask will be described with reference to FIG. 17. In order to obtain one reflectance value, the reduced image mask having a size of 4×4 pixels is aligned with 4×4 pixels in the reduced image, and filter coefficients at the reference points are multiplied by the values of pixels corresponding to the reference points (reference pixels) so that these values are incorporated in the reflectance value.

In order that the reflectance values acquired from the reduced image resemble the reflectance values acquired from the original image as much as possible, the pattern of reference points in the original image mask F is made to correspond to the pattern of reference points in the reduced image mask Fs.

When the reduced image is formed at a reduction ratio of ¼, the original image is divided into a plurality of blocks having 4×4 pixels, and one pixel in the reduced image is formed for each block. Similarly, the original image mask F is divided into a plurality of blocks, each being made from 4×4 points. Thus, each block of the original image mask F corresponds to each point of the reduced image mask Fs.

The original image mask shown in the right side of FIG. 17 is an example of a mask generated based on the reduced image mask Fs shown in left side of FIG. 17 when the reduction algorithm selected for forming the reduced image is the average pixel method. If the reduced image is formed according to the average pixel method at this time, all 4×4 pixels constituting one block of the original image are extracted and averaged, and a single pixel in the reduced image is formed based on the averaged value.

Accordingly, 4×4 pixels in the reduced image determined by the calculating region of the reduced image mask have been obtained by reducing 16×16 pixels in the original image determined by the calculating region of the original image mask F, so, reference points in the original image mask F are set so that 4×4 pixels in the original image that have been extracted for forming each reference pixel in the reduced image are set as reference pixels. In other words, the original image mask F is generated such that all points in one block corresponding to each reference point in the reduced image mask Fs become the reference points. In this way, pixel values incorporated in the reflectance values of the reduced image approach the pixel values incorporated in the reflectance values of the original image. As a result, it is possible to obtain suitable normalization parameters when using reflectance values in the reduced image so that the Retinex process can be performed with great accuracy.

The original image mask shown in the right side of FIG. 18 is an example of a mask generated based on the reduced image mask Fs in the left side of FIG. 18 when the bi-linear method is selected as the reduction algorithm. 2×2 adjacent pixels are extracted from an upper left corner of each block, and one pixel in the reduced image is formed by interpolating the values of these 2×2 pixels.

Accordingly, the reference points in the original image mask F are set so that 2×2 pixels in the original image that have been extracted for forming each reference pixel in the reduced image will serve as the reference pixels in the original image. In other words, the original image mask F is generated such that 2×2 points in the upper left corner of one block that corresponds to each reference point in the reduced image mask Fs become the reference points. In this way, it is possible to make the pixel values incorporated in the reflectance values of the reduced image similar to the pixel values incorporated in the reflectance values of the original image, thereby obtaining suitable normalization parameters when using the reflectance values in the reduced image.

The original image mask F shown in the right side of FIG. 19 is an example of a mask generated based on the reduced image mask Fs in the left side of FIG. 19 when the nearest neighbor method is selected as the reduction algorithm. According to the nearest neighbor method, one pixel is extracted from the upper left corner of each block. The value of this pixel is directly used as the value of a corresponding pixel in the reduced image.

Accordingly, reference points in the original image mask F are set so that one pixel in the original image that have been extracted for forming each reference pixel in the reduced image will serve as the reference pixel in the original image. In other words, the original image mask F is generated such that a single point in the upper left corner of one block that corresponds to each reference point in the reduced image mask Fs becomes the reference point. In this way, the pixel values incorporated in the reflectance values of the reduced image can be made similar to the pixel values incorporated in the reflectance values of the original image, thereby obtaining suitable normalization parameters when using the reflectance values in the reduced image.

Figure 20:
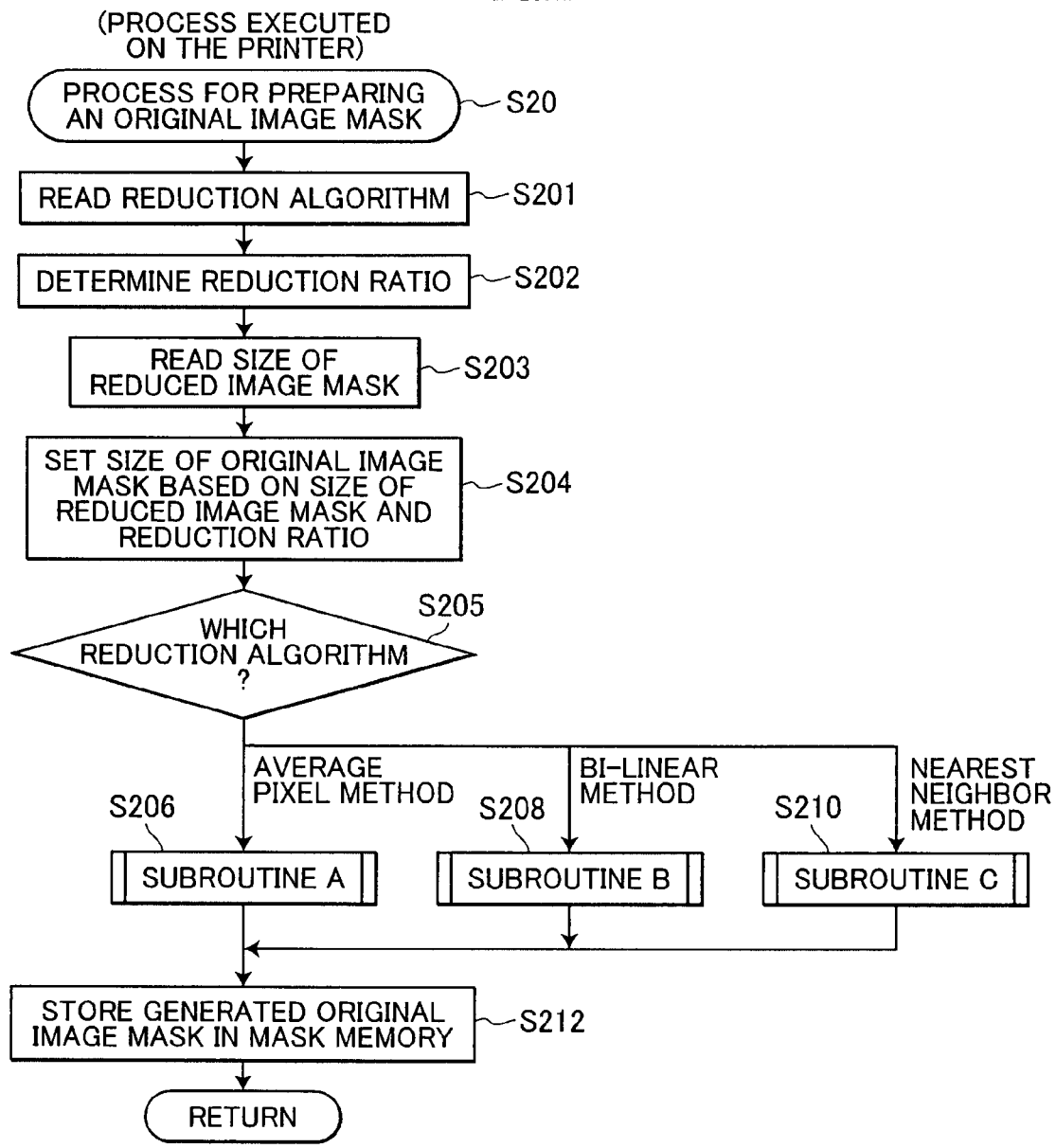
FIG. 20 is a flowchart illustrating steps in a process for preparing an original image mask according to the second embodiment.

Next, the process of S20 for preparing the original image mask will be described with reference to FIG. 20. FIG. 20 is a flowchart illustrating steps in this process, wherein the original image mask F is prepared based on the reduction algorithm selected for forming the reduced image.

In S201 of the process in FIG. 20, the CPU 11 reads the reduction algorithm selected for forming the reduced image from the reduction algorithm memory 13g (see FIG. 1) In S202 the CPU 11 determines the reduction ratio. Here, the reduction ratio is a value indicating the ratio of the length of one side constituting the reduced image to the length of the corresponding one side constituting the original image.

In S203 the CPU 11 reads the size of the reduced image mask from the mask memory 13h (see FIG. 1). In S204 the CPU 11 sets the size of the original image mask Fs based on the size of the reduced image mask Fs and the reduction ratio. More specifically, the CPU 11 acquires the size of the original image mask by multiplying the size of the reduced image mask by the inverse of the reduction ratio. In this way, the size of the original image mask can be set so that the ratio of the size of the reduced image to the size of the reduced image mask Fs is the same as the ratio of the size of the original image to the size of the original image mask (see FIG. 16). That is, the ratio of the horizontal size of the reduced image to the horizontal size of the reduced image mask Fs is the same as the ratio of the horizontal size of the original image to the horizontal size of the original image mask F. Or, the ratio of the vertical size of the reduced image to the vertical size of the reduced image mask is the same as the ratio of the vertical size of the original image to the vertical size of the original image mask F.

In S205 the CPU 11 determines the type of reduction algorithm read in S201 and branches to the next step based on the reduction algorithm. If the reduction algorithm is the average pixel method (S205: average pixel method), the CPU 11 advances to subroutine A in S206 and determines reference points in the original image mask as described above with reference to FIG. 17. If the reduction algorithm is the bi-linear method (S205: bi-linear method), the CPU 11 advances to subroutine B in S208 and determines reference points in the original image mask as described above with reference to FIG. 18. If the reduction algorithm is the nearest neighbor method (S205: nearest neighbor method), the CPU 11 advances to subroutine C in S210 and determines reference points in the original image mask as described above with reference to FIG. 19.

In S212 the CPU 11 stores the original image mask F generated above in the mask memory 13h, and ends the process for preparing the original image mask.

Figure 21:
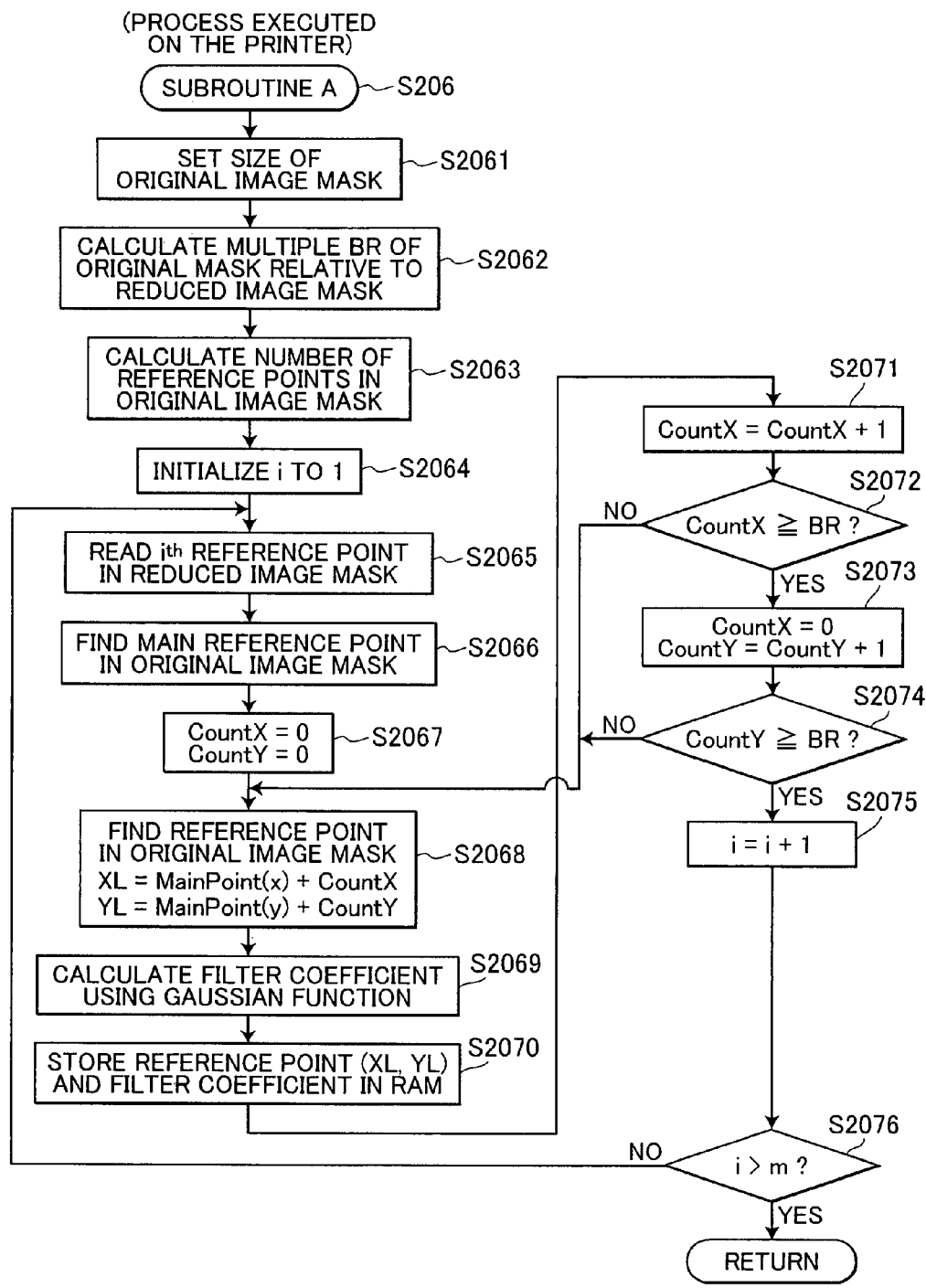
FIG. 21 is a flowchart illustrating steps in a subroutine A in FIG. 20.

Next, subroutine A in S206 will be described in greater detail with reference to FIG. 21. FIG. 21 is a flowchart illustrating steps in subroutine A, which is executed when the average pixel method is selected as the reduction algorithm.

In S2061 of subroutine A, the CPU 11 sets the size of the original image mask determined in the process of S204 in FIG. 20. The horizontal and vertical sizes of the original mask are obtained by dividing the vertical and horizontal sizes of the reduced image by the reduction ratio. In S2062 the CPU 11 calculates a multiple BR of the original image mask size to the reduced image mask size. The multiple BR is calculated using equation (7) below and rounding up numbers to the right of the decimal point.

$$BR = \text{<vertical size of original image mask>}/\text{<vertical size of reduced image mask>} \quad \text{Equation (7)}$$

In S2063 the CPU 11 calculates the number of reference points M to be formed in the original image mask using equation (8) below.

$$\text{<number of reference points M in the original image mask>} = \text{<number of reference points m in the reduced image mask>} \times \text{<number of pixels in the original image extracted for forming one pixel of the reduced image>} \quad \text{Equation (8)}$$

When the reduced image is formed according to the average pixel method, one pixel of the reduced image is formed from $BR^2$ pixels. Hence, the <number of pixels in the original image extracted for forming one pixel of the reduced image>, in equation (8), is $BR^2$ in subroutine A.

In S2064 the CPU 11 initializes a variable to 1, and in S2065 reads an $i^{th}$ reference point (Xsi, Ysi) in the reduced image mask Fs. In S2066 the CPU 11 finds a main reference point MainPoint in the original image mask from the reference point (Xsi, Ysi) read in S2065. This main reference point MainPoint is calculated according to equation (9) below, $$MainPoint(x)=Xsi \cdot BR$$
$$MainPoint(y)=Ysi \cdot BR \qquad \text{Equation (9)}$$

In S2067 the CPU 11 initializes a counter CountX and a counter CountY to 0. In S2068 the CPU 11 finds a reference point (XL, YL) in the original image mask based on equation (10) below.

$$XL=MainPoint(x)+CountX$$
$$YL=MainPoint(y)+CountY \qquad \text{Equation (10)}$$

In S2069 the CPU 11 calculates the filter coefficient for the reference point (XL, YL) using a Gaussian function and in S2070 stores this filter coefficient in the RAM 13.

In S2071 the CPU 11 increments the counter CountX by 1 and determines in S2072 whether the counter CountX is greater than or equal to BR. As long as the counter CountX is less than BR (S2072: NO), the CPU 11 returns to the process in S2068 to set an adjacent point along the X-axis as a reference point.

When the counter CountX equals BR after repeating the above process (S2072: YES), then in S2073 the CPU 11 resets the counter CountX to 0 and increments the counter CountY by 1. In S2074 the CPU 11 determines whether the counter CountY is greater than or equal to BR. While the counter CountY is less than BR (S2074: NO), the CPU 11 returns to S2068 to calculate the next reference point.

When the counter CountY equals BR after is repeating the above process (S2074: YES), indicating that $BR^2$ reference points in the original image mask F have been set for one reference point in the reduced image mask Fs, in S2075 the CPU 11 increments the variable i by 1 and determines in S2076 whether the variable i is greater than the number of reference points m in the reduced image mask Fs. While the variable i is less than or equal to the number of reference points m (S2076: NO), the CPU 11 returns to S2065 to read the next reference point in the reduced image mask Fs.

When variable i>m after repeating the above process (S2076: YES), indicating that corresponding reference points in the original image mask F have been calculated for all reference points in the reduced image mask Fs, the CPU 11 ends subroutine A. Through subroutine A, all reference points in the original image mask F and their filter coefficients are determined as described with reference to FIG. 17.

Figure 22:
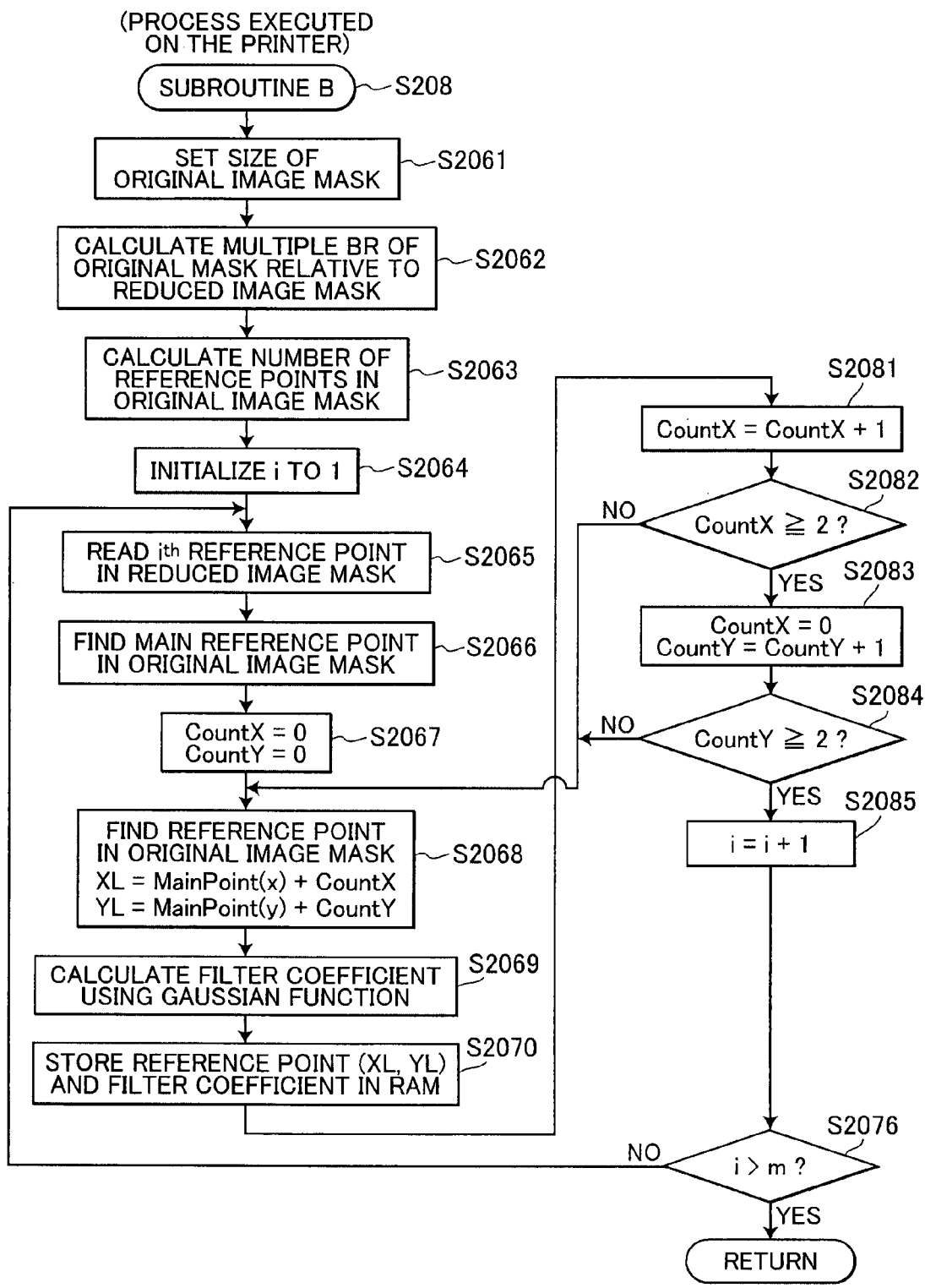
FIG. 22 is a flowchart illustrating steps in a subroutine B in FIG. 20.

Next, subroutine B in S208 will be described in greater detail with reference to FIG. 22. FIG. 22 is a flowchart illustrating steps in subroutine B, which is executed when the bi-linear method is selected as the reduction algorithm. Steps in the flowchart of FIG. 22 identical to those in the flowchart of FIG. 21 have been designated with the same step numbers to avoid duplicating description.

In S2061 of subroutine B, the CPU 11 sets the size of the original image mask F. In S2062 the CPU 11 calculates a multiple BR of the original mask image size to the reduced image mask size.

In S2063 the CPU 11 calculates the number of reference points M to be formed in the original image mask F. When the reduced image is formed according to the bi-linear method, one pixel of the reduced image is formed from 4 (=2×2) pixels in the original image. Hence, the number "4" is substituted in the <number of pixels in the original image extracted for forming one pixel of the reduced image> in equation (8).

In S2064 the CPU 11 initializes a variable i to 1, and in S2065 reads an $i^{th}$ reference point (Xsi, Ysi) in the reduced image mask. In S2066 the CPU 11 finds a main reference point MainPoint, by equation (9), in the original image mask F from the reference point (Xsi, Ysi) read in S2065.

In S2067 the CPU 11 initializes a counter CountX and a counter CountY to 0. In S2068 the CPU 11 finds a reference point (XL, YL) in the original image mask based on equation (10) described above. In S2069 the CPU 11 calculates the filter coefficient for the reference point (XL, YL) using a Gaussian function and in S2070 stores this filter coefficient in the RAM 13.

In S2081 the CPU 11 increments the counter CountX by 1 and determines in S2082 whether the counter CountX is greater than or equal to 2. As long as the counter CountX is less than 2 (S2082: NO), the CPU 11 returns to the process in S2068 to set an adjacent point along the X-axis as a reference point.

When the counter CountX equals 2 after repeating the above process (S2082: YES), then in S2083 the CPU 11 resets the counter CountX to 0 and increments the counter CountY by 1. In S2084 the CPU 11 determines whether the counter CountY is greater than or equal to 2. While the counter CountY is less than 2 (S2084: NO), the CPU 11 returns to S2068 to calculate the next reference point.

When the counter CountY equals 2 after repeating the above process (S2084: YES), indicating that 4 (=2×2) reference points in the original image mask have been set for one reference point in the reduced image mask, in S2085 the CPU 11 increments the variable i by 1 and repeats the above process until the variable i>m. In other words, the CPU 11 repeats the above process until corresponding reference points in the original image mask F have been calculated for all reference points in the reduced image mask Fs. Subsequently, the CPU 11 ends subroutine B. Through subroutine B, all reference points in the original image mask F and their filter coefficients are determined as described with reference to FIG. 18.

Figure 23:
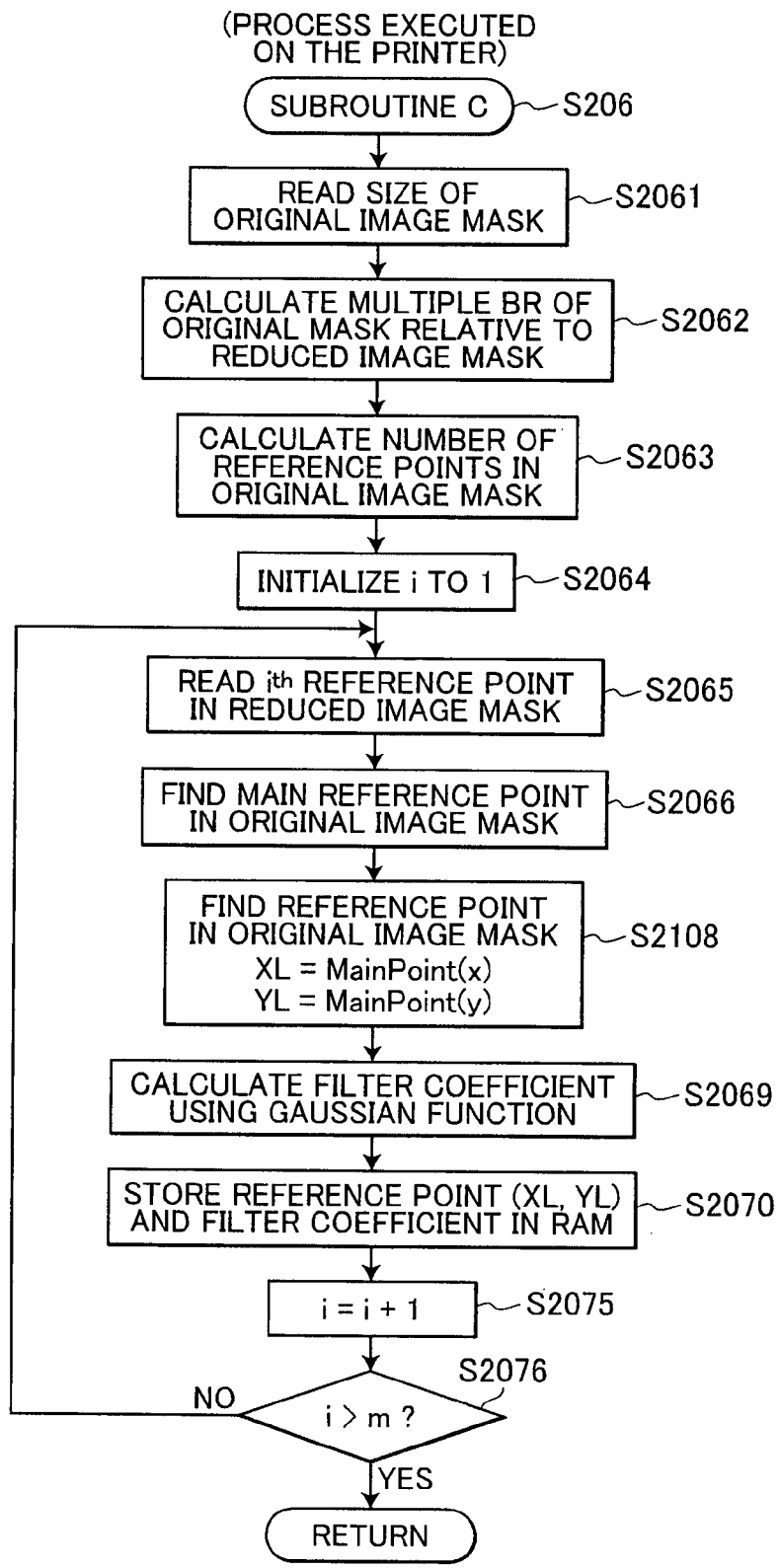
FIG. 23 is a flowchart illustrating steps in a subroutine C in FIG. 20.

Next, subroutine C in S210 will be described in greater detail with reference to FIG. 23. FIG. 23 is a flowchart illustrating steps in subroutine C, which is executed when the nearest neighbor method is selected as the reduction algorithm. Steps in the flowchart of FIG. 23 identical to those in the flowchart of FIG. 21 have been designated with the same step numbers to avoid duplicating description.

In S2061 of subroutine C, the CPU 11 sets the size of the original image mask F. In S2062 the CPU 11 calculates a multiple BR of the original mask image size to the reduced image mask size.

In S2063 the CPU 11 calculates the number of reference points M to be formed in the original image mask. When the reduced image is formed according to the nearest neighbor method, one pixel of the reduced image is formed from 1 pixel in the original image. Hence, the number "1" is substituted in the <number of pixels in the original image extracted for forming one pixel of the reduced image> in equation (8) described above.

In S2064 the CPU 11 initializes a variable i to 1, and in S2065 reads an $i^{th}$ reference point (Xsi, Ysi) in the reduced image mask Fs. In S2066, by using equation (9), the CPU 11 finds a main reference point MainPoint in the original image mask F from the reference point (Xsi, Ysi) read in S2065.

In S2108 the CPU 11 finds a reference point (XL, YL) in the original image mask. Since the only reference point in the original image mask F corresponding to the single reference point in the reduced image mask Fs is the main reference point MainPoint, the CPU 11 sets the reference point (XL, YL) to the main reference point MainPoint calculated in S2066.

In S2069 the CPU 11 calculates the filter coefficient for the reference points (XL, YL) using a Gaussian function, and in S2070 stores the filter coefficient in the RAM 13.

In S2075 the CPU 11 increments the variable i by 1 and repeats the above process until the variable i>m (S2076: YES), i.e. until the corresponding reference points in the original image mask have been calculated for all reference points in the reduced image mask Fs. Subsequently, the CPU 11 ends subroutine C. Through subroutine C, the CPU 11 determines reference points in the original image mask F and their filter coefficients, as described above with reference to FIG. 19.

With the original image mask F prepared according to the process of the second embodiment, the pattern of reference points in the original image mask F corresponds to the pattern of reference points in the reduced image mask Fs, as illustrated in FIGS. 17 through 19. Accordingly, the distribution of reflectance values acquired from the reduced image is very close to the distribution of reflectance values obtained from the original image. As a result, it is possible to obtain a suitable clipped range (a clipped range very close to the clipped range acquired from the original image) from the reduced image, thereby making it possible to perform the Retinex process quickly and precisely.

Further, since the ratio of the size of the reduced image to the size of the reduced image mask Fs is the same as the ratio of the size of the original image to the size of the original image mask F, the printer 1 can obtain a suitable clipped range when using reflectance values in the reduced image to perform the Retinex process with great precision.

Since the original image mask F is generated based on the reduced image mask Fs, the correlation between the original image mask F and the reduced image mask Fs is maintained, regardless of the reduction ratio, thereby obtaining suitable normalization parameters.

First Variation of the Second Embodiment

In the process of S20 of the second embodiment described above for preparing the original image mask F, reference points in the original image mask F are determined based on the reduction algorithm, but the process is not limited to this method.

The flowchart in FIG. 24 illustrates steps in a variation of the process in S20. In the flowchart of FIG. 24, steps identical to the process of S20 according to the second embodiment described with reference to FIG. 20 have been designated with the same step numbers to avoid duplicating description. In the process of FIG. 24, reference points in the original image mask are determined according to subroutine C in S210, thereby generating the original image mask shown in FIG. 19 regardless of the reduction algorithm.

As described above, according to the original image mask F generated in this process, p×q pixels in the reduced image that are determined by the calculating region of the reduced image mask Fs have been obtained by reducing k·p×k·q pixels of the original image that are determined by the calculating region of the original image mask F. Each block of the original image, on which each reference pixel in the reduced image is based, includes at least one reference pixel. Further, pixels in each block of the original image, on which skipped pixels in the reduced image are based, are set to skipped pixels.

Accordingly, values of pixels incorporated in reflectance values of the reduced image are similar to values of pixels incorporated in reflectance values of the original image. As a result, the printer 1 can acquire suitable normalization parameters when using reflectance values in the reduced image, enabling the Retinex process to be performed with high precision. Further, since this process can maintain the number of reference pixels of the original image mask F that is identical to the number of the reference pixels of the reduced image mask Fs, the process of calculating reflectance values can be performed quickly.

Third Variation of the Second Embodiment

The original image mask F may be generated as shown in FIG. 25 instead of that shown in FIG. 19. FIG. 25 conceptually illustrates the variation of the original image mask F. As shown in FIG. 25, one pixel is randomly selected from pixels in each block of the original image on which reference pixels in the reduced image are based, thereby obtaining output of great precision when these pixels are set as reference pixels.

Fourth Variation of the Second Embodiment

The distribution of reference points in the reduced image mask shown in FIGS. 17 through 19 and FIG. 25 may be arbitrary and may be modified as desired.

Third Embodiment

A third embodiment will be described with reference to FIGS. 26 and 27. According to the third embodiment of the present invention, not only the original image mask F but also the reduced image mask Fs are generated dynamically. The printer 1 according to the third embodiment is identical to the printer 1 of the first embodiment except for the ROM 12 (FIG. 2) and the mask memory 13h (FIG. 2). In the third embodiment, the ROM 12 does not store the reduced image masks Fs. However, the sizes of the reduced image masks Fs are preset and stored in the ROM 12. The mask memory 13h stores a structure for storing reference points in the reduced image mask Fs and a structure for storing reference points in the original image mask F. The structure for storing reference points in the reduced image mask Fs is used for storing the coordinates and the filter coefficients of the reduced image mask Fs. The structure for storing reference points in the original image mask F is used for storing the coordinates and the filter coefficients of the original image mask F. Processes other than the mask generating process (S4) are also identical to the pre-process (FIG. 3) in the first embodiment. The post process is also identical to the post process of the first embodiment shown in FIG. 5.

Figure 26A:
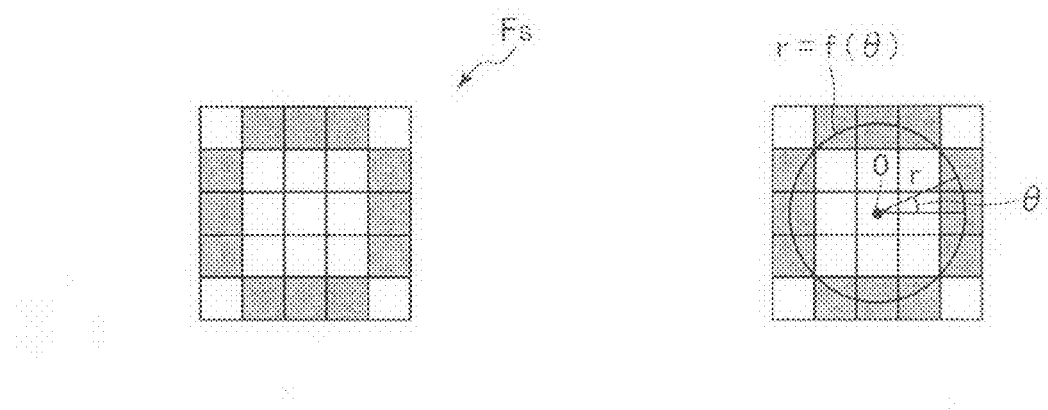
FIG. 26(a) is an explanatory diagram conceptually illustrating coordinates in the region of the reduced image mask having filter coefficients according to a third embodiment.
Figure 26B:
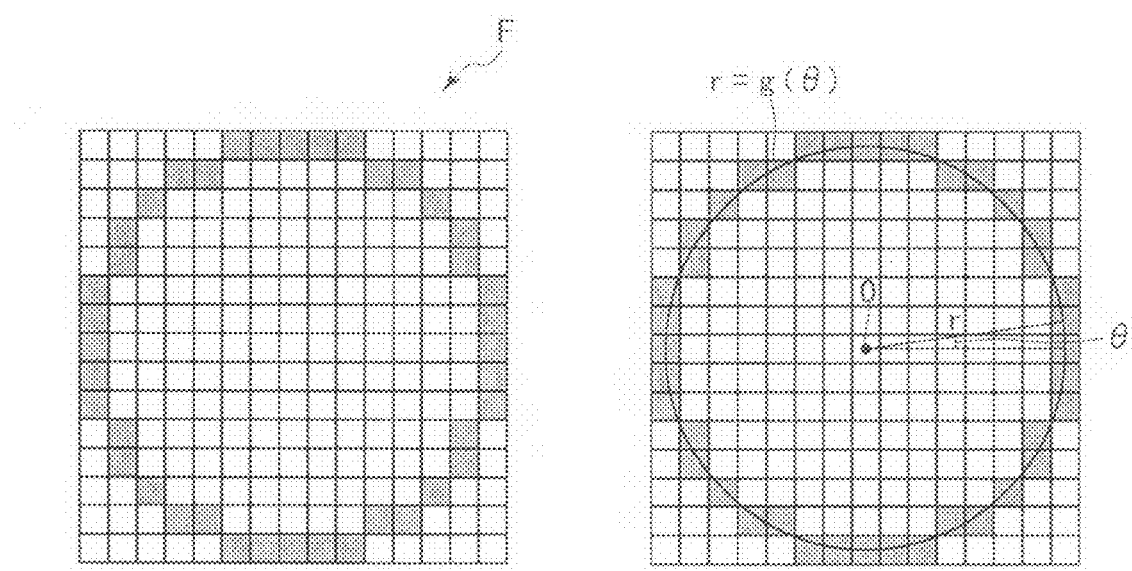
FIG. 26(b) is an explanatory diagram conceptually illustrating coordinates in the region of the original image mask having filter coefficients according to the third embodiment.
Figure 27:
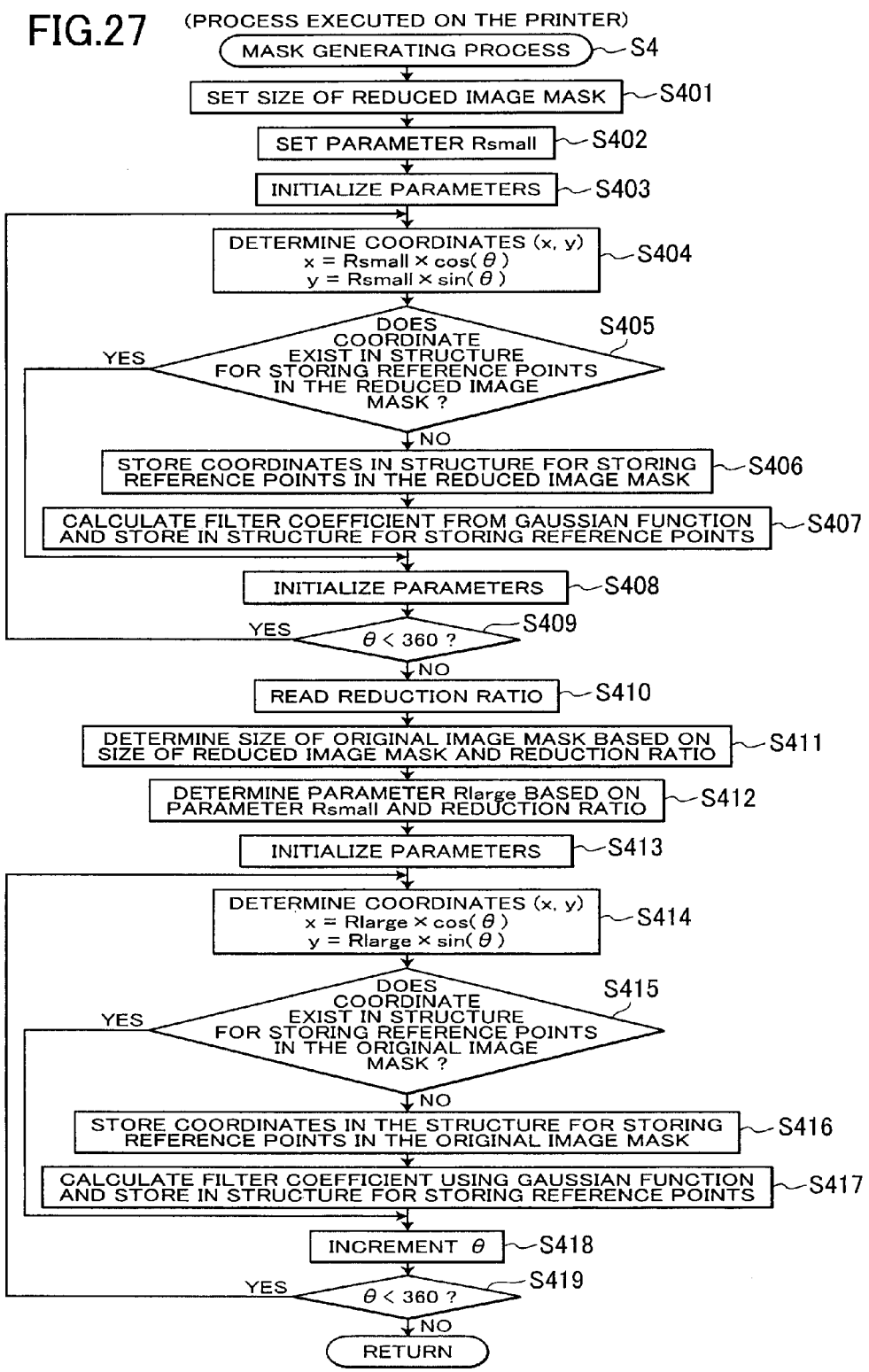
FIG. 27 is a flowchart illustrating steps in a mask generating process according to the third embodiment.

The mask generating process (S4) in the third embodiment is performed as shown in FIG. 27 (described later) instead of S4 of FIG. 12 in the first embodiment. The reduced image mask Fs and the original image mask F generated in the mask generating process of S4 will be described with reference to FIGS. 26(a) and 26(b). Left side of FIG. 26(a) conceptually illustrates how the reduced image mask Fs has filter coefficients for some of the elements in the region of the mask. Left side of FIG. 26(b) conceptually illustrates how the original image mask F has filter coefficients for some of the elements in the region of the mask. In FIGS. 26(a) and 26(b), elements having filter coefficients (reference points) are indicated in gray, while elements not having filter coefficients (skipped points) are indicated in white. A filter coefficient is associated with each reference point.

The reduced image mask Fs shown in FIG. 26(a) has a total of 25 elements, with 5 elements in the vertical direction and 5 elements in the horizontal direction. Of these, 12 elements are reference points associated with filter coefficients, while the remaining 13 elements are skipped points having no filter coefficients. The reduced image mask Fs can cover a region of 5×5 pixels in the reduced image when calculating one average peripheral luminance value. The luminance values of the 12 pixels corresponding to reference points are reflected in the average peripheral luminance by a convolution operation, while the luminance values of the 13 pixels corresponding to skipped points are not incorporated in the average peripheral luminance. Hence, the reduced image mask Fs can calculate the average peripheral luminance while skipping luminance values for these remaining 16 pixels.

The right side of the drawing in FIG. 26(a) illustrates conditions for determining the distribution of reference points in the reduced image mask Fs. In this example, polar coordinates are set based on the center of the reduced image mask Fs as the point of origin O. Thus, when performing the convolution operation, the center of origin O is aligned with the target pixel of the reduced image. By expressing each position in the reduced image mask Fs using a moving radius r and an angle of deviation θ (where θ is a variable), the distribution of reference points in the reduced image mask Fs can be set based on the path expressed by the function r=f(θ). Since the function r=f(θ) shown in FIG. 26(a) is a circle having a radius r of 2 centered on the point of origin O, the moving radius r is always 2 regardless of the value of the angle of deviation θ. In other words, since f(θ)=2, the moving radius is expressed by r=2.

As shown in the left side of FIG. 26(b), the original image mask F has a total of 225 elements, with 15 elements in the vertical direction and 15 elements in the horizontal direction. Hence, the horizontal and vertical sizes of the original image mask F are respectively three times the horizontal and vertical sizes of the reduced image mask Fs shown in FIG. 26(a). The reduced image mask Fs shown in FIG. 26(a) and the original image mask F shown in FIG. 26(b) are used when the original image is three times the size of the reduced image. In other words, the sizes of the reduced image mask Fs and the original image mask F are determined so that the ratio of the size of the reduced image mask Fs to the size of the reduced image is substantially the same as the ratio of the size of the original image mask F to the size of the original image.

In this example, polar coordinates are set based on the center of the original image mask F as the point of origin O. Thus, when performing the convolution operation, the center of origin O is aligned with the target pixel of the original image.

In this way, the calculating region of the reduced image mask Fs conforms to the calculating region of the original image mask F for calculating the average peripheral luminance. Since the region of the original image covered by the original image mask F in one convolution operation corresponds to the region of the reduced image covered by the reduced image mask Fs, the distribution of average peripheral luminance values obtained from the reduced image is similar to the distribution of average peripheral luminance values obtained from the original image. Therefore, the distribution of reflectance values acquired from the reduced image is similar to the distribution of reflectance values acquired from the original image, making it possible to obtain appropriate normalization parameters from the reduced image. The shape of the mask is not limited to a rectangular shape, but may be a circular shape or other non-rectangular shape. In such a case, the size of the mask will denote the size of a rectangular region inscribed in the mask.

The right side of the drawing in FIG. 26(b) illustrates conditions for determining the distribution of reference points in the original image mask F. The distribution of reference points in the original image mask F is identical to the distribution of reference points in the reduced image mask Fs and is determined based on the path expressed by the function r=g(θ) (where r is the moving radius and θ is the angle of deviation) when elements in the original image mask F are set as polar coordinates with the center of the original image mask F being the point of origin O. The function r=g(θ) shown in FIG. 26(b) describes a circle having a radius r of 6 centered on the point of origin O. In other words, since g(θ) can be expressed as g(θ)=6, the moving radius expressed as r=6. Hence, the path determined by the distribution of reference points in the reduced image mask Fs is homothetic to the path determined by the distribution of reference points in the original image mask F. Accordingly, the distribution of average peripheral luminance values acquired from the reduced image is similar to the distribution of average peripheral luminance values acquired from the original image. As a result, the distribution of reflectance values acquired from the reduced image is also similar to the distribution of reflectance values acquired from the original image, making it possible to obtain more suitable normalization parameters from the reduced image.

FIG. 27 is a flowchart illustrating steps in the mask generating process (S4) according to the third embodiment for generating the reduced image mask Fs and the original image mask F.

In S401 of FIG. 27 the CPU 11 determines the size of the reduced image mask Fs. The CPU 11 determines the size of the reduced image mask Fs based on the size of the reduced image set in S3 (see FIG. 3). In the following example, it is assumed that the size of the reduced image mask Fs is determined as 5×5 as shown in FIG. 26(a).

In S402 the CPU 11 determines a parameter Rsmall. The parameter Rsmall is equivalent to the moving radius r in the function r=f(θ). The CPU 11 sets the parameter Rsmall to 2, for example, when desiring to the reference points in the reduced image mask Fs along the circular path shown in FIG. 26(a).

In S403 the CPU 11 initializes the angle of deviation θ and the structure for storing reference points in the reduced image mask Fs. That is, the CPU 11 sets the angle of deviation θ to 0. The CPU 11 sets the structure for storing reference points in the reduced image mask Fs to store neither coordinates nor filter coefficients. In S404 the CPU 11 converts positions in the polar coordinate system determined using the angle of deviation θ and the parameter Rsmall to coordinates in the Cartesian coordinate system with the center of the reduced image mask Fs serving as the point of origin to determine coordinates (x, y). The coordinates (x, y) are obtained by rounding off values to the right of the decimal point in x and y obtained from equation (11) below.

$$x = R\text{small} \times \cos(\theta)$$

$$y = R\text{small} \times \sin(\theta) \qquad \text{Equation (11)}$$

In S405 the CPU 11 determines whether the coordinates (x, y) obtained above have already been stored in the structure for storing reference points in the reduced image mask Fs.

When the coordinates (x, y) have not yet been stored in the structure for storing reference points in the reduced image mask Fs (S405: NO), in S406 the CPU 11 stores the coordinates (x, y) in the structure for storing reference points. In S407 the CPU 11 calculates a filter coefficient for the coordinates (x, y) with a Gaussian function and stores the filter coefficient in the structure for storing reference points in the reduced image mask Fs. Subsequently, the CPU 11 advances to S408.

However, if the coordinates (x, y) already belong to the structure for storing reference points in the reduced image mask Fs (S405: YES), then the CPU 11 advances to S408 without performing the processes in S406 and S407.

In S408 the CPU 11 increments the angle of deviation θ and in S409 determines whether the angle of deviation θ is smaller than 360. While the angle of deviation θ is smaller than 360 (S409: YES), the CPU 11 returns to S404 and repeats the above process.

When the angle of deviation θ becomes 360 after repeating the above process (S409: NO), then coordinates and filter coefficients for all reference points have been stored in the structure for storing reference points, thus completing generation of the reduced image mask Fs.

Hence, the process for generating the original image mask F begins from S410. In S410 the CPU 11 determines the reduction ratio for the reduced image relative to the original image. The reduction ratio corresponds to the ratio of the length of one side constituting the reduced image to the length of the corresponding side constituting the original image and is found from the original image size and reduced image size stored in the RAM 13, for example. In S411 the CPU 11 sets the size of the original image mask F based on the size of the reduced image mask Fs and the reduction ratio set in S410. Specifically, the CPU 11 finds the size of the original image mask F by multiplying the size of the reduced image mask Fs by the inverse of the reduction ratio. In this way, the CPU 11 sets the size of the original image mask F so that the ratio of the reduced image size to the size of the reduced image mask Fs is the same as the ratio of the original image size to the size of the original image mask F (see FIGS. 26(a) and 26(b)). The inverse of the reduction ratio corresponds to BR.

In S412 the CPU 11 sets a parameter Rlarge, which corresponds to the moving radius r in the function r=g(θ). The CPU 11 sets the parameter Rlarge according to equation (12) below using the inverse of the reduction ratio BR and the parameter Rsmall of the reduced image mask Fs.

$$R\text{large} = BR \cdot R\text{small} \qquad \text{Equation (12)}$$

In other words, the CPU 11 sets the parameter Rlarge so that the relationship f(θ)=BR·g(θ) is satisfied when the distribution of reference points in the reduced image mask Fs is determined based on the function r=f(θ) and the distribution of reference points in the original image mask F is determined based on the function r=g(θ).

In S413 the CPU 11 initializes the angle of deviation θ and the structure for storing reference points in the original image mask F. That is, the CPU 11 sets the angle of deviation θ to 0. The CPU 11 sets the structure for storing reference points in the original image mask F to store neither coordinates nor filter coefficients. In S414 the CPU 11 determines coordinates (x, y) by converting the position in the polar coordinate system determined using the angle of deviation θ and the parameter Rlarge to the Cartesian coordinate system. The coordinates (x, y) are obtained by rounding off values to the right of the decimal point in x and y obtained in equation (13) below.

$$x = R\text{large} \times \cos(\theta)$$
$$y = R\text{large} \times \sin(\theta) \qquad \text{Equation (13)}$$

In S415 the CPU 11 determines whether the coordinates (x, y) obtained in S414 have not yet been stored in the structure for storing reference points in the original image mask F.

If the coordinates (x, y) have not yet been stored in the structure for storing reference points in the original image mask F (S415: NO), then in S416 the CPU 11 stores the coordinates (x, y) in the structure for storing reference points in the original image mask F. In S417 the CPU 11 calculates the filter coefficient for the coordinates (x, y) using a Gaussian function and stores the filter coefficient in the structure for storing reference points in the original image mask F. Subsequently, the CPU 11 advances to S418.

However, if the coordinates (x, y) have already been stored in the structure for storing reference points in the original image mask F (S415: YES), then the CPU 11 skips the processes in S416 and S417 and advances directly to S418.

In S418 the CPU 11 increments the angle of deviation θ, and in S419 determines whether the angle of deviation θ is less than 360. While the angle of deviation θ is less than 360 (S419: YES), the CPU 11 returns to S414 and repeats the above process.

When the angle of deviation θ becomes 360 after repeating the above process (S419: NO), the coordinates and filter coefficients for all reference points have been stored in the structure for storing reference points, thus completing generation of the original image mask F. Therefore, the CPU 11 ends the mask generating process of S4.

Since the function r=f(θ) for determining the distribution of reference points in the reduced image mask Fs and the function r=g(θ) for determining the distribution of reference points in the original image mask F satisfy the relationship g(θ)=BR·f(θ), that is, a path determined by the function r=f(θ) is obtained by enlarging a path determined by the function r=g(θ), the distribution of reference points in the reduced image mask Fs is similar to the distribution of reference points in the original image mask F. Accordingly, the distribution of reflectance values acquired from the reduced image is very similar to the distribution of reflectance values acquired from the original image. Hence, it is possible to acquire a suitable clipped range from the reduced image (a clipped range very similar to that acquired from the original image), enabling the Retinex process to be performed with high precision.

Since the reduced image mask Fs and the original image mask F are generated dynamically through the mask generating process of S4, the printer 1 can reduce the amount of the ROM 12 compared to when storing the masks in the ROM 12. Dynamically generating the reduced image mask Fs and the original image mask F is particularly effective when the capacity of nonvolatile memory (the ROM 12) in the printer 1 is restricted from a cost perspective.

Further, since the mask generating process of S4 first sets the size of the reduced image mask Fs and subsequently sets the size of the original image mask F based on the size of the reduced image mask Fs, the printer 1 can ensure a suitable size for the reduced image mask Fs. In contrast, if the size of the original image mask F is set first and the size of the reduced image mask Fs is set by reducing this size based on the reduction ratio, the size of the reduced image mask Fs may be too small and not suitable for performing the convolution operation.

Since the reference points in the reduced image mask Fs and the original image mask F are distributed based on a curved path according to the mask generating process in S4, the printer 1 can suppress the generation of false contours (contour artifacts) in an image with straight lines, thereby suppressing a drop in image quality. For example, if reference points are distributed in straight lines, false contours are generated when the same straight lines exist in an image. As a result, image quality may suffer when performing the Retinex process.

First Variation of the Third Embodiment

In the mask generating process of S4 according to the third embodiment described above, the printer 1 first generates the reduced image mask Fs and subsequently generates the original image mask F. However, it is also possible to generate the original image mask F first and subsequently generate the reduced image mask Fs.

Figure 28:
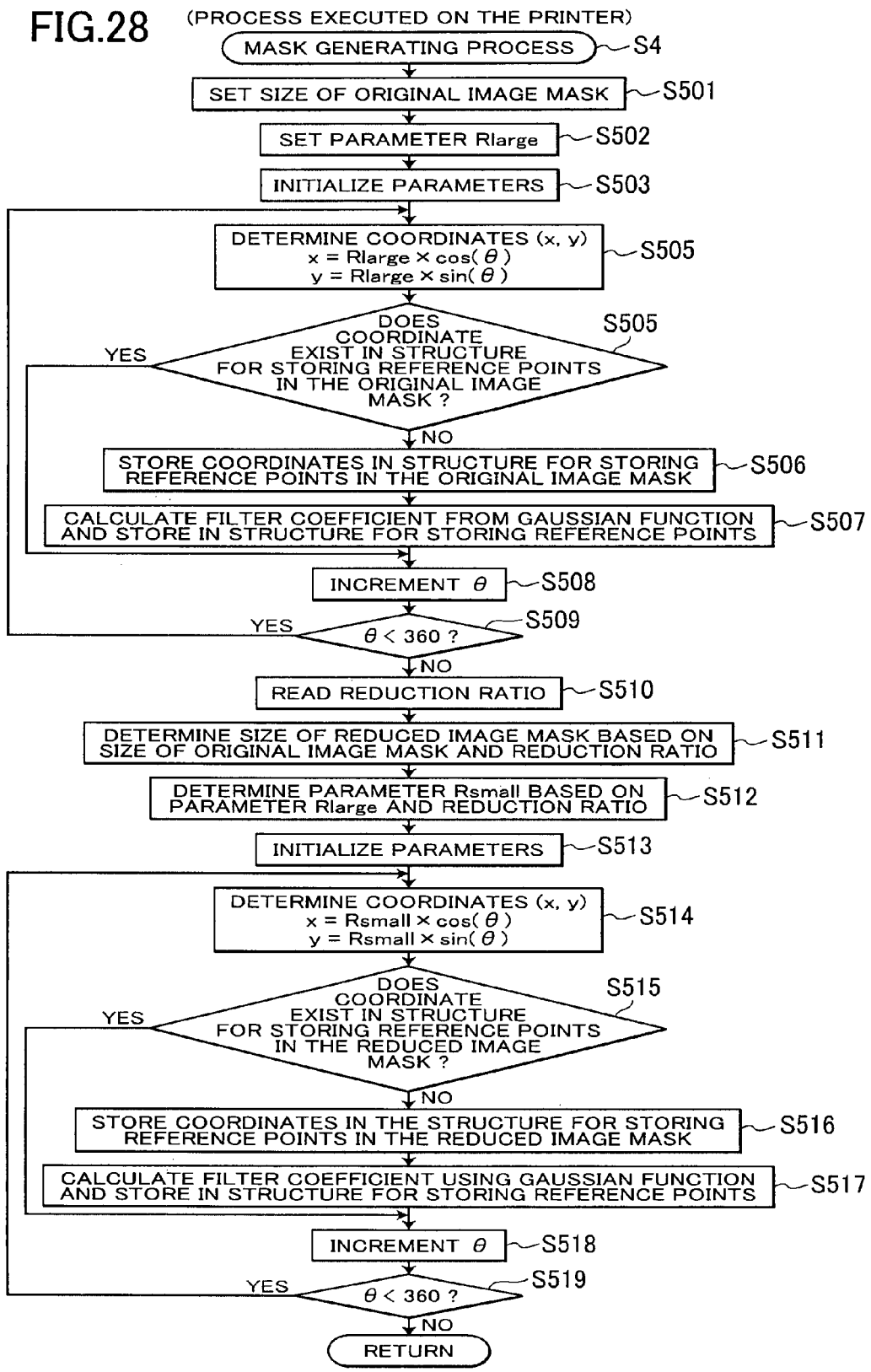
FIG. 28 is a flowchart illustrating steps in a mask generating process according to a first variation of the third embodiment.

FIG. 28 is a flowchart showing steps in a variation of the mask generating process in S4. This process differs from the mask generating process of FIG. 27 according to the third embodiment in that the original image mask F is generated first and the reduced image mask Fs is generated based on the original image mask F.

In S501 the CPU 11 determines the size of the original image mask F based on the size of the original image stored in the original image size memory 13$d$ (see FIG. 2).

In S502 the CPU 11 sets the parameter Rlarge, which is equivalent to the moving radius r in the function $r=g(\theta)$.

In S503 the CPU 11 initializes the angle of deviation $\theta$ to 0 and the structure for storing reference points in the original image mask F to store neither coordinates nor filter coefficients.

In S504 the CPU 11 determines coordinates (x, y) by converting a position in the polar coordinate system determined using the angle of deviation $\theta$ and the parameter Rlarge to the Cartesian coordinate system. The coordinates (x, y) are obtained by rounding off the value to the right of the decimal point for x and y acquired from equation (13) described above.

In S505 the CPU 11 determines whether the acquired coordinates (x, y) have not yet been stored in the structure for storing reference points in the original image mask F.

If the coordinates (x, y) have not yet stored in the structure for storing reference points in the original image mask F (S505: NO), then in S506 the CPU 11 stores the coordinates (x, y) in the structure for storing reference points in the original image mask F. In S507 the CPU 11 calculates the filter coefficient for the coordinates (x, y) using a Gaussian function and stores the filter coefficient in the structure for storing reference points in the original image mask F. Subsequently, the CPU 11 advances to S508.

However, if the coordinates (x, y) already exist in the structure for storing reference points in the original image mask F (S505: YES), then the CPU 11 skips the processes in S506 and S507 and advances directly to S508.

In S508 the CPU 11 increments the angle of deviation $\theta$, and in S509 determines whether the angle of deviation $\theta$ is less than 360. As long as the angle of deviation $\theta$ is less than 360 (S509: YES), the CPU 11 returns to S504 and repeats the above process.

When the angle of deviation $\theta$ reaches 360 after repeating the process described above (S509: NO), then the coordinates and filter coefficients for all reference points have been stored in the structure for storing reference points, thus completing generation of the original image mask F. Next, the CPU 11 generates the reduced image mask Fs.

In S510 the CPU 11 determines the reduction ratio for the reduced image relative to the original image. In S511 the CPU 11 determines the size of the reduced image mask Fs from the original image mask F and the reduction ratio read in S510. More specifically, the CPU 11 sets the size of the reduced image mask Fs to a value obtained by multiplying the size of the original image mask F by the reduction ratio.

In S512 the CPU 11 sets the parameter Rsmall, which is equivalent to the moving radius r in the function $r=f(\theta)$. The CPU 11 determines the parameter Rsmall according to equation (12) described above.

In S513 the CPU 11 initializes the angle of deviation $\theta$ to 0 and the structure for storing reference points in the reduced image mask Fs not to store coordinates and filter coefficients.

In S514 the CPU 11 determines the coordinates (x, y) by converting the position in the polar coordinate system determined using the angle of deviation $\theta$ and the parameter Rsmall to the Cartesian coordinate system. The coordinates (x, y) are obtained by rounding off numbers to the right of the decimal point for x and y acquired from equation (11) described above.

In S515 the CPU 11 determines whether the acquired coordinates (x, y) have been already stored in the structure for storing reference points in the reduced image mask Fs. If the coordinates (x, y) have not yet been stored in the structure for storing reference points in the reduced image mask Fs (S515: NO), then in S516 the CPU 11 stores the coordinates (x, y) in the structure for storing reference points in the reduced image mask Fs. In S517 the CPU 11 calculates the filter coefficient for the coordinates (x, y) using a Gaussian function and stores this filter coefficient in the structure for storing reference points in the reduced image mask Fs. Subsequently, the CPU 11 advances to S518.

However, if the coordinates (x, y) have already been stored in the structure for storing reference points in the reduced image mask Fs (S515: YES), then the CPU 11 skips the processes in S516 and S517 and advances directly to S518.

In S518 the CPU 11 increments the angle of deviation $\theta$ and determines in S519 whether the angle of deviation $\theta$ is less than 360. As long as the angle of deviation $\theta$ is less than 360 (S519: YES), the CPU 11 returns to S514 and repeats the above process.

When the angle of deviation $\theta$ reaches 360 after repeating the above process (S519: NO), then the coordinates and filter coefficients for all reference points have been stored in the structure for storing reference points, completing generation of the reduced image mask Fs. Hence, the CPU 11 ends the mask generating process of S4.

Since the mask generating process of S4 according to the variation described above determines the size of the reduced image mask Fs based on the size of the original image mask F, the printer 1 can reduce the region of the RAM 13 allocated for storing the generated reduced image mask Fs. In the case where the printer 1 generates the original image mask F after first setting the reduced image mask Fs and determining the size of the original image mask F based on the size of the reduced image mask Fs and the reduction ratio, there is a risk that the size of the original image mask F may be extremely large based on the reduction ratio. As a result, it is necessary to allocate a sufficiently large memory area for storing the reference points and filter coefficients for the generated original image mask F. Thus, this variation is efficient for the printer that cannot have the large amount of the memory (the RAM 13).

Since the reduced image mask Fs is generated by determining the size of the reduced image mask Fs based on the size of the original image mask F in the variation described above, less amount of the ROM 12 is required than when the reduced image mask Fs has been stored in the ROM 12. Further, since the size of the reduced image mask Fs is smaller than that of the original image mask F, less amount of the RAN 13 needs to be allocated for storing the generated reduced image mask Fs.

Second Variation of the Third Embodiment

It is also possible to generate both of the reduced image mask Fs and the original image mask F based on the size of the original image mask F. For example, the reduced image mask Fs and the original image mask F may be generated according to the mask generating process of the first variation of the third embodiment described above when the original image mask F is greater than or equal to a prescribed size, and according to the mask generating process in the third embodiment when the original image mask F is less than the prescribed size.

More specifically, similarly to the mask generating process of the second embodiment, the size of the reduced image mask Fs is predetermined. The CPU 11 first estimates the size of the original image mask F by multiplying the size of the reduced image mask Fs by the inverse of the reduction ratio. If the size of the original image mask F is less than or equal to the prescribed size for the original image mask F, the masks are generated according to the mask generating process of the third embodiment (FIG. 27). That is, at first, the reduced image mask Fs is generated, and subsequently the original image mask F is generated. On the other hand if the size of the original image mask F is greater than the prescribed size for the original image mask F, the masks are generated according to the mask generating process of the first variation of the third embodiment (FIG. 28). That is, at first, the original image mask F is generated and subsequently the reduced image mask Fs is generated.

Variations of the Functions of the Third Embodiment

Further, in the third embodiment described above, reference points in the reduced image mask Fs and original image mask F are distributed along a circular path. In other words, the moving radius r is always constant, regardless of the value of the angle of deviation θ in the functions r=f(θ) and r=g(θ) for determining reference points in the reduced image mask Fs. However, each of the f(θ) and g(θ) may be a combination of a constant and the variable θ.

Figure 29:
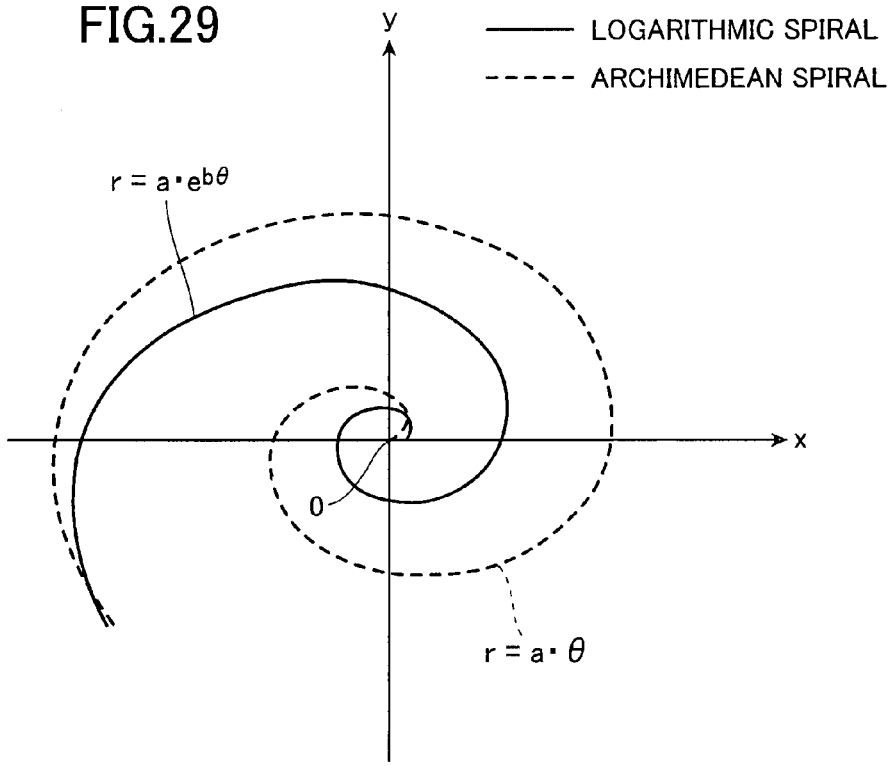
FIG. 29 is an explanatory diagram illustrating a path described when functions $r=f(\theta)$ and $r=g(\theta)$ are spiral functions.

For example, FIG. 29 shows a path described when the functions r=f(θ) and r=g(θ) are spiral functions. In FIG. 29, the dotted line depicts the path of an Archimedean spiral when the spiral function is represented by the function r=a·θ, and the solid line depicts a path called a logarithmic spiral when the spiral function is expressed by the function $r=a \cdot e^{b\theta}$ (here, a and b are constants). When determining the distribution of reference points using these types of spiral functions, reference points in the reduced image mask Fs and the original image mask F can be distributed along the spiral-shaped paths.

For example, in the case of using the spiral function r=a·θ, f(θ) and g(θ) are determined as f(θ) a·θ and g(θ)=BR·a·θ. In this case, the path determined by the function r=g(θ) is given by similar extension of path determined by the function r f(θ). In the case of using the spiral function $r=a \cdot e^{b\theta}$, f(θ) and g(θ) are determined as $f(\theta)=a \cdot e^{b\theta}$ and $g(\theta)=BR \cdot a \cdot e^{b\theta}$, for example.

In the third embodiment described above, the function r=f(θ) for determining the distribution of reference points in the reduced image mask Fs and the r=g(θ) for determining the distribution of reference points in the original image mask F satisfy the relationship g(θ)=BR·f(θ), but it is not essential that the functions satisfy this relationship. For example, when the function r=f(θ) is $r=a \cdot e^{b\theta}$, the function r=g(θ) may be the same type of function with r=f(θ) with regard to the variable θ, but have at least one different constant from the function r=f(θ), such as $r=a \cdot e^{c\theta}$ (where c is a constant and b≠c). In other words, the functions r=f(θ) and r=g(θ) have the same form of function relative to the variable θ, in which a first constant is multiplied by an exponential function relative to a product of a second constant and a variable θ. The functions r=f(θ) and r=g(θ) are the same as each other in their form of function, first constants and the variable θ, but differs in their second constants. Using these functions, the distribution of reference points in the reduced image mask Fs are made similar to the distribution of reference points in the original image mask F, thereby obtaining the same effects as described in the third embodiments.

Figure 30:
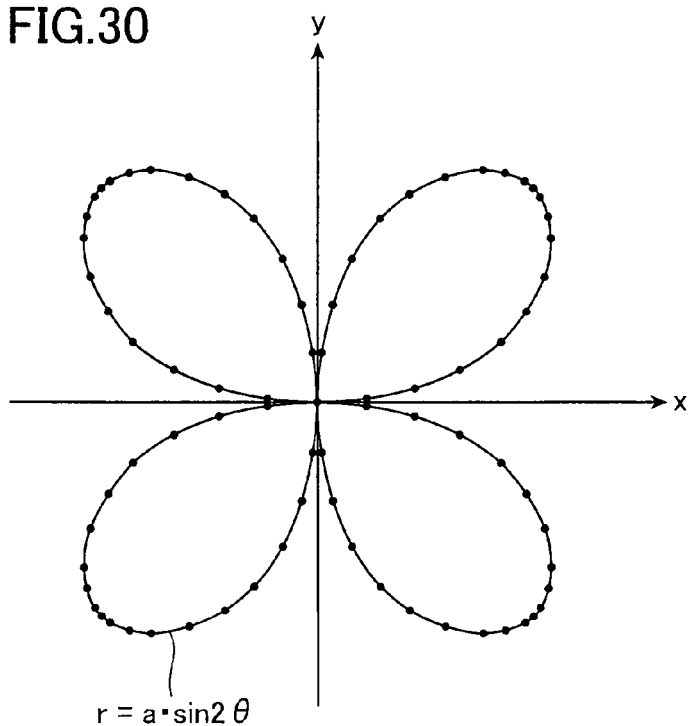
FIG. 30 is an explanatory diagram illustrating a path of a folium of Descartes function expressed by a function $r=a \cdot \sin 2\theta$.

FIG. 30 shows the path of a folium of Descartes function expressed by the function r=a·sin 2θ. The function r=f(θ) determining reference points in the reduced image mask Fs and the function r=g(θ) determining reference points in the original image mask F may be this folium of Descartes function.

Further, the function r=f(θ) and the function r=g(θ) may be the same function and have the same constant with each other. Further, while the mask generating process of S4 in the third embodiment described above determines coordinates of the reference points by sequentially incrementing the angle of deviation θ by 1, the reference points may be distributed at any other prescribed intervals. That is, the angle of deviation θ may increase by a prescribed number larger than 1, as shown in FIG. 30. In this case the intervals (the prescribed numbers) may be varied between the reduced image mask Fs and the original image mask F. For example, the angle of deviation θ increase by 3 when generating the reduced image mask Fs, and the angle of deviation θ increase by 2 when generaging the original image mask F.

Reference points in the reduced image mask Fs and reference points in the original image mask F may simply have a relationship that can be determined from the same function. For example, the distribution of reference points for one of the reduced image mask Fs and the original image mask F is predetermined based on a function, while reference points for the other mask are determined from the same function. Further, the reference points for both the reduced image mask Fs and the original image mask F may be predetermined such that the distribution of those reference points has a relationship that is determined from the same function.

While the invention has been described in detail with reference to the specific embodiment thereof, it would be apparent to those skilled in the art that many modifications and variations may be made therein without departing from the spirit of the invention, the scope of which is defined by the attached claims.

For example, the color system in the embodiment described above is the RGB color model, but a color system other than the RGB color model may be used. For example, the present invention may be applied to the CMY color model or the like.

In the embodiments described above, the CPU 11 provided in the printer 1 executes the image-processing program according to the present embodiment. However, this program may be provided to a personal computer as an application program that is executed by a CPU or the like provided in the personal computer.

Either the single-scale Retinex (SSR) or multi-scale Retinex (MSR) method may be used in the Retinex process.

In the image process of the embodiment described above, the CPU 11 performs the Retinex process and the like. However, these processes may be performed with a digital signal processor (DSP). The DSP can be used to execute product-sum operations and other operations more quickly.

In the embodiment, the original pixel values RGB are converted to the luminance value, which is then subjected to the retinex process. However, the original pixel values RGB may be subjected to the retinex process.

The printer 1 may be modified to other various types of image processing devices. Even though the arithmetic unit in the image processing device attains calculations with a too low processing speed and a too small bit number to perform the floating-point operations, the image processing device can still perform the Retinex process with high accuracy by executing the fixed-point operations. So, the image processing device can be made inexpensive.

What is claimed is:

1. An image processor for correcting an image, comprising:
    a processor configured to execute program units stored on one or more memories, the program units comprising:
        a reduced image forming unit forming a reduced image by reducing an original image;
        an image filter acquiring unit acquiring a reduced image filter for the reduced image and an original image filter for the original image, the image filter acquiring unit generating either one of the original image filter and the reduced image filter based on the other one of the original image filter and the reduced image filter;
        a reduced image average value calculating unit calculating an average peripheral value for each pixel in the reduced image using the reduced image filter;
        a reduced image reflectance acquiring unit finding a reflectance value for each pixel in the reduced image from a value of the each pixel and the average peripheral value of the each pixel;
        a normalization parameter setting unit tabulating frequencies of each reflectance value within the entire range of reflectance values found by the reduced image reflectance acquiring unit for all the pixels and setting a normalization parameter;
        an original image average value calculating unit calculating an average peripheral value for each pixel in the original image using the original image filter;
        an original image reflectance acquiring unit finding a reflectance value for each pixel in the original image from a value of the each pixel and the average peripheral value of the each pixel;
        a normalizing unit normalizing the reflectance value for each pixel in the original image based on the normalization parameter; and
        a correcting unit correcting a value for each pixel of the original image based on the normalized reflectance value for the each pixel in the original image.

2. The image processor as claimed in claim 1, wherein the image filter acquiring unit includes an original image filter acquiring unit and a reduced image filter acquiring unit,
    the reduced image filter acquiring unit acquires the reduced image filter; and
    the original image filter acquiring unit generates the original image filter based on the reduced image filter.

3. The image processor as claimed in claim 2, wherein the reduced image filter acquiring unit includes:
    a storing unit storing the reduced image filter; and
    a reading unit reading the reduced image filter from the storing unit.

4. The image processor as claimed in claim 2, wherein the original image filter and the reduced image filter each have a region of a prescribed size corresponding to a calculating range of the average peripheral value, at least one reference point set within the range of the prescribed size, and a filter coefficient associated with the reference point, and
    the original image filter acquiring unit generates the original image filter by enlarging the reduced image filter.

5. The image processor as claimed in claim 4, wherein a ratio of a distance between two points in the reduced image filter to a distance between corresponding two points in the original image filter is equal to a reduction ratio representing a ratio of a one-dimensional size of the reduced image to a one-dimensional size of the original image.

6. The image processor as claimed in claim 4, further comprising a reduction ratio setting unit setting a reduction ratio representing a ratio of a one-dimensional size of the reduced image to one-dimensional size of the original image;
    wherein the original image filter acquiring unit generates the original image filter based on the reduced image filter and on the reduction ratio.

7. The image processor as claimed in claim 2, wherein the original image filter and the reduced image filter each have a region of a prescribed size corresponding to a calculating range of the average peripheral value, at least one reference point set within the range of the prescribed size, and a filter coefficient associated with the reference point.

8. The image processor as claimed in claim 7, wherein the reduced image average value calculating unit sets the reduced image filter relative to the reduced image so as to cover a prescribed region relative to a target pixel in the reduced image and calculates the average peripheral value by multiplying a value of a reference pixel in the reduced image corresponding to a reference point in the reduced image filter associated with a filter coefficient by the filter coefficient;
    the original image average value calculating unit sets the original image filter relative to the original image so as to cover a prescribed region relative to a target pixel in the original image and calculates the average peripheral value for the target pixel in the original image by multiplying a value of a reference pixel in the original image corresponding to a reference point in the original image filter associated with a filter coefficient by the filter coefficient; and
    the original image filter acquiring unit generates the original image filter that is configured to ensure that the reference pixel in the original image corresponds to the reference pixel in the reduced image.

9. The image processor as claimed in claim 2, wherein a ratio of a size of the reduced image to a size of the reduced image filter is identical to a ratio of a size of the original image to a size of the original image filter.

10. The image processor as claimed in claim 9, wherein the reduced image filter determines a calculating range of the average peripheral value for each pixel in the reduced image and divides pixels within the calculating range for each pixel into reference pixels whose values are reflected in the average peripheral value, and skipped pixels whose values fail to be reflected in the average peripheral value;
    the reduced image forming unit forms the reduced image by dividing the original image into a plurality of blocks, each block having k rows and k columns of pixels, and by consolidating each block into one pixel, wherein k is an integer greater than one; and the original image filter acquiring unit generates the original image filter that determines a calculating range of an average peripheral value for each pixel in the original image and that divides pixels in the original image within the calculating range for each pixel into reference pixels whose values are reflected in the average peripheral value and skipped pixels whose values fail to be reflected in the average peripheral value so that one block of the original image, on which each reference pixel in the reduced image is based, includes at least one reference pixel, p rows and q columns of pixels in the reduced image determined by the calculating range for the reduced image filter being generated by reducing k·p rows and k·q columns of pixels in the original image that are determined by the calculating range for the original image filter, p and q being an integer greater than one.

11. The image processor as claimed in claim 10, wherein the original image filter acquiring unit generates the original image filter by setting those pixels in each block of the original image, on which skipped pixels in the reduced image are based, to skipped pixels.

12. The image processor as claimed in claim 10, wherein the reduced image forming unit forms a reduced image by extracting n pixels (where n is an integer greater than 0 and smaller than or equal to k×k) from each block and generates one pixel based on the n extracted pixels;

wherein the original image filter acquiring unit generates the original image filter that is configured to set each of at least one pixel among the n extracted pixels in one block of the original image, on which each reference pixel of the reduced image is based, to a reference pixel.

13. The image processor as claimed in claim 2, wherein the reduced image filter acquiring unit generates the reduced image filter.

14. The image processor as claimed in claim 13, wherein a distribution of reference points in the reduced image filter and a distribution of reference points in the original image filter are determined based on the same function.

15. The image processor as claimed in claim 14, wherein the distribution of reference points in the reduced image filter is determined based on a function $r=f(\theta)$ for a coordinate system in which a prescribed position in the reduced image filter is set as a point of origin, the distribution of reference points in the original image filter is determined based on a function $r=g(\theta)$ for a coordinate system in which a prescribed position in the original image filter is set as a point of origin, the functions $r=f(\theta)$ and $r=g(\theta)$ are of the same type of function relative to the variable $\theta$, and each of the functions $r=f(\theta)$ and $r=g(\theta)$ have at least one constant, at least one of the at least one constant in the function $r=f(\theta)$ being different from corresponding at least one constant in the function $r=g(\theta)$.

16. The image processor as claimed in claim 15, wherein the equality $g(\theta)=BR \cdot f(\theta)$ is satisfied where BR is a ratio of a length of one side of the original image filter to a length of a corresponding side of the reduced image filter.

17. The image processor as claimed in claim 13, wherein the original image filter acquiring unit generates the original image filter after determining the size of the original image filter based on the size of the reduced image filter.

18. The image processor as claimed in claim 14, wherein the function is a spiral function.

19. The image processor as claimed in claim 18, wherein the spiral function is a logarithmic spiral function.

20. The image processor as claimed in claim 18, wherein the spiral function is an Archimedean spiral function.

21. The image processor as claimed in claim 14, wherein the function is a folium of Descartes function.

22. The image processor as claimed in claim 1, wherein the filter acquiring unit includes an original image filter acquiring unit and a reduced image filter acquiring unit, the original image filter acquiring unit acquires the original image filter; and the reduced image filter acquiring unit generates the reduced image filter based on the original image filter.

23. The image processor as claimed in claim 22, wherein the original image filter acquiring unit generates the original image filter.

24. A method for correcting an image, comprising:

forming a reduced image by reducing an original image;

acquiring a reduced image filter for the reduced image and an original image filter for the original image, the acquiring including generating either one of the original image filter and the reduced image filter based on the other one of the original image filter and the reduced image filter;

calculating an average peripheral value for each pixel in the reduced image using the reduced image filter;

finding a reflectance value for each pixel in the reduced image from a value of the each pixel and the average peripheral value of the each pixel;

tabulating frequencies of each reflectance value within the entire range of reflectance values found for all the pixels and setting a normalization parameter;

calculating an average peripheral value for each pixel in the original image using the original image filter;

finding a reflectance value for each pixel in the original image from a value of the each pixel and the average peripheral value of the each pixel;

normalizing the reflectance value for each pixel in the original image based on the normalization parameter; and correcting a value for each pixel of the original image based on the normalized reflectance value for the each pixel in the original image.

25. The method as claimed in claim 24, wherein the acquiring includes:

acquiring the reduced image filter; and generating the original image filter based on the reduced image filter.

26. The method as claimed in claim 25, wherein the reduced image filter acquiring step includes reading the reduced image filter stored in a storage unit.

27. The method as claimed in claim 25, wherein the original image filter and the reduced image filter each have a region of a prescribed size corresponding to a calculating range of an average peripheral value, at least one reference point set within the range of the prescribed size, and a filter coefficient associated with the reference point, and the original image filter generating step includes generating the original image filter by enlarging the reduced image filter.

28. The method as claimed in claim 27, wherein a ratio of a distance between two points in the reduced image filter to a distance between corresponding two points in the original image filter is equal to a reduction ratio representing a ratio of a one-dimensional size of the reduced image to a one-dimensional size of the original image.

29. The method as claimed in claim 27, further comprising setting a reduction ratio representing a ratio of a one-dimensional size of the reduced image to a one-dimensional size of the original image;

wherein the original image filter generating step includes generating the original image filter based on the reduced image filter and on the reduction ratio.

30. The method as claimed in claim 25, wherein the original image filter and the reduced image filter each have a region of a prescribed size corresponding to a calculating range of the average peripheral value, at least one reference point set within the range of the prescribed size, and a filter coefficient associated with the reference point.

31. The method as claimed in claim 30, wherein the reduced image average value calculating step includes:
   setting the reduced image filter relative to the reduced image so as to cover a prescribed region relative to a target pixel in the reduced image; and
   calculating the average peripheral value for the target pixel in the reduced image by multiplying a value of a reference pixel in the reduced image corresponding to a reference point in the reduced image filter associated with a filter coefficient by the filter coefficient,
   the original image average value calculating step includes:
   setting the original image filter relative to the original image so as to cover a prescribed region relative to a target pixel in the original image; and
   calculating the average peripheral value for the target pixel in the original image by multiplying a value of a reference pixel in the original image corresponding to a position in the original image filter associated with a filter coefficient by the filter coefficient,
   the original image filter generating step includes generating the original image filter that is configured to ensure that the reference pixel in the original image corresponds to the reference pixel in the reduced image.

32. The method as claimed in claim 25, wherein a ratio of a size of the reduced image to a size of the reduced image filter is identical to a ratio of a size of the original image to a size of the original image filter.

33. The method as claimed in claim 32, wherein the reduced image filter determines a calculating range of the average peripheral value for each pixel in the reduced image and divides pixels within the calculating range for each pixel into reference pixels whose values are reflected in the average peripheral value, and skipped pixels whose values fail to be reflected in the average peripheral value wherein k is an integer greater than one;
   the reduced image forming step includes forming the reduced image by dividing the original image into a plurality of blocks, each block having k rows and k columns of pixels, and by consolidating each block into one pixel, where k is an integer greater than one; and
   the original image filter generating step includes generating the original image filter that determines a calculating range of the average peripheral value for each pixel in the original image and that divides pixels in the original image within the calculating range for each pixel into reference pixels whose values are reflected in the average peripheral value and skipped pixels whose values fail to be reflected in the average peripheral value so that one block of the original image, on which each reference pixel in the reduced image is based, includes at least one reference pixel, p rows and q columns of pixels in the reduced image determined by the calculating range for the reduced image filter being generated by reducing k·p rows and k·q columns of pixels in the original image that are determined by the calculating range for the original image filter, p and q being an integer greater than one.

34. The method as claimed in claim 33, wherein the original image filter generating step includes generating the original image filter by setting those pixels in each block of the original image, on which skipped pixels in the reduced image are based, to skipped pixels.

35. The method as claimed in claim 33, wherein the reduced image forming step includes:
   forming a reduced image by extracting n pixels (where n is an integer greater than 0 and smaller than or equal to k×k) from each block; and
   generating one pixel based on the n extracted pixels,
   wherein the original image filter generating step includes generating the original image filter that is configured to set each of at least one pixel among the n extracted pixels in one block of the original image, on which each reference pixel of the reduced image is based, to a reference pixel.

36. The method as claimed in claim 25, wherein the reduced image filter acquiring step includes generating the reduced image filter.

37. The method as claimed in claim 36, wherein distribution of reference points in the reduced image filter and a distribution of reference points in the original image filter are determined based on the same function.

38. The method as claimed in claim 37, wherein the distribution of reference points in the reduced image filter is determined based on a function $r=f(\theta)$ for a coordinate system in which a prescribed position in the reduced image filter is set as a point of origin,
   the distribution of reference points in the original image filter is determined based on a function $r=g(\theta)$ for a coordinate system in which a prescribed position in the original image filter is set as a point of origin,
   the functions $r=f(\theta)$ and $r=g(\theta)$ are of the same type of function relative to the variable $\theta$, and
   each of the functions $r=f(\theta)$ and $r=g(\theta)$ has at least one constant, at least one of the at least one constant in the function $r=f(\theta)$ being different from corresponding at least one constant in the function $r=g(\theta)$.

39. The method as claimed in claim 38, wherein the equality $g(\theta)=BR \cdot f(\theta)$ is satisfied where BR is a ratio of a length of one side of the original image filter to a length of a corresponding side of the reduced image filter.

40. The method as claimed in claim 36, wherein the original image filter generating step includes generating the original image filter after determining the size of the original image filter based on the size of the reduced image filter.

41. The method as claimed in claim 37, wherein the function is a spiral function.

42. The method as claimed in claim 41, wherein the spiral function is a logarithmic spiral function.

43. The method as claimed in claim 41, wherein the spiral function is an Archimedean spiral function.

44. The method as claimed in claim 41, wherein the function is a folium of Descartes function.

45. The method as claimed in claim 23, wherein the filter acquiring step includes:
   acquiring the original image filter; and
   generating the reduced image filter based on the original image filter.

46. The method as claimed in claim 45, wherein the original image filter acquiring step includes generating the original image filter.

47. A computer-readable storage device storing a set of program instructions executable on a computer, the program instructions comprising:
   forming a reduced image by reducing an original image;
   acquiring a reduced image filter for the reduced image and an original image filter for the original image, the acquiring including generating either one of the original image filter and the reduced image filter based on the other one of the original image filter and the reduced image filter;

calculating an average peripheral value for each pixel in the reduced image using the reduced image filter;

finding a reflectance value for each pixel in the reduced image from a value of the each pixel and the average peripheral value of the each pixel;

tabulating frequencies of each reflectance value within the entire range of reflectance values found for all the pixels and setting a normalization parameter;

calculating an average peripheral value for each pixel in the original image using the original image filter;

finding a reflectance value for each pixel in the original image from a value of the each pixel and the average peripheral value of the each pixel;

normalizing the reflectance value for each pixel in the original image based on the normalization parameter; and correcting a value for each pixel of the original image based on the normalized reflectance value for the each pixel in the original image.

* * * * *